(12) United States Patent
Tandai et al.

(10) Patent No.: US 8,045,529 B2
(45) Date of Patent: Oct. 25, 2011

(54) TERMINAL STATION RADIO COMMUNICATION DEVICE, BASED STATION RADIO COMMUNICATION DEVICE, RADIO COMMUNICATION DEVICE, RADIO COMMUNICATION METHOD, AND RADIO COMMUNICATION PROGRAM

(75) Inventors: Tomoya Tandai, Tokyo (JP); Noritaka Deguchi, Kawasaki (JP); Tomoya Horiguchi, Yokohama (JP); Tazuko Tomioka, Kawasaki (JP); Takeshi Tomizawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 233 days.

(21) Appl. No.: 11/583,134

(22) Filed: Oct. 19, 2006

(65) Prior Publication Data
US 2007/0183392 A1    Aug. 9, 2007

(30) Foreign Application Priority Data
Feb. 8, 2006    (JP) .................................. 2006-031733

(51) Int. Cl.
*H04B 7/216* (2006.01)
(52) U.S. Cl. ........ 370/335; 370/346; 370/428; 370/348; 370/229; 455/436; 455/502
(58) Field of Classification Search .................. 455/436, 455/502, 556; 370/335, 346, 428, 348, 229; 380/247
See application file for complete search history.

(56) References Cited

U.S. PATENT DOCUMENTS
5,526,357 A * 6/1996 Jandrell .......................... 370/346
7,668,265 B2 * 2/2010 Balakrishnan et al. ........ 375/346
(Continued)

FOREIGN PATENT DOCUMENTS
JP    08-288888    11/1996
(Continued)

OTHER PUBLICATIONS

Mitola, "Cognitive Radio for Flexible Mobile Multimedia Communications", IEEE 6$^{th}$ International Workshop on Mobile Media Communications, pp. 3-10 (1999).

(Continued)

*Primary Examiner* — Nick Corsaro
*Assistant Examiner* — Mahendra Patel
(74) *Attorney, Agent, or Firm* — Nixon & Vanderhye, P.C.

(57) ABSTRACT

A terminal station radio communication device belongs to a second radio communication system which shares a frequency channel with a first radio communication system in which a radio terminal station communicates with a radio base station in a predetermined time period using a predetermined frequency channel. The terminal station radio communication device includes: a transmission power determining unit which sets up signal transmission power, the signal transmission power being usable for communications between radio communication devices belonging to the second radio communication system, and being determined such that reception power at the radio base station is below a predetermined threshold; a synchronizer enabling the radio terminal station to obtain timing information to start signal transmission; and a signal transmitter starting transmitting the signal at the timing represented by the timing information and terminating the signal transmission within a predetermined time period.

17 Claims, 65 Drawing Sheets

U.S. PATENT DOCUMENTS

| | | | |
|---|---|---|---|
| 2001/0021639 A1* | 9/2001 | Kaku | 455/41 |
| 2002/0032031 A1* | 3/2002 | Ogino et al. | 455/435 |
| 2002/0193072 A1* | 12/2002 | Alinikula et al. | 455/41 |
| 2003/0048794 A1* | 3/2003 | Sato et al. | 370/401 |
| 2004/0028003 A1* | 2/2004 | Diener et al. | 370/319 |
| 2004/0037258 A1* | 2/2004 | Scherzer et al. | 370/338 |
| 2004/0047324 A1 | 3/2004 | Diener | |
| 2004/0264561 A1* | 12/2004 | Alexander et al. | 375/232 |
| 2005/0287957 A1* | 12/2005 | Lee et al. | 455/68 |
| 2006/0079198 A1* | 4/2006 | Sanderson | 455/402 |
| 2006/0083205 A1* | 4/2006 | Buddhikot et al. | 370/338 |
| 2006/0092871 A1* | 5/2006 | Nishibayashi et al. | 370/328 |
| 2006/0092907 A1* | 5/2006 | Shimokawa et al. | 370/347 |
| 2006/0256884 A1 | 11/2006 | Tomioka et al. | |
| 2007/0042733 A1 | 2/2007 | Tomioka | |
| 2008/0139213 A1* | 6/2008 | Coersmeier | 455/450 |
| 2008/0311938 A1* | 12/2008 | Song | 455/500 |

FOREIGN PATENT DOCUMENTS

| | | |
|---|---|---|
| JP | 2000-307551 | 11/2000 |
| JP | 2002-246961 | 8/2002 |
| JP | 2003-037529 | 2/2003 |
| JP | 3583962 | 8/2004 |
| JP | 2004-336387 | 11/2004 |
| JP | 2005-523616 | 8/2005 |

OTHER PUBLICATIONS

Patent Application entitled "Radio Terminal" by Tandai et al. filed Apr. 19, 2006; Toshiba reference No. 13G040629.

Tazuko Tomioka, "Radio Receiver and Radio Receiving Method", U.S. Appl. No. 11/356,956, filed Feb. 21, 2006.

* cited by examiner

| RECEPTION POWER | MODULATION METHOD |
|---|---|
| BETWEEN −70dBm and −60dBm | BPSK |
| BETWEEN −80dBm and −70dBm | QPSK |
| BETWEEN −90dBm and −80dBm | 16QAM |
| EQUAL TO OR LESS THAN −90dBm | 64QAM |

FIG. 30

| DISTANCE BETWEEN RADIO BASE STATIONS B AND A | TRANSMISSION POWER |
|---|---|
| DISTANCE < 200m | TRANSMISSION NOT ALLOWED |
| 200m ≦ DISTANCE < 400m | 0dBm |
| 400m ≦ DISTANCE < 600m | 3dBm |
| 600m ≦ DISTANCE < 800m | 6dBm |
| 800m ≦ DISTANCE < 1000m | 9dBm |
| 1000m ≦ DISTANCE < 1200m | 12dBm |
| 1200m ≦ DISTANCE < 1400m | 15dBm |
| 1400m ≦ DISTANCE < 1600m | 18dBm |
| 1600m ≦ DISTANCE < 1800m | 21dBm |
| 1800m ≦ DISTANCE < 2000m | 24dBm |
| 2000m ≦ DISTANCE | 27dBm |

FIG.50

| RADIO COMMUNICATION DEVICE B | RADIO COMMUNICATION DEVICE A1 | RADIO COMMUNICATION DEVICE A2 | RADIO COMMUNICATION DEVICE A3 | RADIO COMMUNICATION DEVICE A4 |
|---|---|---|---|---|
| | 71dB | 80dB | 67dB | 76dB |

FIG. 60
| TRANSMISSION RATE | ALLOWABLE INTERFERENCE LEVEL |
|---|---|
| 6Mbps | -68dBm |
| 9Mbps | -69dBm |
| 12Mbps | -71dBm |
| 18Mbps | -73dBm |
| 24Mbps | -76dBm |
| 36Mbps | -80dBm |
| 48Mbps | -84dBm |
| 54Mbps | -85dBm |
FIG. 61
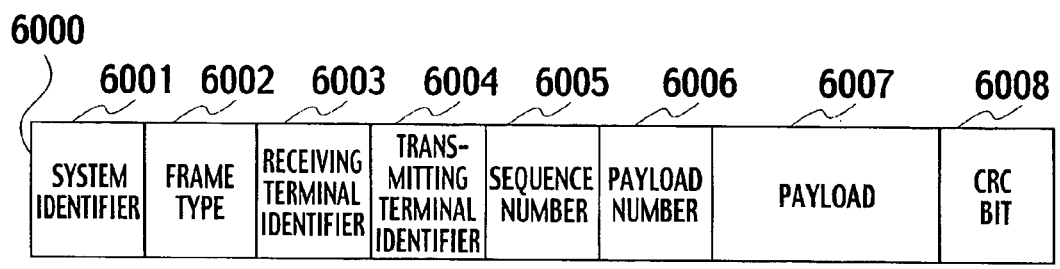
FIG. 62
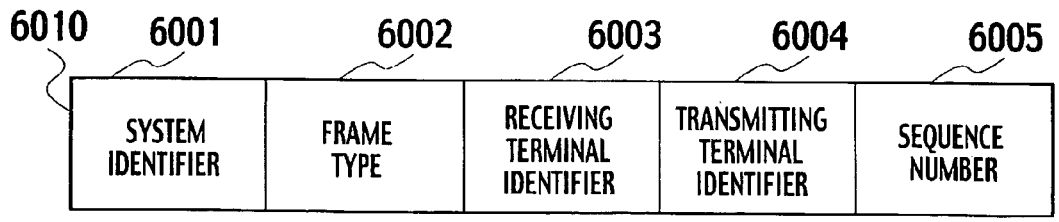

TERMINAL STATION RADIO COMMUNICATION DEVICE, BASED STATION RADIO COMMUNICATION DEVICE, RADIO COMMUNICATION DEVICE, RADIO COMMUNICATION METHOD, AND RADIO COMMUNICATION PROGRAM

CROSS REFERENCE TO RELATED APPLICATION

This application is based upon and claims the benefit of priority from the prior Japanese Patent Application No. 2006-031733 filed on Feb. 8, 2006, the entire contents of which are incorporated herein by reference.

BACKGROUND OF THE INVENTION

1. Field of the Invention

This invention relates to a radio communication device, a radio communication method and a radio communication program, and more particularly relates to radio communication devices which share a particular frequency band and constitute a plurality of radio communication systems, a radio communication method which controls operations of the radio communication systems, and a radio communication program which is applied to execute the foregoing method.

2. Description of the Related Art

There are communication devices which share a particular frequency band in a radio communication system, and a radio communication method which controls operations of the radio communication system, as described by Mitola (J. Mitola III, "Cognitive Radio for Flexible Mobile Multimedia Radio Communications", IEEE Six International Workshop on Mobile Multimedia Radio communications (MoMuC99), pp. 3-10, November 1999). Mitola teaches that a low-priority communication device detects carriers in a common frequency band, and transmit signals when a high-priority communication device is not using the common frequency band.

Further, JP-A 2004-336387 discloses a technique which can protect one radio communication system against interference from other radio communication systems operating on a frequency band which is the same as that of the foregoing communication system, and which can promote efficient use of a time-domain of entire radio communication systems.

With the foregoing radio communication systems, when detecting, based on a carrier sensing, a radio station which does not belong to a radio communication system of the base station, the base station allocates a dummy signal in an inter-frame space of the data signal transmission-reception frame. Therefore, the base station may adversely affect the reception or transmission of the data signal in other radio communication systems.

Further, since the dummy signal is allocated to the interregnum of the data signal transmission-reception frame, no data signals can be transmitted in other radio communication systems. This will lead to reduced utility efficiency of a shared frequency band.

The present invention has been contemplated in order to overcome problems of the related art, and is intended to provide a communication device, a radio communication method in which a plurality of communication systems share one frequency band, and one communication system does not interfere with radio communications of the other communication systems, and a radio communication program which is applied to carry out the radio communication.

SUMMARY OF THE INVENTION

The present invention has been contemplated in order to overcomes problems of the related art, and is intended to provide a radio communication device, a radio communication method and a radio communication program, all of which assure reliable radio communications between a plurality of radio communications systems sharing the same frequency channel, and protect the radio communication system against interferences between them.

According to a first aspect of the embodiment of the invention, there is provided a terminal station radio communication device belonging to a second radio communication system which shares a frequency channel with a first radio communication system and in which a radio terminal station communicates with a radio base station in a predetermined transmission time period using a predetermined frequency channel. The terminal station radio communication device includes: a transmission power determining unit which sets up signal transmission power, the signal transmission power being used for communications between radio communication devices belonging to the second radio communication system, and being determined such that reception power at the radio base station is below a predetermined threshold; a synchronizer enabling the radio terminal station to acquire timing information to start signal transmission; and a signal transmitter starting transmitting the signal at the timing represented in the timing information and terminating the signal transmission within a predetermined time period.

In accordance with a second aspect of the embodiment, there is provided a base station radio communication device belonging to a second radio communication system which shares a frequency channel and communicates with a first radio communication system and in which a radio terminal station communicates with a radio base station using a predetermined frequency channel within a predetermined transmission time period. The base station radio communication device includes: an announcement information receiver receiving announcement information from the radio base station; a reception power meter measuring reception power of the announcement information; and a reception sensitivity information memory which stores information concerning reception sensitivity of the radio base station.

According to a third aspect of the embodiment, there is provided a terminal station radio communication device belonging to a second radio communication system which shares the same frequency channel with a first radio communication system and in which a radio terminal station communicates with a radio base station using a predetermined frequency channel within a predetermined transmission time period. The terminal station radio communication device includes: an announcement information receiver receiving announcement information from the radio base station; a reception power meter measuring power for receiving the announcement information; and a reception sensitivity memory storing information concerning reception sensitivity of the radio base station.

According to a fourth aspect of the embodiment, there is provided a terminal station radio communication device belonging to a second radio communication system which shares the same frequency channel with a first radio communication system and in which a radio terminal station communicates with a radio base station using a predetermined frequency channel within a predetermined transmission time period. The terminal station radio communication device includes: an announcement information receiver receiving announcement information from the radio base station; a reception power meter measuring power for receiving the announcement information; and a reception sensitivity memory storing information concerning reception sensitivity of the radio base station.

According to a fifth aspect of the embodiment, there is provided a radio communication device belonging to a second radio communication system which shares a frequency channel with a first radio communication system and in which a radio terminal station communicates with a radio base station using a predetermined frequency channel within a predetermined transmission time period. the radio communication device includes: a first signal transmitter-receiver unit transmitting and receiving signals for the first radio communication system; a transmission power determining unit determining transmission power in order that signal power is equal to or smaller than a carrier sense level during an inter-frame space of the first radio communication system at the radio terminal stations and the radio base station belonging to the first radio communication system; an inter-frame space determining unit determining an inter-frame space on the basis of an output of the first signal transmitter-receiver unit; and a second signal transmitter-receiver unit sending a signal of the second communication system during the inter-frame of the first radio communication system.

In accordance with a sixth aspect of the embodiment, there is provide a radio communication device belonging to a second radio communication system which shares a frequency channel with a first radio communication system and in which a radio terminal station communicates with a radio base station using a predetermined frequency channel within a predetermined transmission time period. The radio communication device includes: a first signal transmitter-receiver unit transmitting and receiving signals for the first radio communication system; a memory storing information concerning allowable interference levels of radio terminal stations and radio base station belonging to the first radio communication system; a control unit determining a signal transmission period on the basis of header information included in a packet received from the radio terminal station and base station belonging to the first radio communication system; a transmission power determining unit determining transmission power in order that signal power at the radio terminal station and radio base station is equal to or smaller than an allowable interference level of the first radio communication system at the radio terminal station and the radio base station; and a second signal transmitter-receiver unit sending a signal of the second radio communication system in a transmission time period determined by the control unit and using transmission power determined by the transmission power determining unit.

According to a seventh aspect of the embodiment, there is provided a radio communication method carried out by a radio communication device belonging to a second radio communication system which shares a frequency channel with a first radio communication system and in which a radio terminal station communicates with a radio base station in a predetermined time period using a predetermined frequency channel. The radio communication method includes: setting up signal transmission power which is used for communications between radio communication devices belonging to the second radio communication system, the transmission power being determined such that reception power at the radio base station is below a predetermined threshold; acquiring timing information for radio terminal station to start signal transmission; and starting the signal transmission at the timing included in the timing information and using the signal transmission power, and completing the signal transmission within a predetermined time period.

In accordance with an eighth aspect of the embodiment, there is provided a radio communication method carried out by a radio communication device belonging to a second radio communication system which shares a frequency channel with a first radio communication system and in which a radio terminal station communicates with a radio base station in a predetermined time period using a predetermined frequency channel. The radio communication method lets the radio communication device transmit and receive announcement information from the radio base station, measure reception power of the announcement information and store information concerning reception sensitivity of the radio base station.

According to a ninth aspect of the embodiment, there is provided a radio communication method carried out by a radio communication device belonging to a second radio communication system which shares a frequency channel with a first radio communication system and in which a radio terminal station communicates with a radio base station in a predetermined time period using a predetermined frequency channel. The radio communication method lets the radio communication device receive announcement information from the radio base station; measure reception power of the announcement information, store information concerning reception sensitivity of the radio base station; perform reconfigurable processing for changing contents of processes or internal configuration depending upon a type of the first communication system; store information concerning contents of processes; and observe traffic in the second radio communication system. The contents of processes and internal configuration of the reconfigurable processing are changed in accordance with system type changing information of the first radio communication system included the announcement information sent by another radio communication device belonging to the second radio communication system.

According to a tenth aspect of the embodiment, there is provided a radio communication method carried out by a terminal station radio communication device belonging to a second radio communication system which shares a frequency channel with a first radio communication system and in which a radio terminal station communicates with a radio base station in a predetermined time period using a predetermined frequency channel. The radio communication method lets the radio communication device transmit and receive signals for the first radio communication system; determine transmission power such that signal power at the radio terminal stations and radio base stations belonging to the first radio communication system is equal to or less than a carrier sense level in an inter-frame space of the first radio communication system; determine the inter-frame space of the first radio communication system on the basis of the signal power; and send a signal for the second radio communication system in the inter-frame space.

In accordance with an eleventh aspect of the embodiment, there is provided a radio communication method carried out by a terminal station radio communication device belonging to a second radio communication system which shares a frequency channel with a first radio communication system and in which a radio terminal station communicates with a radio base station in a predetermined time period using a predetermined frequency channel. The radio communication method lets the radio communication device transmit and receive signals for the first radio communication system; store allowable interference levels of the radio terminal stations and radio base station belonging to the first radio communication system; determine a signal transmission period on the basis of header information listed in a packet which is transmitted by the radio terminal station and radio base station; determine transmission power in order that signal power at the radio terminal stations and radio base station belonging to the first radio communication system is equal to or less than an allowable interference level of the first radio communication system; and transmit a signal for the second radio communication system in the signal transmission period and using the transmission power.

BRIEF DESCRIPTION OF THE SEVERAL VIEWS OF THE DRAWINGS

Like or corresponding parts are denoted by like or corresponding reference numbers.

FIG. 30 shows the relationship between transmission power and distances between radio communication base devices, the relationship being stored in a memory of the radio communication devices;

FIG. 50 shows transmission losses of the radio communication device in response to transmission power information in the twelfth embodiment of the invention;

FIG. 60 is a table showing the relationship between transmission rates stored in a memory of the radio communication device (shown in FIG. 53) and allowable inference levels of the radio communication device with respect to selected transmission rates;

FIG. 61 shows one example of formats of data frames to be sent by the radio communication device 4 in the thirteenth embodiment;

FIG. 62 shows one example of formats of acknowledge (Ack) frames to be sent by a communication device in the thirteenth embodiment;

DETAILED DESCRIPTION OF THE INVENTION

The invention will be described with reference to examples shown on the accompanying drawings.

First Embodiment

[Outline of Communication System]

Figure 1:
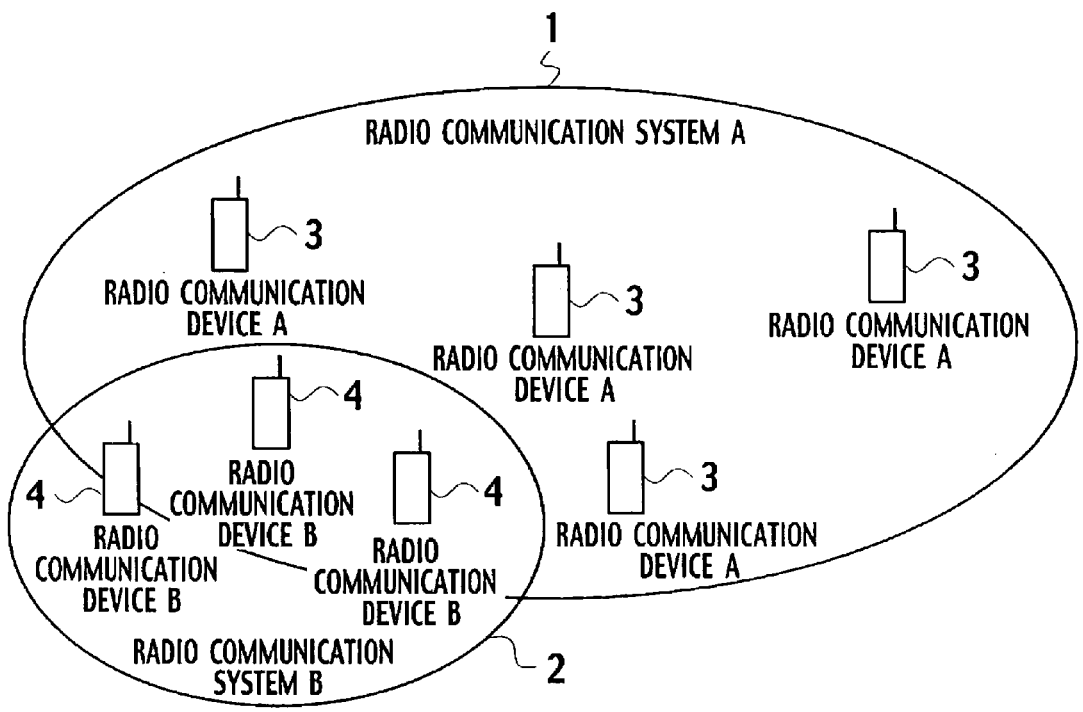
FIG. 1 is a block diagram of radio communication devices constituting a radio communication system in a first embodiment of the invention.

FIG. 1 schematically shows an example of a configuration of a radio communication system 2 (second radio communication system B), which is constituted by a plurality of communication devices 4 (radio communication devices B). The radio communication system and radio communication device will be called the "communication system", and "communication device" hereinafter.) The communication system 2 shares a frequency band with a communication system 1 (first communication system A) constituted by a plurality of communication devices 3 (or A).

The communication system 1 operates on the W-CDMA (wide band division multiple access), PDC (personal digital cellular), GSM (global system for mobile radio communication), MAN (metropolitan area network) such as IEEE802.16e, or LAN such as IEEE802.11. At present, the communication system 2 does not operate on a standard system, which will be specified to be the standard system in future. The communication devices B shares a frequency band with the communication system 1. The communication system 1 uses the frequency band in preference to the communication system 2. Therefore, the communication devices 4 in the communication system 2 should not interfere with the radio communications conducted by the communication system 1. Therefore, the communication devices 3 belonging to the communication system 1 and the communication devices 4 belonging to the communication system 2 are classified into base stations and terminal stations as shown in FIG. 1.

Figure 2:
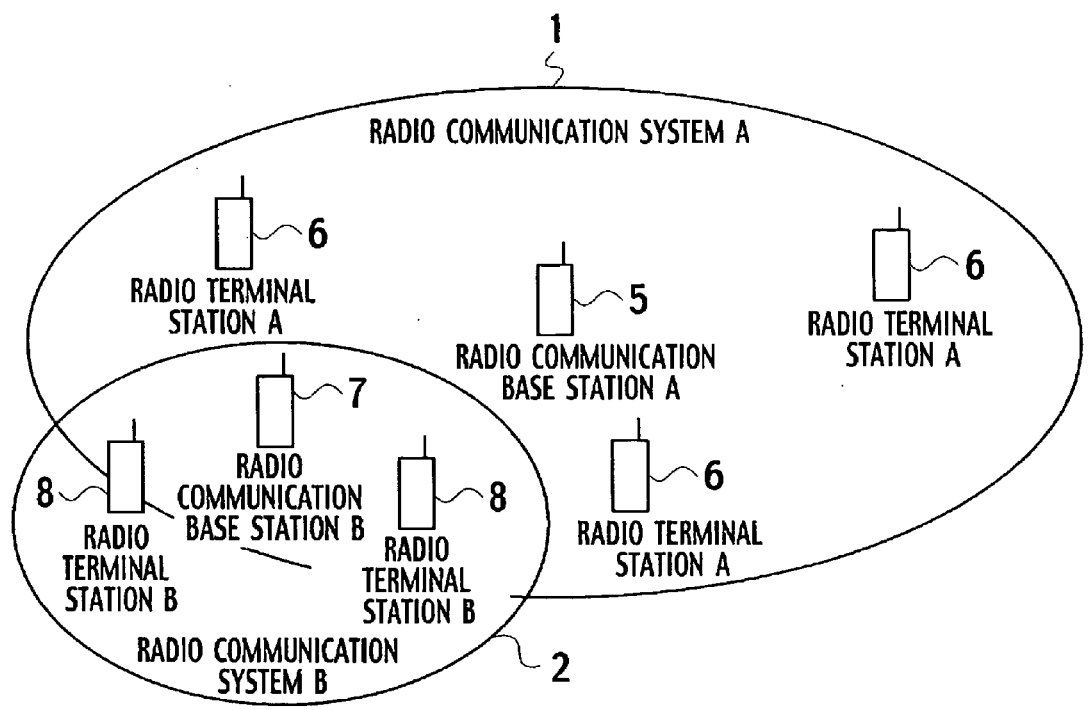
FIG. 2 is a block diagram of a further configuration of radio communication devices constituting a radio communication system in the first embodiment of the invention.

In a communication system shown in FIG. 2, communication devices 3 belonging to the communication system 1 are divided into a base station 5 (base station A) and terminal stations 6 (terminal stations A). Further, communication devices 4 belonging to the communication system 2 is divided into a terminal station 7 (base station B or base station communication device 7) and terminal stations 8 (terminal stations B or terminal station communication devices 8).

Figure 3:
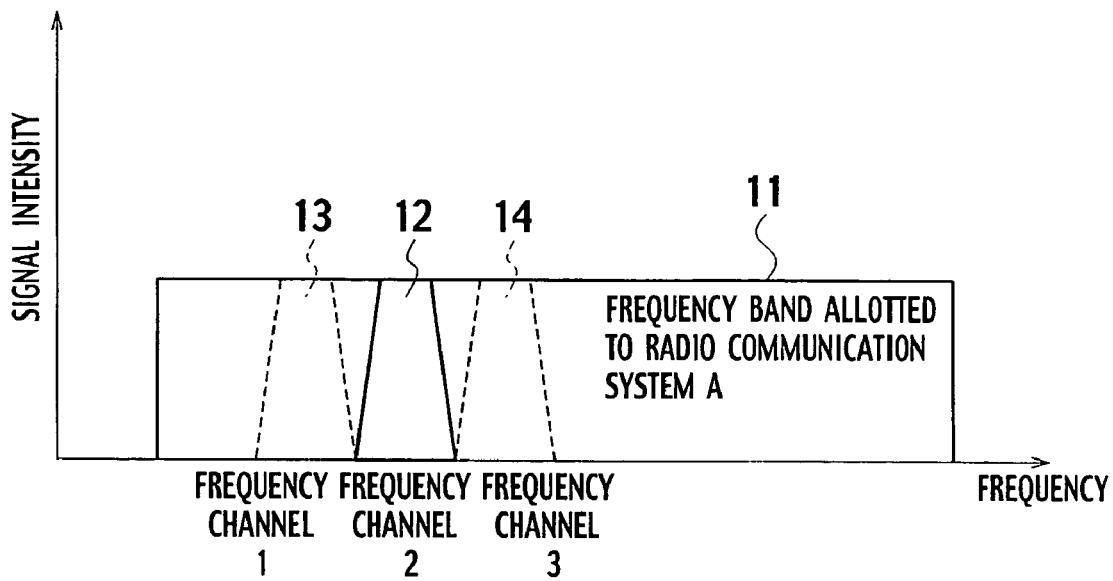
FIG. 3 is a graph showing the relationship between frequency bands and signal intensity in the first embodiment of the invention.

As shown in FIG. 3, a frequency band 11 is allocated to the communication system 1. A frequency channel 12 is used by cells of the communication system 1 while frequency channels 13 and 14 are used for other cells of the communication system 1 (not shown). The communication devices 4 of the communication system 2 share the frequency channel 12 with the communication system 1. The communication system 1 uses the frequency channel 12 with priority over the communication system 2. In other words, the communication system 2 performs radio communications while no communication devices 3 of the communication system 1 transmit signals, or the communication system 2 uses transmission power which does not reach the communication devices 3.

Further, when detecting a communication device 3 in the vicinity, and when the frequency channel 12 is found to be busy, the communication devices 4 of the communication system 2 will use another frequency channel. For instance, a frequency channel 13 or 14 will be used for the communication devices 4.

In the first embodiment, the same frequency band is commonly used by the communication systems 1 and 2. The number of communication systems sharing the same frequency band is not always limited. Alternatively, the communication system 2 can share a frequency band of a communication system C (or D) which is different from the communication system 1. In such a case, the communication system 2 can use the frequency band with lower priority over the communication systems C and D. For instance, it is assumed that the communication system 2 performs communications using the frequency band allotted to the communication system 1. The communication system 2 can share the frequency band of the communication system C whenever an amount of information to be transmitted is increased.

The communication system 2 shown in FIG. 1 and FIG. 2 is assumed to share the frequency channel 12 with the communication system 1.

[Configuration and Operation of Communication Device]

Figure 4:
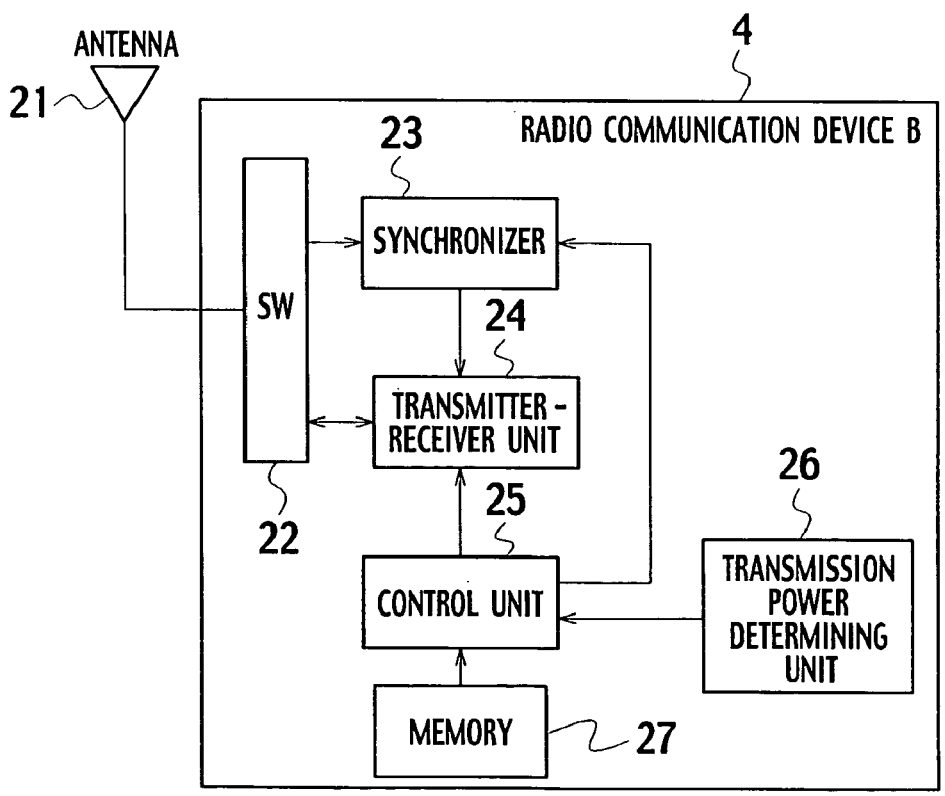
FIG. 4 is a schematic diagram of the radio communication device shown in FIG. 1 or FIG. 2.

As shown in FIG. 4, each communication device 4 of the communication system 2 includes an antenna 21, a switch 22, a synchronizer 23, a transmitter-receiver unit 24, a control unit 25, a transmission power determining unit 26, and a memory 27.

Figure 5:
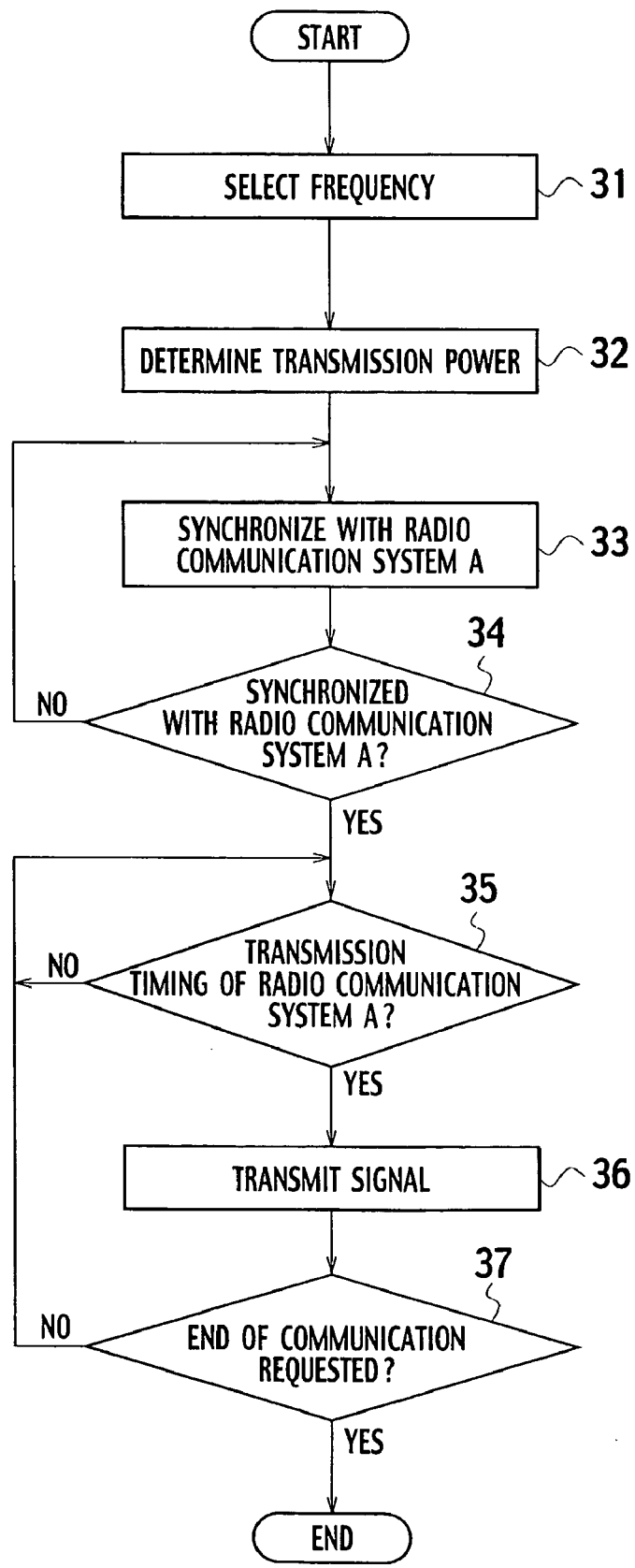
FIG. 5 is a flowchart of data transmission conducted by the radio communication device shown in FIG. 4.

The communication device 4 transmits data in accordance with sequence shown in FIG. 5. First of all, the control unit 25 selects a frequency at which the communication device 4 is operable (step 31). The selected frequency is notified to the synchronizer 23 and the transmitter-receiver unit 24. In step 32, signal transmitting power is determined such that reception power of the communication system 3 is equal to or smaller than a preset threshold. The "preset threshold" is equal to a noise level or the like at which noises are caused in the communication system 3, but does not adversely affect signal transmission or reception of the communication device 3.

Once the transmission power is determined, the transmission power determining unit 26 informs the control unit 25 of the determined transmission power. The control unit 25 then outputs a determination signal to the synchronizer 23. In response to the received signal, the synchronizer 23 acquires information on a timing to start signal transmission (step 33). When synchronized with the communication system 1, the synchronizer 23 informs the transmitter-receiver unit 24 of the signal transmission timing of the communication device 3 (step 34). The transmitter-receiver unit 24 transmits data using the transmission power obtained from the transmission power determining unit 26 and at the signal transmission timing obtained from the synchronizer 23 (step 35). In this case, the data transmission is conducted during a time period which is stored in the memory 27 and in which terminal stations of a target communication system are sending a string of signals (step 36). The communication device 4 stops operating in response to a communication end request from a user and so on (step 37). Otherwise, the communication device 4 repeats radio communications. The foregoing and following communication operations are executed in accordance with a communication program stored in the memory 27 (or a memory built-in the control unit 25, but not shown).

[Specific Operations of Communication System and Communication Device]

Figure 57:
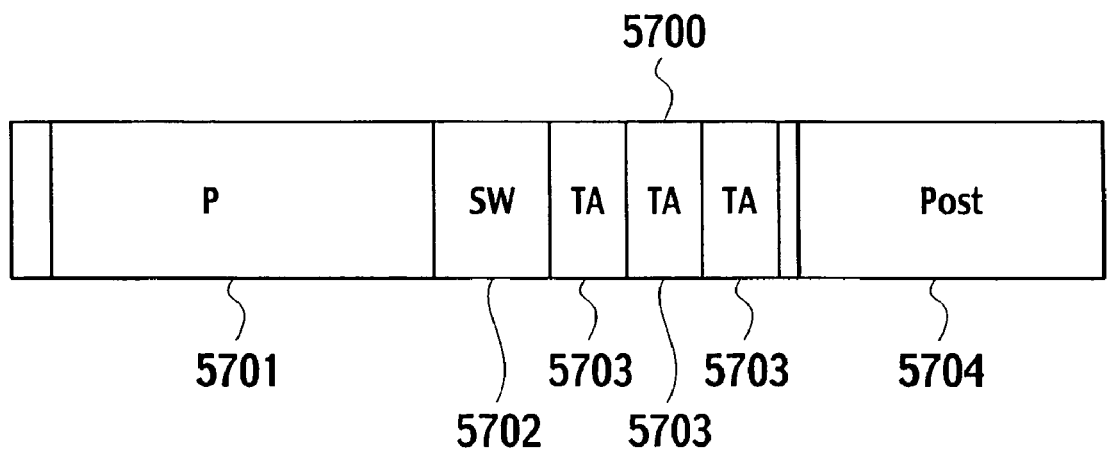
FIG. 57 shows a format of a downlink synchronized signal of the radio communication system in the first example of the invention.

It is assumed that the communication system 1 adopts the PDC (personal digital cellular) system. FIG. 57 shows a format 5700 of a downlink signal transmitted by the base station 5 (FIG. 2). The format 5700 is composed of a pilot (P) 5701 of a well-known signal string, a synchronizing word (SW) 5702 of a well-known signal string, a time adjusting value (TA) 5703, and a post amble (POST) 5704.

Figure 58:
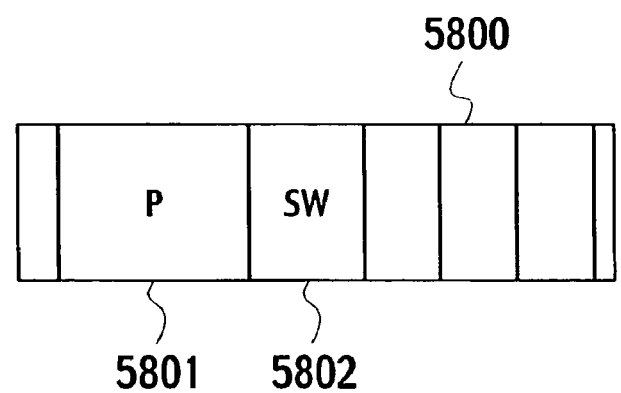
FIG. 58 shows a format of an uplink synchronized signal of the radio communication system in the first embodiment of the invention.

Further, FIG. 58 shows a format 5800 of the uplink synchronizing signal transmitted by the terminal station 6. The format 5800 is constituted by a pilot (P) 5801 of a well-known signal string, and a synchronizing word (SW) 5802 of a well-known signal string.

Figure 59:
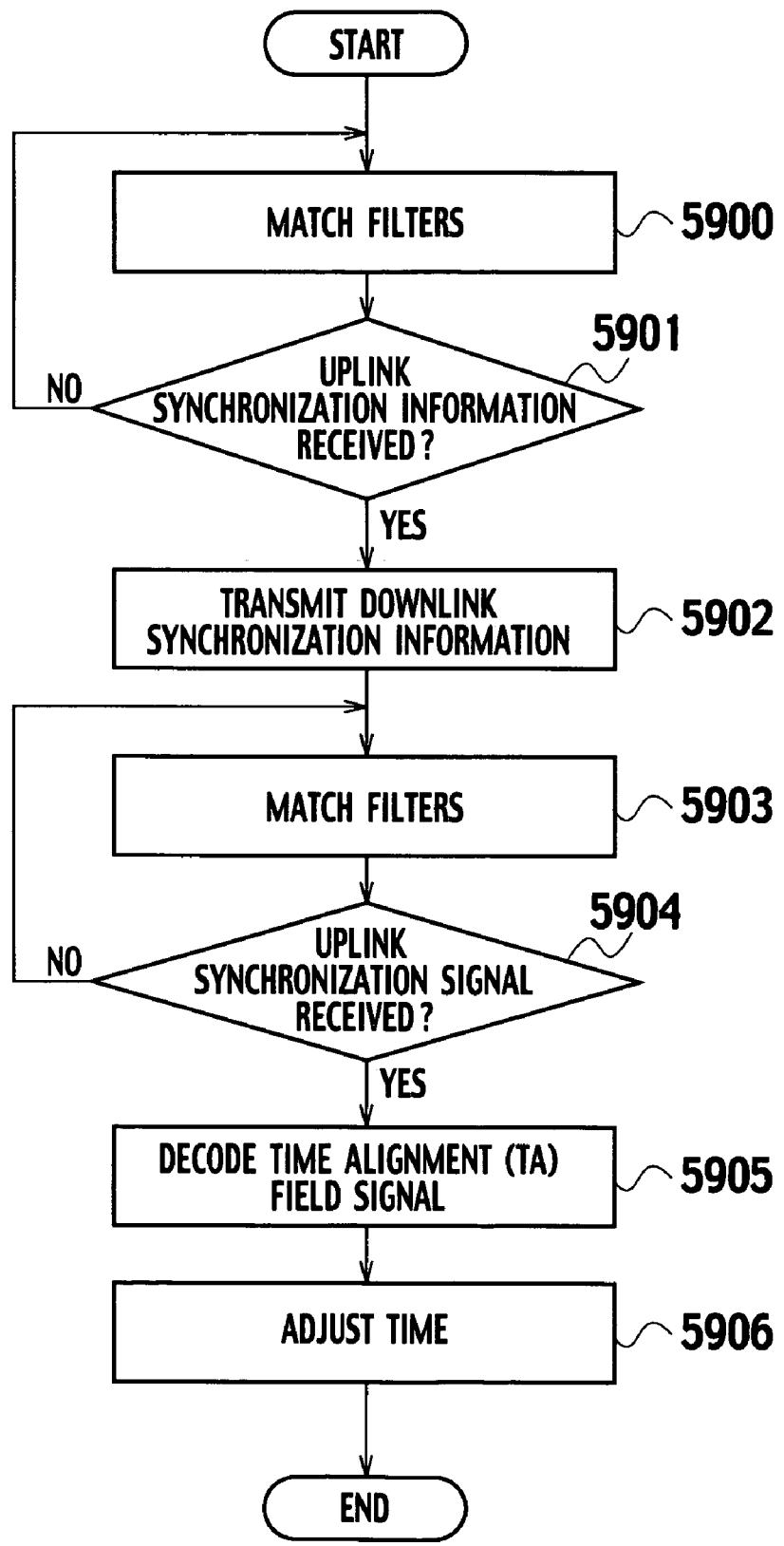
FIG. 59 is a flowchart showing operations of the radio communication system and the radio communication device in the first example of the invention.

FIG. 59 shows a specific example in which the communication device 4 (shown in FIG. 1) of the communication system 2 or the communication device 7 or 8 of the communication system 2 are synchronized.

The communication device 4 uses one of the downlink synchronization signals (i.e., the pilot 5701, synchronizing word 5702, or post amble 5704), matches filters (step 5900), and checks whether or not a filter matching output is above a threshold. Thereafter, the communication device 4 checks whether or not the downlink signal arrives from the base station 5 belonging to the communication system (PDC system) 1 (step 5901). If no downlink signal 5700 is received, the communication device 4 repeats the filter matching (step 5900). When the downlink synchronizing signal 5700 is received, the communication device 4 transmits the uplink synchronizing signal 5800 (step 5902). After transmitting the uplink synchronizing signal 5800, the communication device 4 performs the filter matching (5903), and checks whether or not the filter matching output is equal to or larger than a threshold as in step 5901. Further, it is checked whether or not a downlink synchronizing signal 5700 is received from the communication device 5 of the communication system 1 (step 5904). If no downlink synchronizing signal 5700 is received, the communication device 4 repeats the filter matching (step 5903). When the downlink synchronizing signal 5700 is received, a time adjusting value (TA) of the downlink synchronizing signal 5700 is decoded (step 5905), and timing for sending the uplink signal is adjusted (step 5906).

Figure 6:
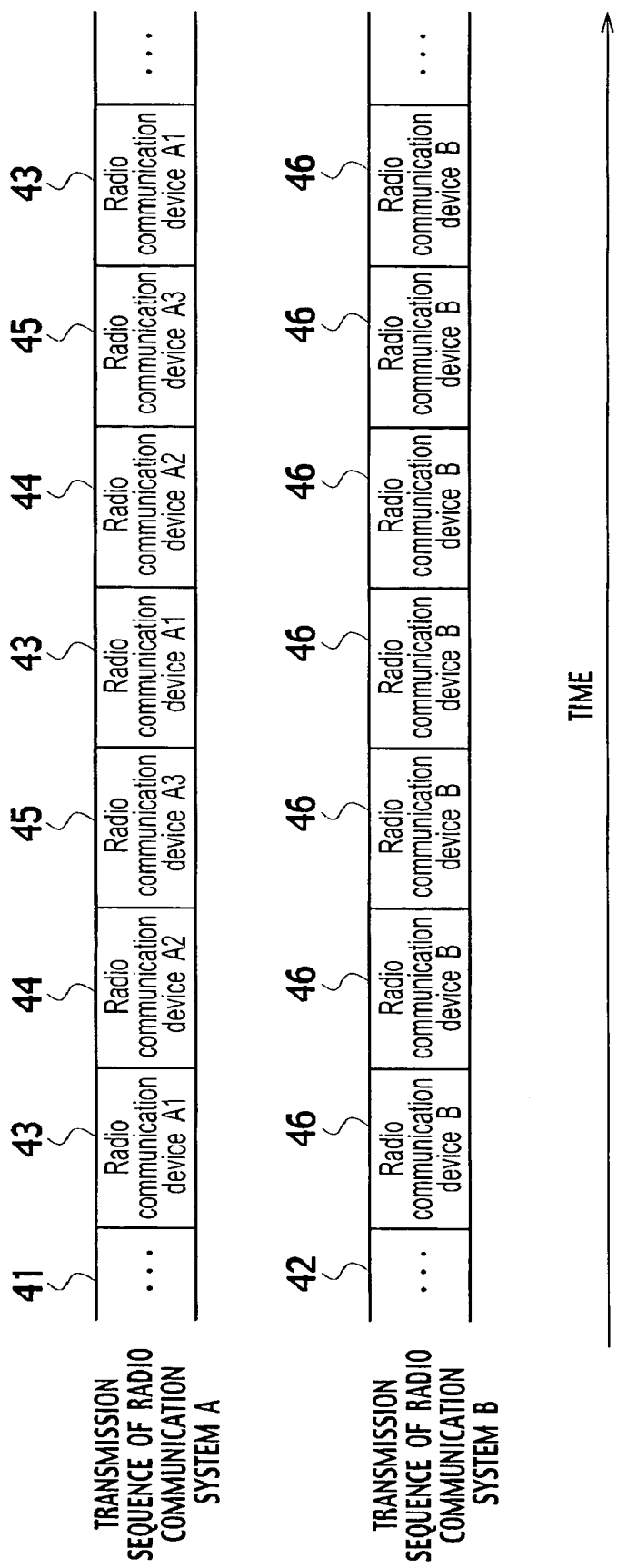
FIG. 6 is a timing chart of one example of a transmission sequence between communication devices when the communication system adopts TDMA (time division multiple access) in the first embodiment.

It is assumed here that the communication system 1 adopts the time division multiple access (TDMA). FIG. 6 is a timing chart of one example of transmission sequences between the communication device 3 of the communication system 1 and the communication device 4 of the communication system 2. Three communication devices 3 are connected on the basis of time division multiple access. Referring to FIG. 6 again, a slot 43 is allotted to the communication device 3 (A1) in the transmission sequence 41 of the communication system 1 (A); a slot 44 is allotted to the communication device 3 (A2) in the transmission sequence 41; a slot 45 is allotted to the communication device 3 (A3); and a slot 46 for enabling the communication device 4 to transmit signals in synchronization with the slots 43 to 45 is allotted to the communication device 3 (A1) to the communication device 3 (A3) as the transmission sequence 42 of the communication system 2. The slot 46 for enabling the communication device 4 to transmit signals at a time should be smaller than the slots 43 to 45 allotted to the communication device 3.

With the first embodiment of the invention, the communication devices 4 (and/or 7 and 8) of the communication system 2 can not only perform radio communications with other communication devices 4 in the same communication system 2 but also transmit signals without affecting the communication device 3 (or/and 5 and 6) of the communication system 1. Therefore, both of the communication systems 1 and 2 can communicate with each other by sharing the same frequency band. This promotes effective utilization of the frequency band.

Further, the communication device 4 belonging to the communication system 2 transmits signals at the transmission timing of the communication device 3 which belongs to the communication system 1 and has the priority over the communication device 4. Therefore, the communication device 4 can be controlled in accordance with the communication state of the communication device 3.

Second Embodiment

Figure 7:
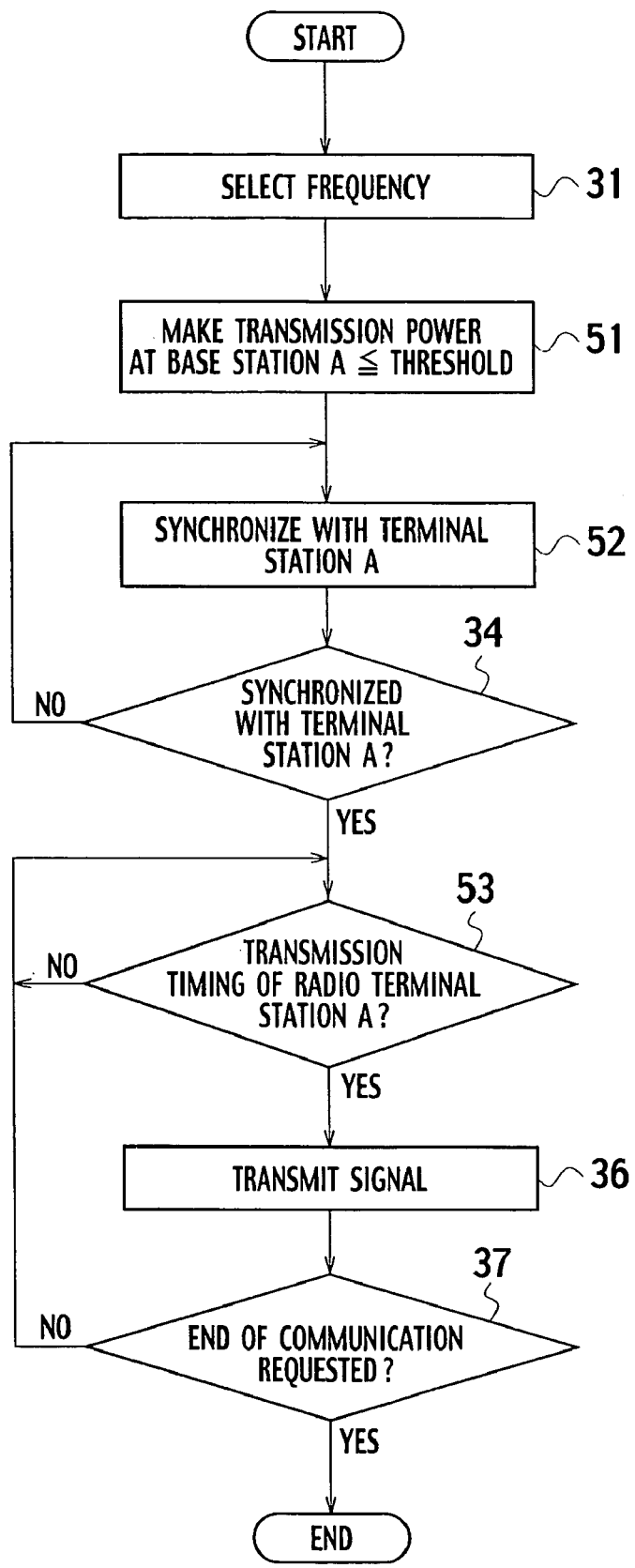
FIG. 7 is a flowchart showing operations of a radio communication device constituting a radio communication system in a second embodiment of the invention.

A second embodiment relates to modified modifications of the first embodiment. The operations are executed in accordance with the flowchart in FIG. 7.

With the communication device 4 shown in FIG. 4, the control unit 25 selects a frequency at which the communication device 4 operates (step 31), and notifies the selected frequency to the synchronizer 23 and the transmitter-receiver unit 24. The transmission power determining unit 26 determines transmission power which enables radio communication with other communication devices 4 of the communication system 2. The transmission power is determined such that reception power of a signal is equal to or smaller than a predetermined threshold (step 51). The predetermined threshold denotes a value equivalent to a noise level or the like, and does not affect the signal transmission and reception of the base station 5 (see FIG. 2). The transmission power determining unit 26 selects transmission power, and outputs it to the control unit 25. Receiving the transmission power, the control unit 25 outputs a determination completion signal to the synchronizing unit 23. In response to the determination completion signal, the synchronizing unit 23 receives a signal from the base station 5 or the terminal station 6, and acquires timing information for the terminal station 6 to send a signal (step 52). The synchronizer 23 is synchronized with the communication system A1 (step 34), and outputs the signal transmission timing of the terminal station 6 to the transmitter-receiver unit 24 (step 53). In conformity with the signal transmission timing received from the synchronizer 23, the transmitting-receiving unit 24 transmits data using the transmission power obtained from the transmission power determining unit 26 (step 36). In this step, signal transmission is executed during a time period in which the terminal stations belonging to a target communication system send a string of signals. The communication operations are terminated in response to a communication end request from a user or the like (step 37). Otherwise, the operations in step 35 and succeeding steps will be repeated.

[Example in which Communication System Adopts TDMA and TDD]

Figure 8:
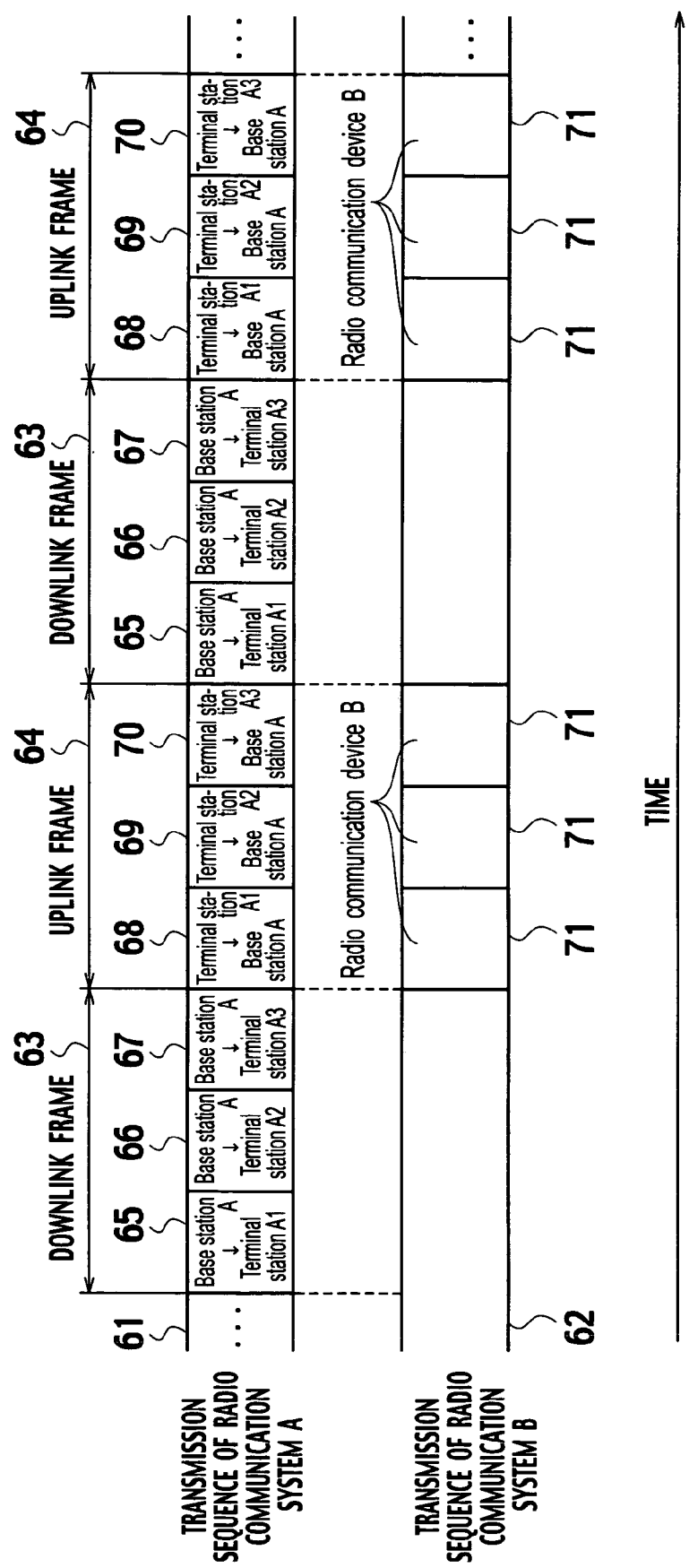
FIG. 8 is a timing chart of one example of a transmission sequence between radio communication devices when the radio communication system adopts TDMA and TDD in the second embodiment of the invention.

It is assumed that the communication system 1 adopts TDMA and TDD (time division duplex). FIG. 8 shows transmission sequence 61 of the base station 5 and terminal stations 6 belonging to the communication system 1, and transmission sequence 62 of the communication device 4 belonging to the communication system 2. In this case, three terminal stations 6 are connected by TDMA. Since the communication system 1 adopts the TDD, a downlink frame 63 in which the base station 5 sends the signal to the terminal station 6, and an uplink frame 64 in which the terminal station 6 sends the signal to the base station 5 are repeated one after the other.

The communication system 1 operates on the TDMA, so that the downlink frame 63 is allotted to three terminal stations 6 as users' slots 65, 66 and 67 on the time division basis. Further, the uplink frame 64 is allotted to the three terminal stations 6 as users' slots 68, 69 and 70 on the time division basis. The communication device 4 belonging to the communication system 2 uses transmission power which does not adversely affect the signal transmission and reception of the base station 5 belonging to the communication system 1. Further, in the uplink frame 64, the communication device 4 transmits a slot 71 in synchronization with the slots 68, 69 and 70 which are used by the three terminal stations 6 to transmit a string of signals to the base station 5. The slot 71 used by the communication device 4 to transmit signals at a time are designed to be smaller than the slots 68, 69 and 70 allotted to the terminal station 6.

[Example in which Communication System Adopts TDMA and FDD]

Figure 9:
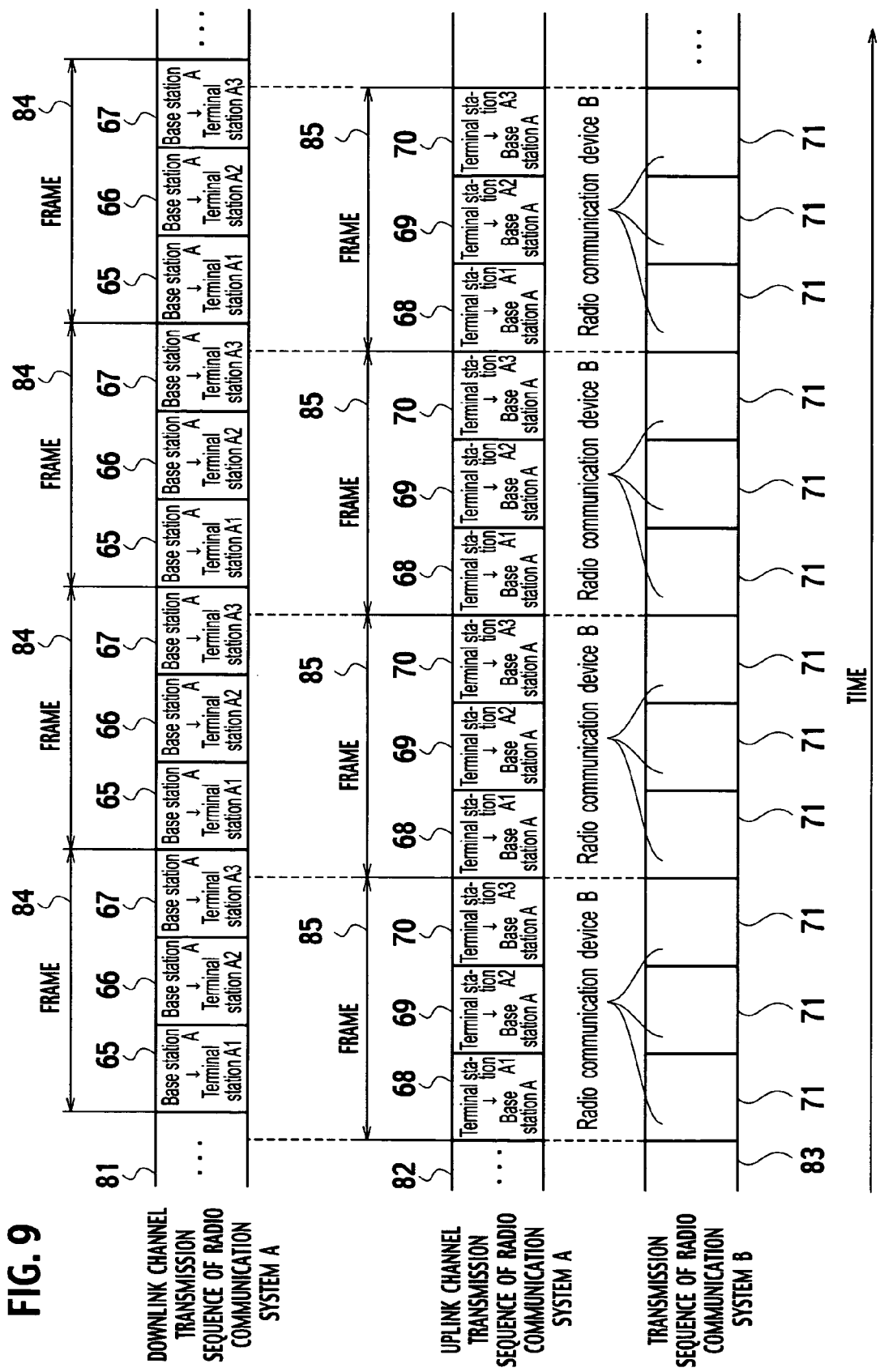
FIG. 9 is a timing chart of one example of a transmission sequence between radio communication devices when the radio communication system adopts TDMA and FDD in the second embodiment of the invention.

In an example shown in FIG. 9, the communication system 1 adopts the TDMA and FDD. FIG. 9 is a timing chart showing transmission sequence 81 of a downlink channel of the base station 5 and terminal station 6 belonging to the communication system 1; transmission sequence 82 of an uplink channel of the base station 5 and terminal station 6 belonging to the communication system 1; and transmission sequence 83 of the communication device 4 belonging to the communication system 2. In this example, three terminal stations 6 in the communication system 1 communicate with one another on the TDMA basis. Since the communication system 1 adopts the FDD, two different frequency channels are used for the transmission sequence 81 in the downlink channel, and the transmission sequence 82 in the uplink channel. The communication device 4 belonging to the communication system 2 shares the uplink channel for transmitting signals from the terminal station 6 to the base station 5. Further, since the communication system 1 adopts the TDMA, one frame 84 for the downlink channel is allotted to the three terminal stations 6 as users' slots 65, 66 and 67 on the time division basis. One frame 85 for the uplink channel is allotted to the three terminal stations 6 as users' slots 68, 69 and 70 on the time division basis.

The communication device 4 of the communication system 2 uses transmission power which does not adversely affect the signal transmission and reception of the communication device 5 of the communication system 1, and transmits the slot 71 in synchronization with the slots 68, 69 and 70 by which the three terminal stations 6 transmits a string of signals in the uplink channel to the base station 5. The slot 71 by which the communication devices 4 transmit and receive signals at a time is designed to be smaller than the slots 68, 69 and 70 allotted to the terminal stations 6.

[Example in which Communication System Adopts CDMA and FDD]

Figure 10:
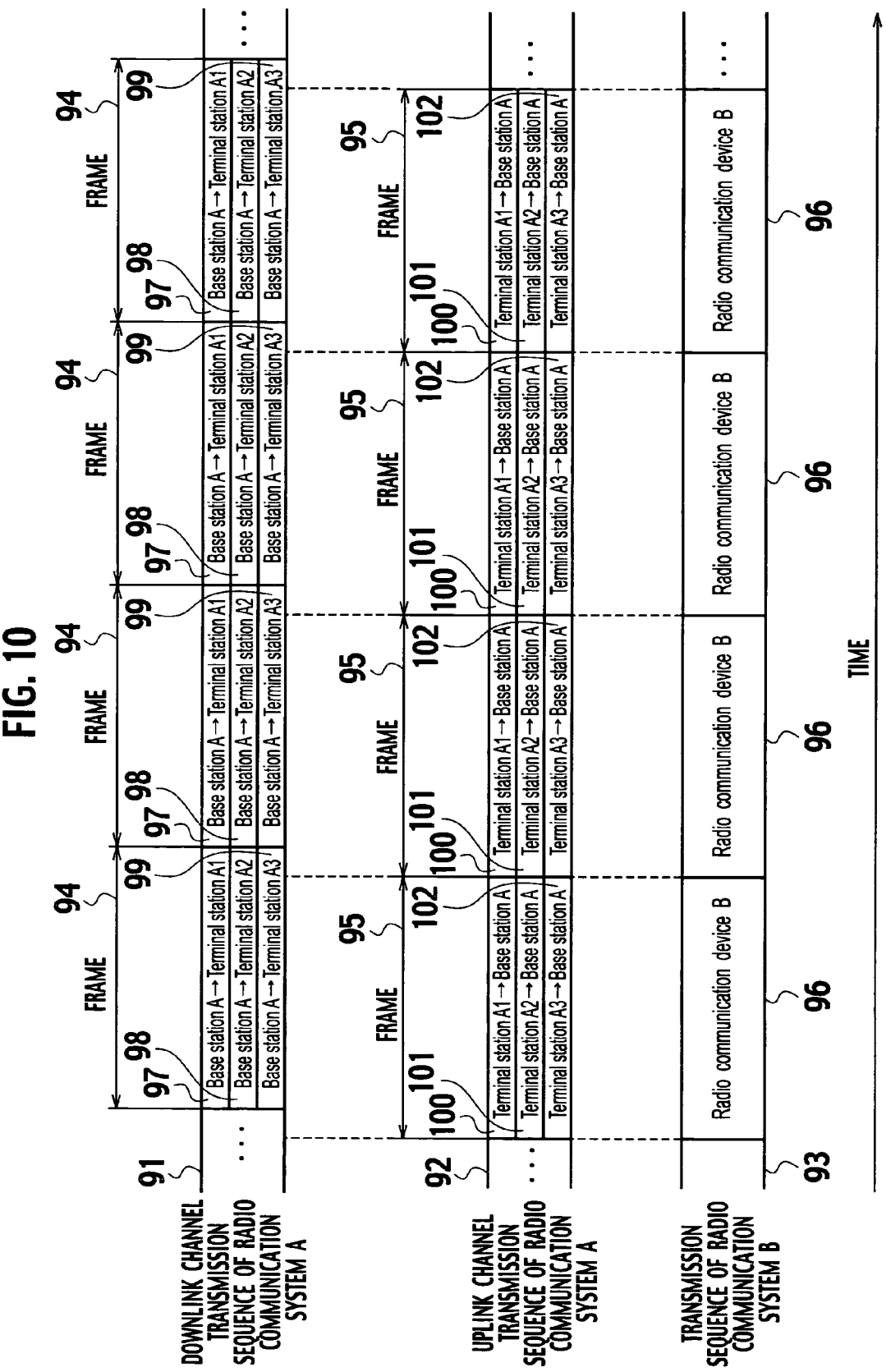
FIG. 10 is a timing chart of one example of a transmission sequence between radio communication devices when the radio communication system adopts CDMA and FDD in the second embodiment of the invention.

In an example shown in FIG. 10, the communication system 1 adopts the CDMA and FDD. FIG. 10 is a timing chart showing a transmission sequence 91 of a downlink channel of the base station 5 and terminal station 6 belonging to the communication system 1; a transmission sequence 92 of an uplink channel of the base station 5 and terminal station 6 belonging to the communication system 1; and a transmission sequence 93 of the communication device 4 belonging to the communication system 2. In this example, terminal stations 6 in the communication system 1 communicate with one another on the CDMA basis. Since the communication system 1 adopts the FDD, two different frequency channels are used for the transmission sequence 91 in the downlink channel and the transmission sequence 92 in the uplink channel.

The communication device 4 shares the uplink channel which is used by the terminal station 6 to send signals to the base station 5. Further, since the communication system 1 adopts the CDMA, one frame 94 for the downlink channel is allotted to the three terminal stations 6 as users' slots 97, 98 and 99 on the code division basis. One frame 95 for the uplink channel is allotted to the three terminal stations 6 as frames 100, 101 and 102 on the code division basis. The communication device 4 of the communication system 2 uses transmission power which does not adversely affect the signal transmission and reception of the base station 5 of the communication system 1, and transmits the frame 96 in synchronization with the frame 95 which is used for the three terminal stations 6 to transmit a string of signals. The frame 96 by which the communication device 4 transmits and receives signals at a time is designed to be smaller than the frame 95 allotted to the terminal station 6.

The communication device 4 of the communication system 2 can communicate with another communication device 4 of the communication system 2 during the uplink frames 64, 85 and 95 of the communication system 1. Further, by using transmission power which does not adversely affect the signal transmission and reception of the base station 5, the communication system 2 can share the frequency band of the communication system 1. This is effective in enlarging a radio communication area.

Third Embodiment

A third embodiment of the invention relates to a modification of the first embodiment.

[Configuration of Communication Device]

Figure 11:
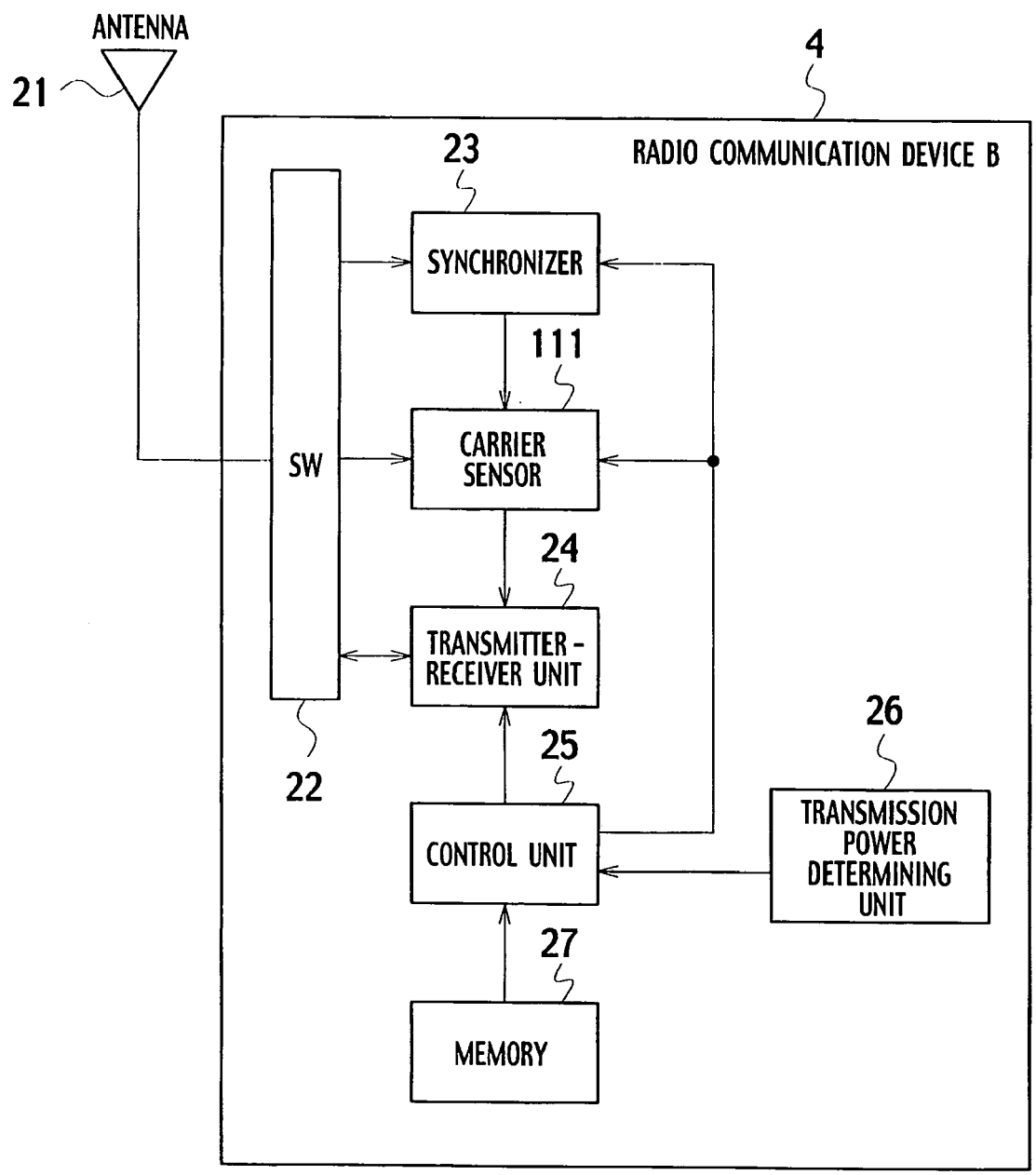
FIG. 11 is a block diagram of a radio communication device constituting a radio communication system in a third embodiment of the invention.

In this embodiment, each communication device 4 constituting the communication system 2 includes a carrier sensor 111, as shown in FIG. 11.

[Operation of Communication System and Radio Communication Device]

Figure 12:
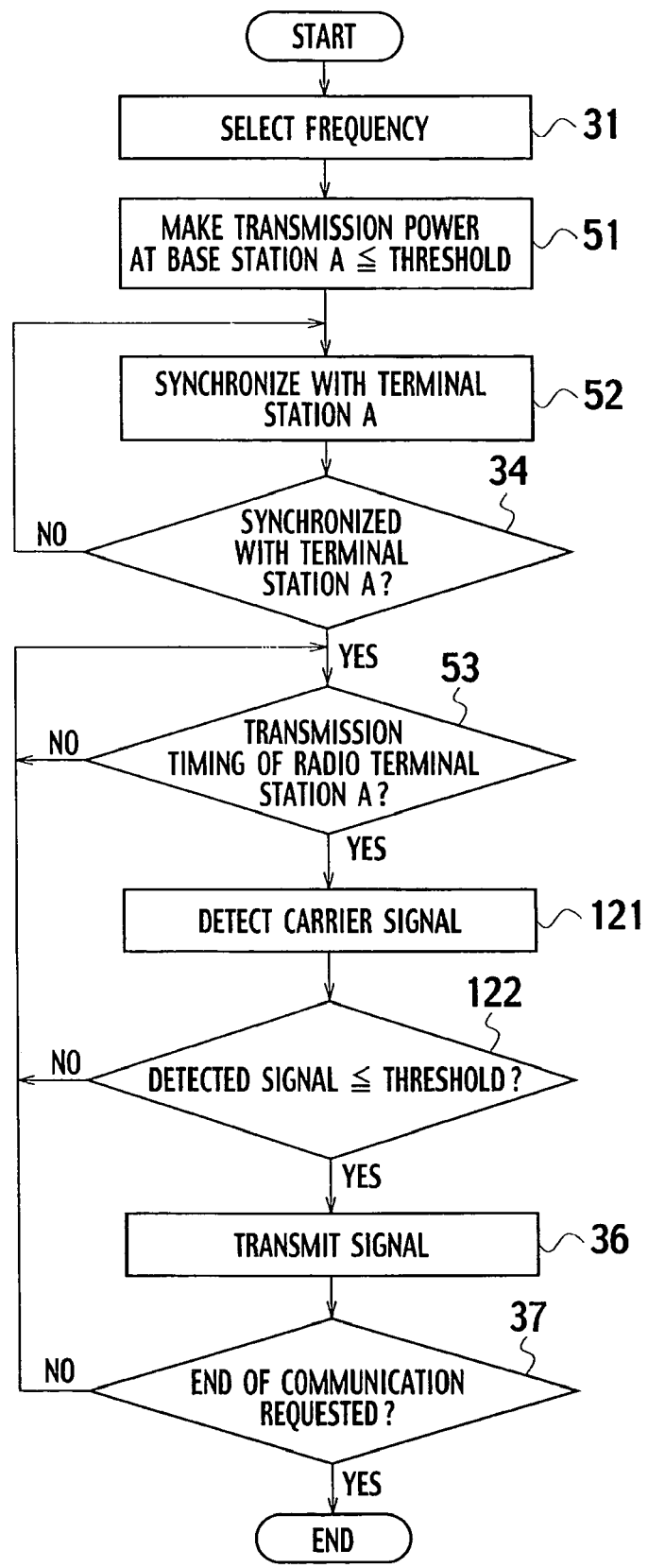
FIG. 12 is a flowchart of one example of data transmission conducted by the radio communication device of FIG. 11.

Referring to FIG. 12, the control unit 25 of the communication device 4 selects a frequency for the operation of the communication device 4 (step 31), and outputs the selected frequency to the synchronizer 23, the transmitter-receiver section 24 and the carrier sensor 111. The transmission power determining unit 26 determines signal transmission power so that radio communications can be established between communication devices 4 of the communication system 2, and so that reception power of the base station 5 of the communication system 1 is smaller than a predetermined threshold (step 51). The predetermined threshold has a level equivalent to noises of the base station 5 or the like, and does not affect the signal transmission and reception of the base station 5.

The transmission power determining unit 26 provides the determined transmission power to the control unit 25, which outputs a determination completion signal to the synchronizer 23. Receiving the signal, the synchronizer 23 receives a signal from the base station 5 or the terminal station 6, and acquires timing information concerning signal transmission of the terminal station 6 (step 52). Synchronized with the communication system 1, the synchronizer 23 (step 34) sends the foregoing timing information to the signal transmitter-receiver unit 24 and the carrier sensor 111 (step 53). In response to the timing information, the carrier sensor 111 detects a carrier signal during a short time period in which the terminal station 6 transmits a string of signals (step 121).

The carrier sensor 111 compares the detected carrier signal with the predetermined threshold (step 122), and sends a transmission start signal to the transmitter-receiver unit 24 when the detected carrier signal is equal to or less than the threshold. Otherwise, the carrier sensor 111 waits for a next transmission timing of the terminal station 6 (step 53). The threshold is assumed to be −90 dBm, for instance. If the reception power is recognized to be −93 dBm, the carrier sensor 111 determines "Absence of Carrier Signal". On the contrary, if the carrier signal is −70 dBm, the carrier sensor 111 determines "Presence of Carrier Signal". In response to the transmission start signal from the carrier sensor 111, the transmitter-receiver unit 24 transmits data using the transmission power received from the control unit 25 (step 36). In this case, the transmitter-receiver unit 24 transmits the data while the terminal stations belonging to a target communication system send a string of signals. When a radio communication end request is issued by a user or the like, the current radio communication is terminated (step 37). If not, the procedures following step 53 will be repeated.

[Example in which Communication System Adopts TDMA and TDD]

Figure 13:
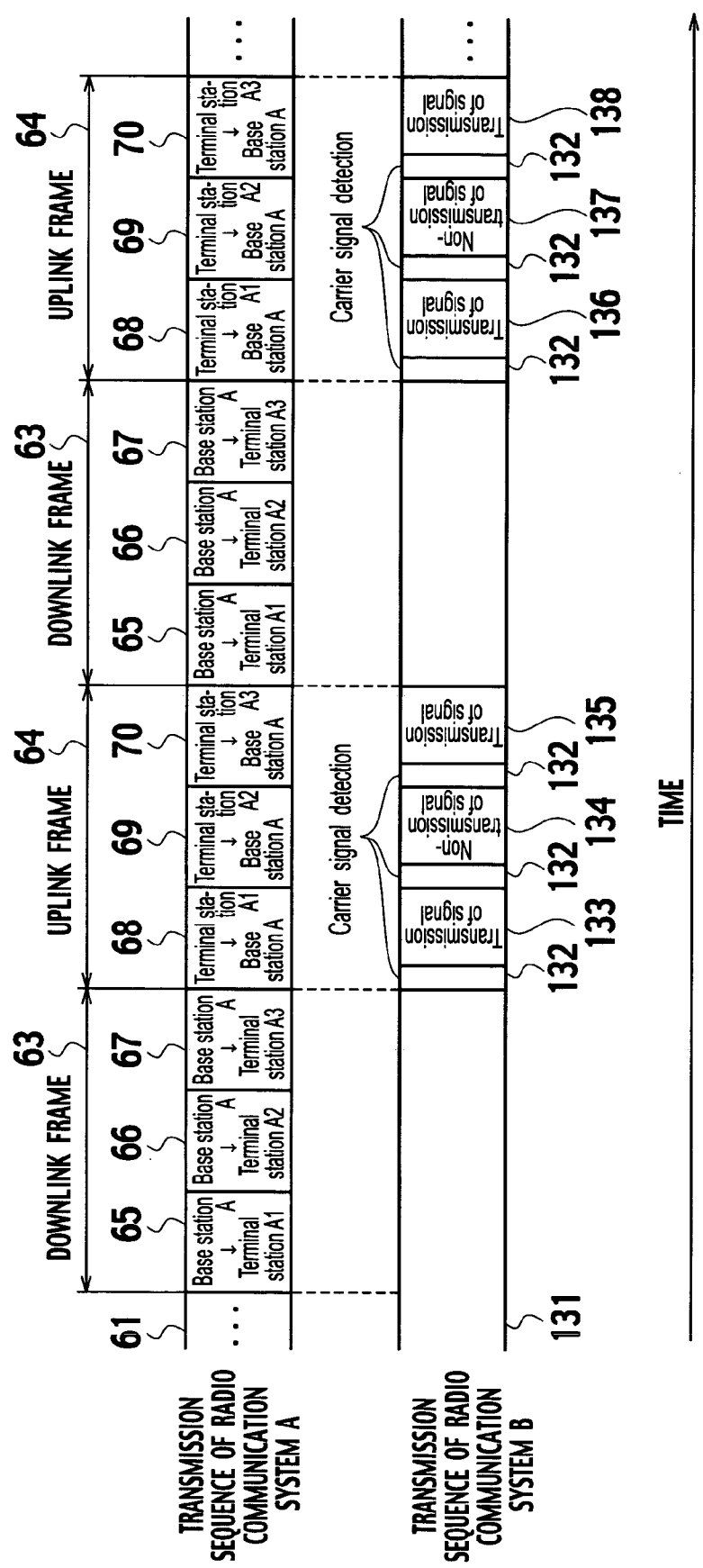
FIG. 13 is a timing chart of one example of transmission sequence between radio communication devices when the radio communication system adopts TDMA and FDD in the third embodiment of the invention.

It is assumed that the communication system 1 adopts the TDMA and TDD (time division duplex). FIG. 11 shows transmission sequence 61 of the base station 5 and terminal stations 6 belonging to the communication system 1, and transmission sequence 62 of the communication device 4 of the communication system 2. FIG. 13 shows transmission sequence 131 of the communication device 4 of the communication system 2. In this case, three terminal stations 6 of the communication system 1 are connected by the TDMA.

Since the communication system 1 adopts the TDD, a downlink frame 63 in which the base station 5 sends the signal to the terminal station 6 and an uplink frame 64 in which the terminal station 6 sends the signal to the base station 5 are repeated one after the other. Further, the communication system 1 operates on the TDMA, so that the downlink frame 63 is allotted as users' slots 65, 66 and 67 to three terminal stations 6 on the time division basis. Further, the uplink frame 64 is allotted as users' slots 68, 69 and 70 to the three terminal stations 6 on the time division basis.

The communication device 4 belonging to the communication system 2 uses transmission power which does not adversely affect the signal transmission and reception of the base station 5 belonging to the communication system 1.

Further, carrier detection 132 is conducted for a short time period from the signal transmission start timing of the three terminal stations 6 to send a string of signals to the base station 5 till the slots 68, 69 and 70 in the uplink frame 64. The communication system 4 transmits a signal in the slots 133, 135, 136 and 138 where the absence of carrier signal is confirmed. No signal transmission is conducted in the slot 134 or 137 where the presence of carrier signal is confirmed. This is because the terminal station 6 (A2) of the communication system 1 exists near the communication device 4, and detects the signal to the terminal station 5. This state is recognized to represent the presence of carrier signal. Refer to FIG. 13. The slots 133, 135, 136 and 138 used by the communication device 4 to transmit signals at a time are designed to be smaller than the slots 68, 69 and 70 allotted to the terminal station 6.

[Example in which Communication System Adopts TDMA and FDD]

Figure 14:
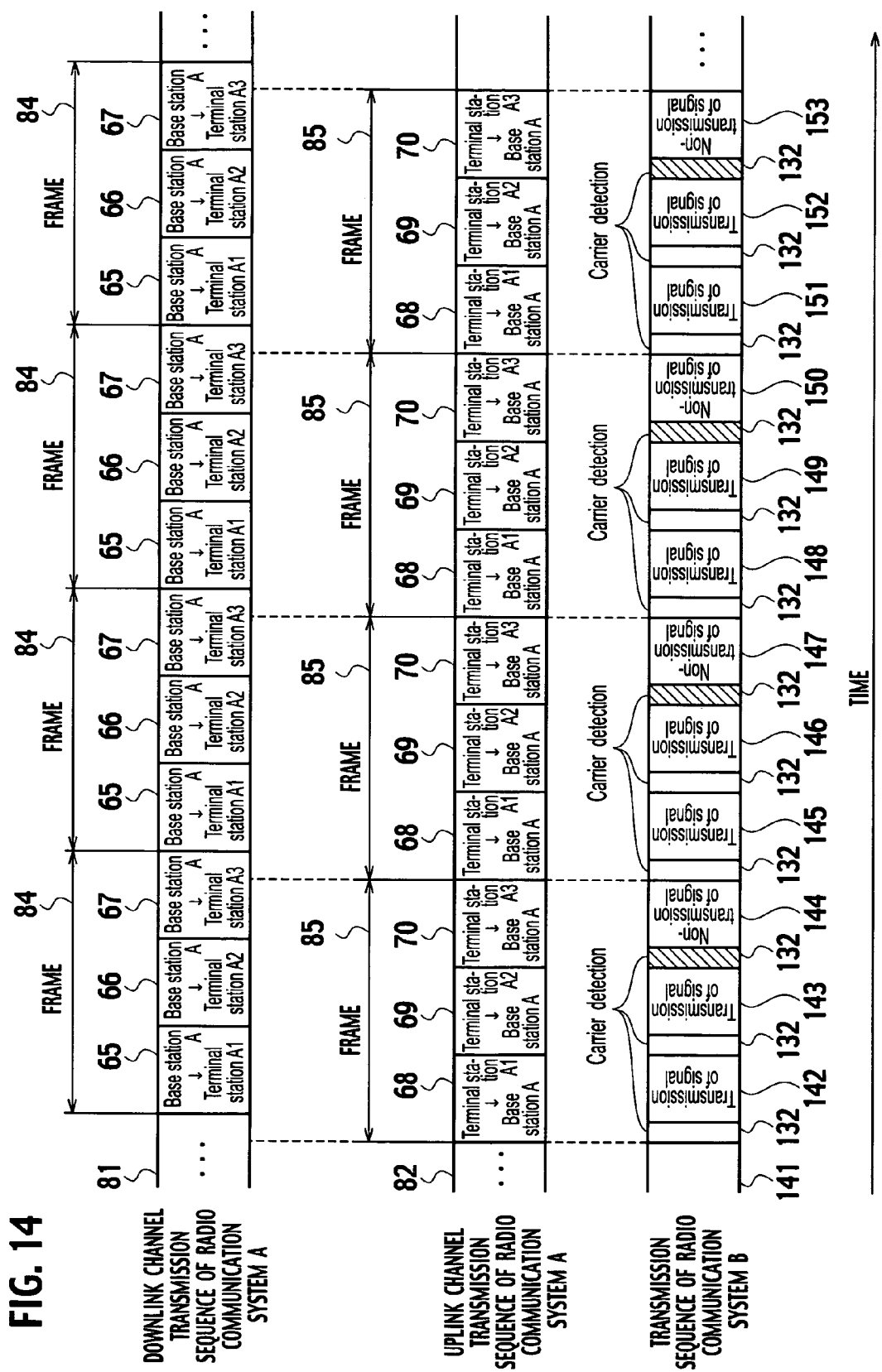
FIG. 14 is a timing chart of one example of transmission sequence between radio communication devices when the radio communication system adopts TDMA and FDD in the third embodiment of the invention.

In an example shown in FIG. 14, the communication system 1 adopts the TDMA and FDD. FIG. 14 is a timing chart showing transmission sequence 81 of a downlink channel of the base station 5 and terminal station 6 belonging to the communication system 1, and transmission sequence 82 of an uplink channel of the base station 5 and terminal station 6 belonging to the communication system 2.

In this example, three terminal stations 6 in the communication system 1 communicate with one another on the TDMA basis. Since the communication system 1 adopts the FDD, two different frequency channels are used for the transmission sequence 81 in the downlink channel and the transmission sequence 82 in the uplink channel. The communication device 4 belonging to the communication system 2 shares the uplink channel for the terminal station 6 to send signals to the base station 5. Further, since the communication system 1 adopts the TDMA, one frame 84 for the downlink channel is allotted to the three terminal stations 6 as users' slots 65, 66 and 67 on the time division basis. One frame 85 for the uplink channel is allotted to the three terminal stations 6 as users' slots 68, 69 and 70 on the time division basis.

The communication device 4 of the communication system 2 uses transmission power which does not adversely affect the signal transmission and reception of the communication device 5 of the communication system 1. Further, carrier detection 132 is conducted for a short time period from the signal transmission timing of the three terminal stations 6 to the base station 5 till the slots 68, 69 and 70 in the uplink frame 64. The communication system 4 transmits signals in the slots 142, 143, 145, 146, 148, 149, 151 and 152 where the absence of carrier signal is confirmed. No signal transmission is conducted in the slot 144, 147, 150 and 153 where the presence of carrier signal is confirmed. This is because the terminal station 6 (A3) of the communication system 1 is located near the communication device 4, and detects the signal to the terminal station 5. This state is determined to represent the presence of carrier signal. Refer to FIG. 14. The slots 142, 143, 145, 146, 148, 149, 151 and 152 are used by the communication device 4 to transmit signals at a time and are designed to be smaller than the slots 68, 69 and 70 allotted to the terminal station 6.

[Example in which Communication System Adopts CDMA and FDD]

Figure 15:
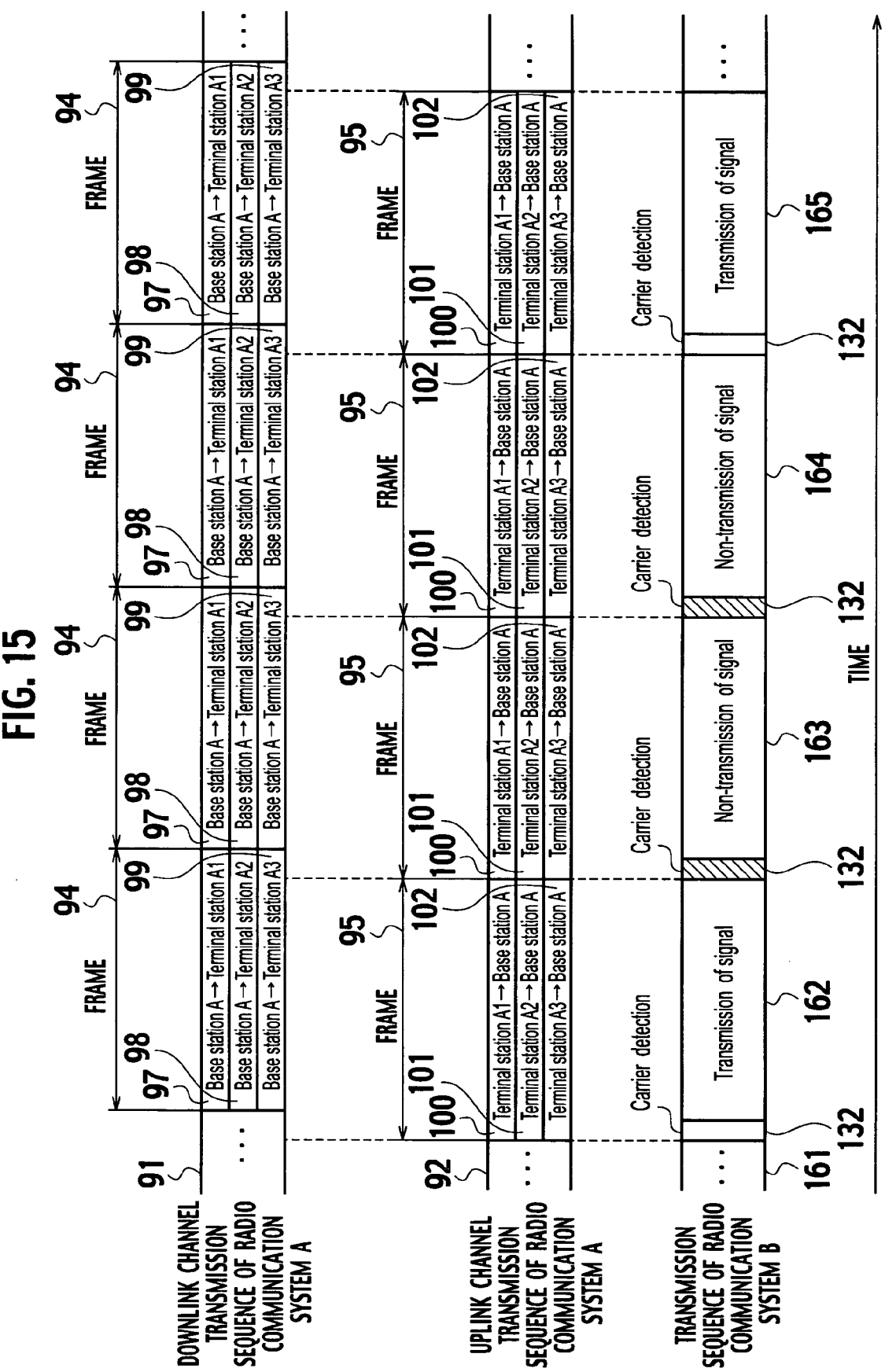
FIG. 15 is a timing chart of one example of transmission sequence between radio communication devices when the radio communication system adopts CDMA and FDD in the third embodiment of the invention.
Figure 16:
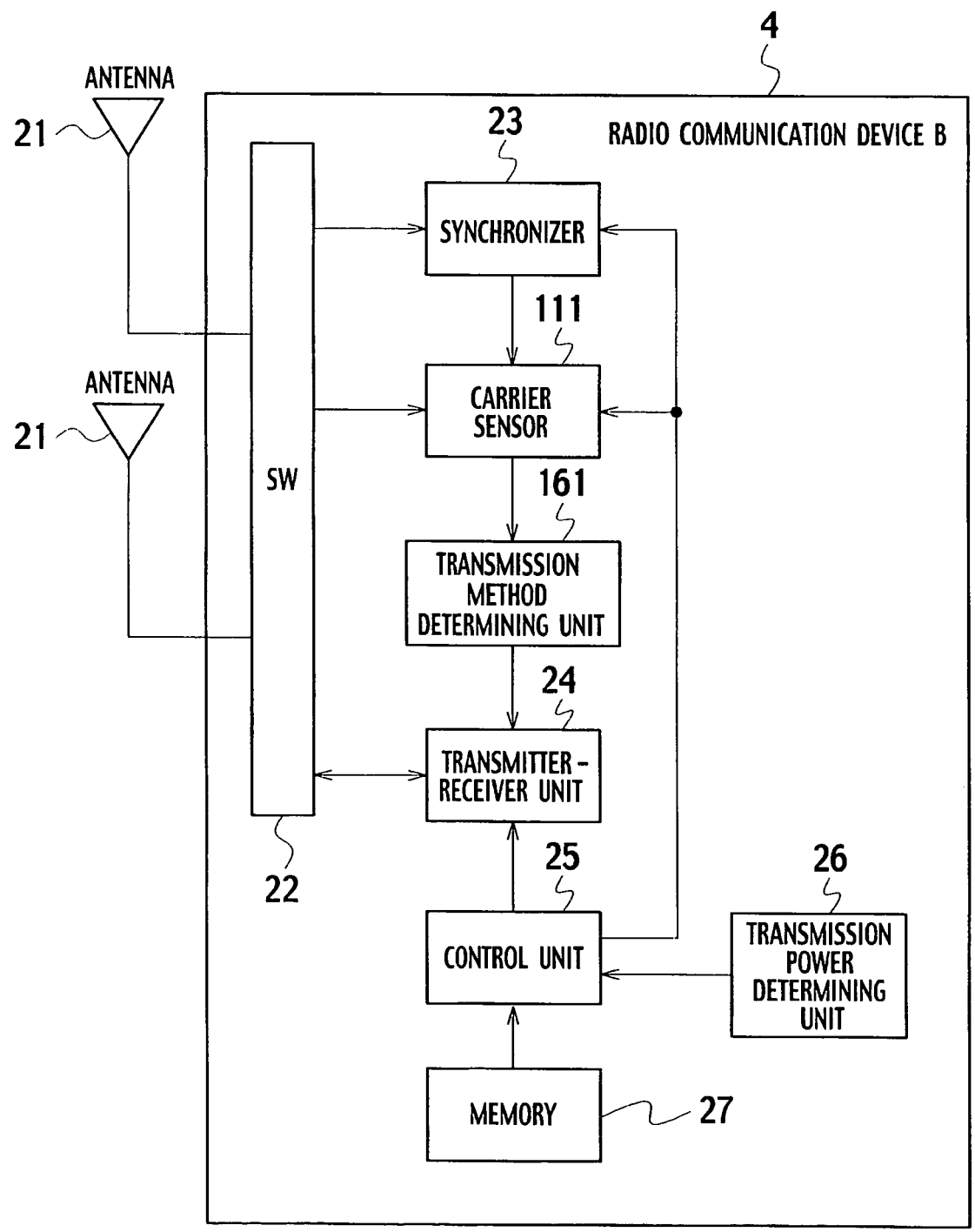
FIG. 16 is a block diagram of a radio communication device constituting a radio communication system in a fourth embodiment of the invention.

In an example shown in FIG. 15, the communication system 1 adopts the CDMA and FDD. FIG. 15 shows transmission sequence 91 of a downlink channel of the base station 5 and terminal station 6 belonging to the communication system 1; transmission sequence 92 of an uplink channel of the base station 5 and terminal station 6 belonging to the communication system 1; and transmission sequence 161 of the communication device 4 belonging to the communication system 2.

In this example, three terminal stations 6 in the communication system 1 communicate with one another on the CDMA basis. Since the communication system 1 adopts the FDD, two different frequency channels are used for the transmission sequence 91 in the downlink channel and the transmission sequence 92 in the uplink channel. The communication device 4 of the communication system 2 shares the uplink channel for the terminal station 6 to send signals to the base station 5. Further, since the communication system 1 adopts the CDMA, one frame 94 for the downlink channel is allotted to the three terminal stations 6 as slots 97, 98 and 99 on the code division basis. One frame 95 for the uplink channel is allotted to the three terminal stations 6 as frames 100, 101 and 102 on the code division basis.

The communication device 4 of the communication system 2 uses transmission power which does not adversely affect the signal transmission and reception of the base station 5 of the communication system 1. Further, carrier detection 132 is conducted for a short time period from the signal transmission timing of the three terminal stations 6 to the base station 5 till the frame 95. The communication system 4 transmits signals in the slots 162 and 165 where the absence of carrier signal is confirmed. No signal transmission is conducted in the slots 163 and 164 where the presence of carrier signal is confirmed. This is because the terminal station 6 (A1, A2 or A3) of the communication system 1 is located near the communication device 4, and detects a packet signal to the terminal station 5. This state is recognized to represent the presence of a carrier signal. Refer to FIG. 15. The slots 162 and 165 used by the communication device 4 to transmit signals at a time are designed to be smaller than the slot 95 allotted to the terminal station 6.

In the third embodiment, the communication device 4 detects the carrier signal for a short time period which is between the uplink slots 68, 69 and 70 of the terminal station 6 of the communication system 1 or the start period of the uplink frame 95. The communication system 4 transmits the signals in the slots where the absence of carrier signal is confirmed. This enables the communication system 4 to send and receive the signal without interference from the terminal station 6.

Fourth Embodiment

A fourth embodiment of the invention relates to a modification of the third embodiment.

[Configuration of Communication Device]

In this embodiment, the communication device 4 constituting the communication system 2 includes a transmission method determining unit 161 as an additional unit.

[Operation of Communication System and Communication Device]

Figure 17:
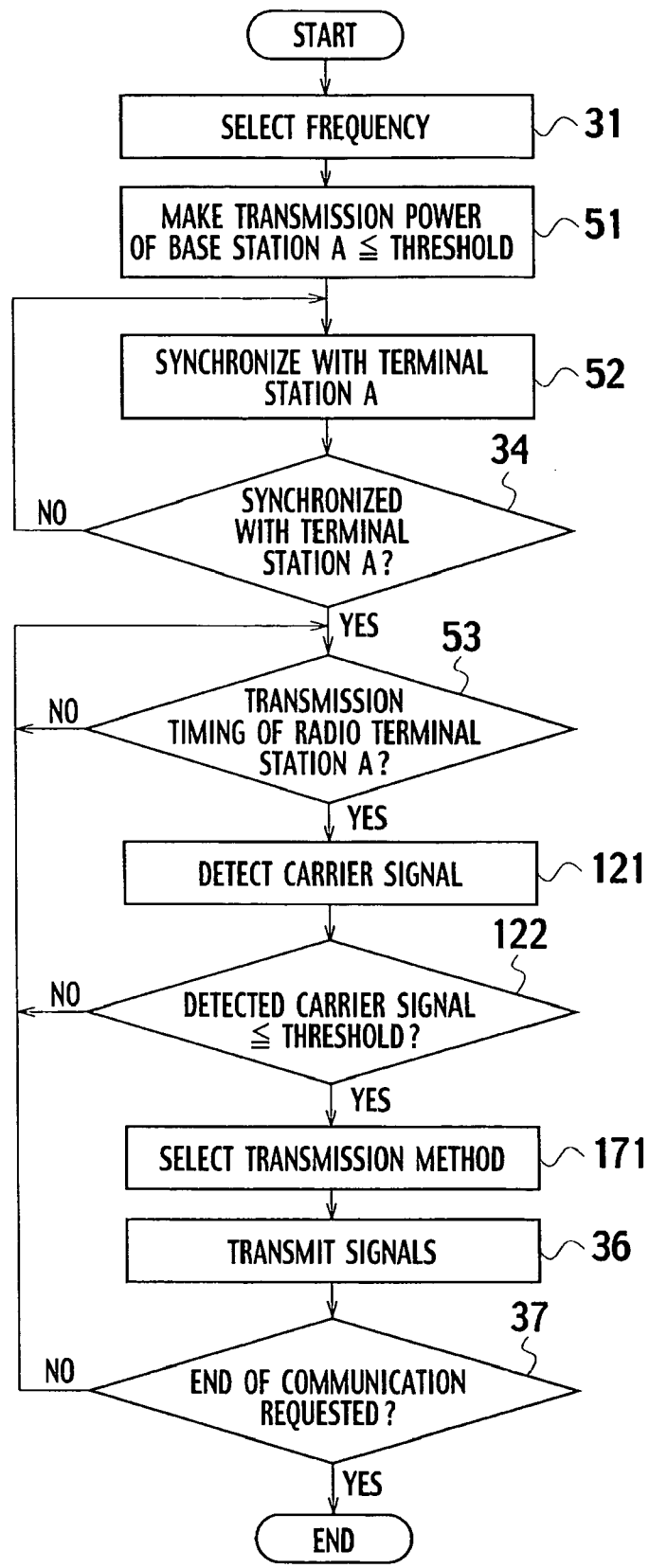
FIG. 17 is a flowchart of one example of data transmission conducted by the radio communication device of FIG. 16.

FIG. 17 is an example of a flowchart showing data transmission of the communication device 4. Referring to FIG. 17, the control unit 25 of the communication device 4 selects a frequency for the operation of the communication device 4 (step 31), and outputs the selected frequency to the synchronizer 23, the transmitter-receiver section 24 and the carrier sensor 111. The transmission power determining unit 26 determines signal transmission power so that radio communications can be established between communication devices 4 of the communication system 2, and so that reception power of the base station 5 of the communication system 1 is smaller than a predetermined threshold (step 51). The predetermined threshold has a level equivalent to noises of the base station 5 or the like, and does not affect the signal transmission and reception of the base station 5.

The transmission power determining unit 26 provides the determined transmission power to the control unit 25, which outputs a determination completion signal to the synchronizer 23. Receiving the signal, the synchronizer 23 receives a signal from the base station 5 or the terminal station 6, and acquires timing information concerning signal transmission of the terminal station 6 (step 52). Synchronized with the communication system 1, the synchronizer 23 (step 34) sends the foregoing timing information to the signal transmitter-receiver unit 24 and the carrier sensor 111 (step 53). In response to the timing information, the carrier sensor 111 detects a carrier signal during a short time period in which the terminal station 6 transmits a string of signals (step 121). The carrier sensor 111 compares the detected carrier signal with the predetermined threshold (step 122), and sends a transmission start signal to the transmitting method determining unit 161 (step 171) when the detected carrier signal is equal to or less than the threshold.

The predetermined threshold is assumed to be −90 dBm, for instance. If the reception power is detected to be −93 dBm, the carrier sensor 111 determines "Absence of Carrier Signal". On the contrary, if the carrier signal is −70 dBm, the carrier sensor 111 determines "Presence of Carrier Signal". When the detected carrier signal is larger than the threshold, the carrier sensor 111 waits for a next transmission timing of the terminal station 6 (step 53). In response to the transmission start signal from the carrier sensor 111, the transmission method determining unit 161 determines a signal transmission method, and transmits the transmission method and a transmission start signal to the transmitter-receiver unit 24. In this case, the transmission method may be a modulation system such as BPSK (binary phase shift keying), QPSK (quadrature phase shift keying) or 16QAM (sixteen (4 bit) quadrature amplitude modulation), a coding system such as convolution coding, turbo coding or LDPC (low density party check coding), or STC (space time coding) or SDM (space division multiplexing) for which a plurality of antennas are used.

In response to the transmission start signal from the transmission method determining unit 161, the transmitter-receiver unit 24 sends data using the transmission power received from the control unit 25 (step 36) and using the transmission method acquired from the transmission method determining unit 161 (step 36). In this case, the transmitter-receiver unit 24 transmits signals in a time period which is stored in the memory 27 and in which a terminal station sends a string of signals. When a radio communication end request is issued by the user or the like, the current radio communication is terminated (step 37). If not, the procedures following step 53 will be repeated.

Figures 18, 19:
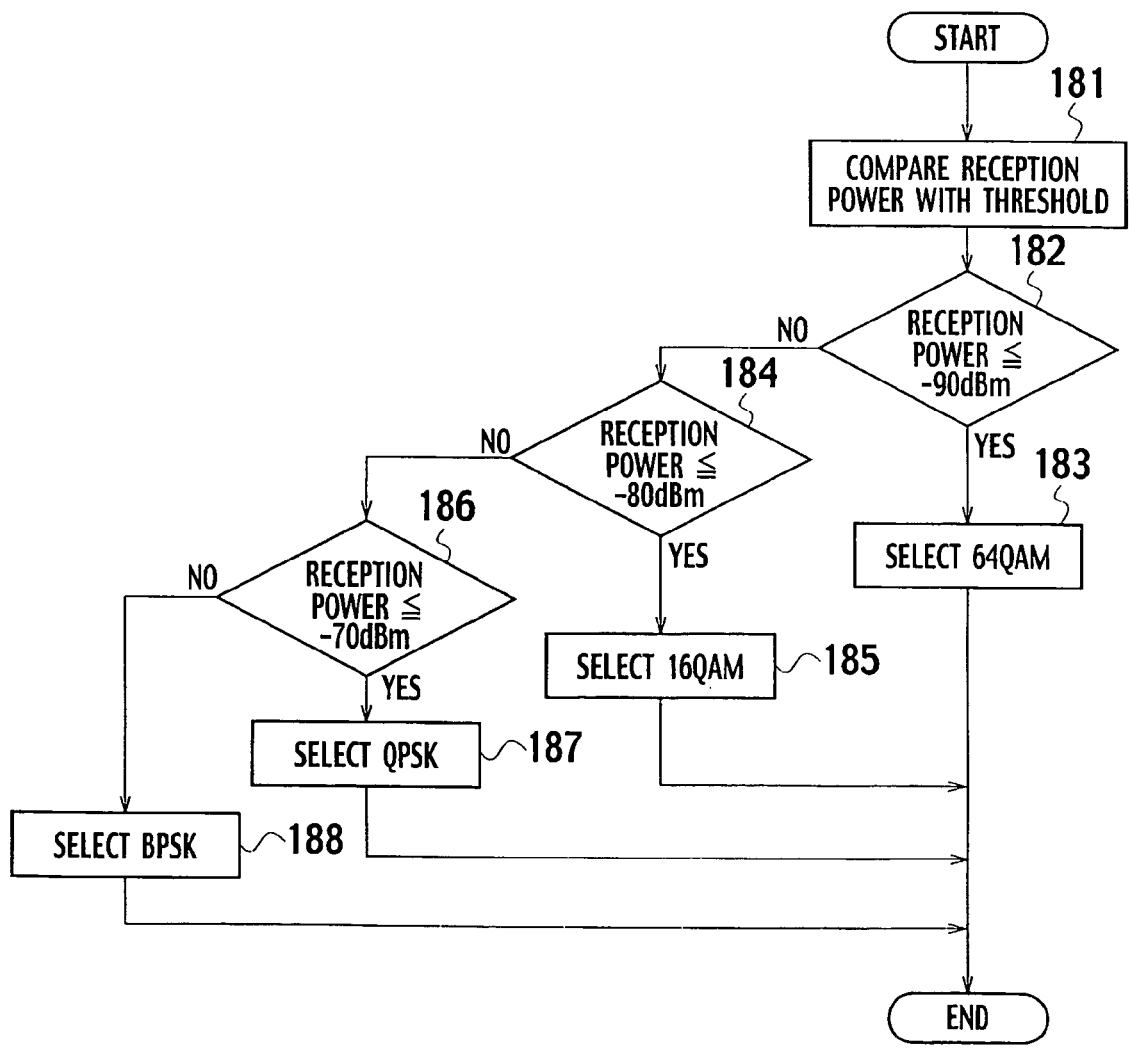
FIG. 18 shows the correspondence between reception power and transmission methods, the correspondence being stored in a transmission method determining unit of the radio communication device in the fourth embodiment of the invention.
FIG. 19 is a flowchart showing one example of operation of the transmission method determining unit in the fourth embodiment of the invention.

FIG. 18 shows the correspondence between the reception power obtained by the carrier detection and the transmission method which are stored in the transmission method determining unit 161.

The transmission method determining unit 161 determines the transmission method as shown by the flowchart of FIG. 19. The predetermined threshold used for the comparison by the carrier sensor 111 is assumed to be −60 dBm. When the reception power is detected to be equal to or lower than −60 dBm, the transmission method determining unit 161 selects the transmission method depending upon the reception power (step 181). If the reception power is detected to be equal to or less than −90 dBm (step 182), 64QAM (sixty four (6 bit) quadrature amplitude modulation) will be selected as a modulation system (step 183). If the reception power is not equal to or less than −90 dBm, it is checked whether or not the reception power is equal to or less than −80 dBm (step 184). If the reception power is detected to be equal to or less than −80 dBm (step 184), the 16QAM will be selected as the modulation system (step 185). If the reception power is detected to be not equal to or less than −80 dBm (step 184), it is checked whether or not the reception power is equal to or less than −70 dBm. When the reception power is equal to or less than −70 dBm, QPSK will be selected as the transmission method (step 187). Otherwise, the BPSK will be selected (step 188).

[Example in which Communication System Adopts TDMA and TDD]

Figure 20:
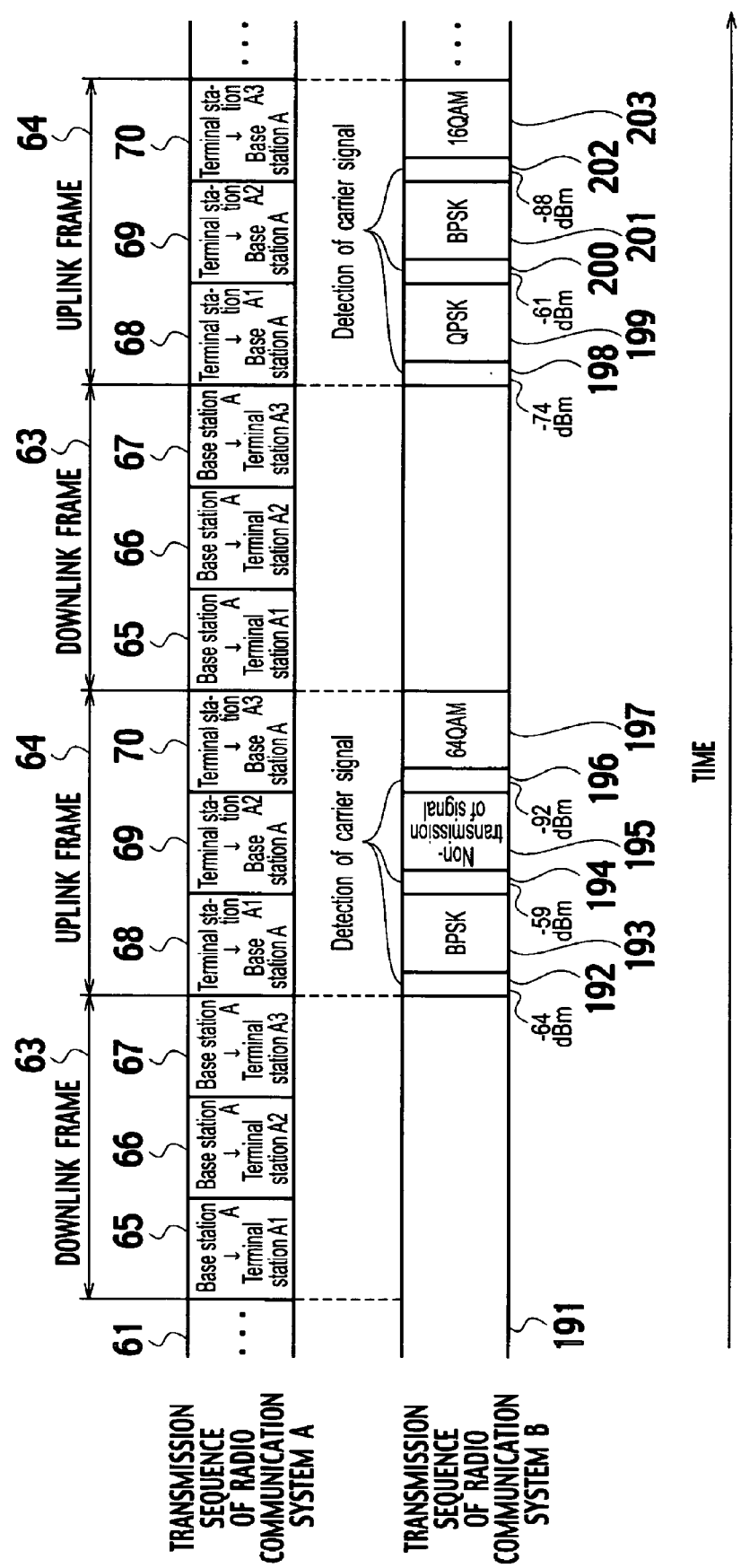
FIG. 20 is a timing chart of one example of transmission sequence between radio communication devices when the radio communication system adopts TDMA and FDD in the fourth embodiment of the invention.

It is assumed that the communication system 1 adopts the TDMA and TDD. FIG. 20 shows transmission sequence 61 of the base station 5 and terminal stations 6 belonging to the communication system 1, and transmission sequence 191 of the communication device 4 of the communication system 2. In this case, three terminal stations 6 of the communication system 1 are connected by the TDMA. The transmission method determining unit 161 determines a transmission method as shown in the flowchart in FIG. 19 (in which the modulation method is selected).

Since the communication system 1 adopts the TDD, a downlink frame 63 in which the base station 5 sends the signal to the terminal station 6 and an uplink frame 64 in which the terminal station 6 sends the signal to the base station 5 are repeated one after the other. Further, the communication system 1 operates on the TDMA, so that the downlink frame 63 is allotted as users' slots 65, 66 and 67 to three terminal stations 6 on the time division basis. Further, the uplink frame 64 is allotted as users' slots 68, 69 and 70 to the three terminal stations 6 on the time division basis.

The communication device 4 belonging to the communication system 2 uses transmission power which does not adversely affect the signal transmission and reception of the base station 5 belonging to the communication system 1. Further, carrier detections 192, 194, 196, 198, 200 and 202 are conducted for a short time period from the signal transmission timing of the three terminal stations 6 to the base station 5 till the slots 68, 69 and 70 in the uplink frame 64. If the reception power detected in the carrier detection 192 is −64 dBm, the BPSK is selected for the slot 193 in order to transmit signals. If the reception power detected in the carrier detection 196 is −92 dBm, the 64QAM is selected in the slot 197 for the signal transmission. Further, if the reception power detected in the carrier detection 194 is larger than −60 dBm detected by the carrier sensor 111, no signal transmission will be carried out.

If the reception power detected by the carrier detection 198 is −74 dBm, the QPSK will be selected for the signal transmission. If the reception power detected by the carrier detection 200 is −61 dBm, the BPSK will be selected for the signal transmission. Further, if the reception power is −88 dBm, the 16QAM will be selected for the signal transmission.

Since the terminal station 6 (A2) is moving, the reception power in the slot 195 is −59 dBm. If the terminal station 6 (A2) moves away from the communication device 4, the reception power may become −61 dBm. The slots 193, 197, 199, 201 and 203 used by the communication device 4 to transmit signals at a time are designed to be smaller than the slots 68, 69 and 70 allotted to the terminal station 6.

In the fourth embodiment, the communication device 4 selects the transmission method of signals in accordance with the reception power for the carrier detection. This allows the radio communications to be made using optimum parameters depending upon interference from the terminal station 6.

Fifth Embodiment

A fifth embodiment of the invention relates to a further modification of the fourth embodiment.

[Configuration of Communication Device]

Figure 21:
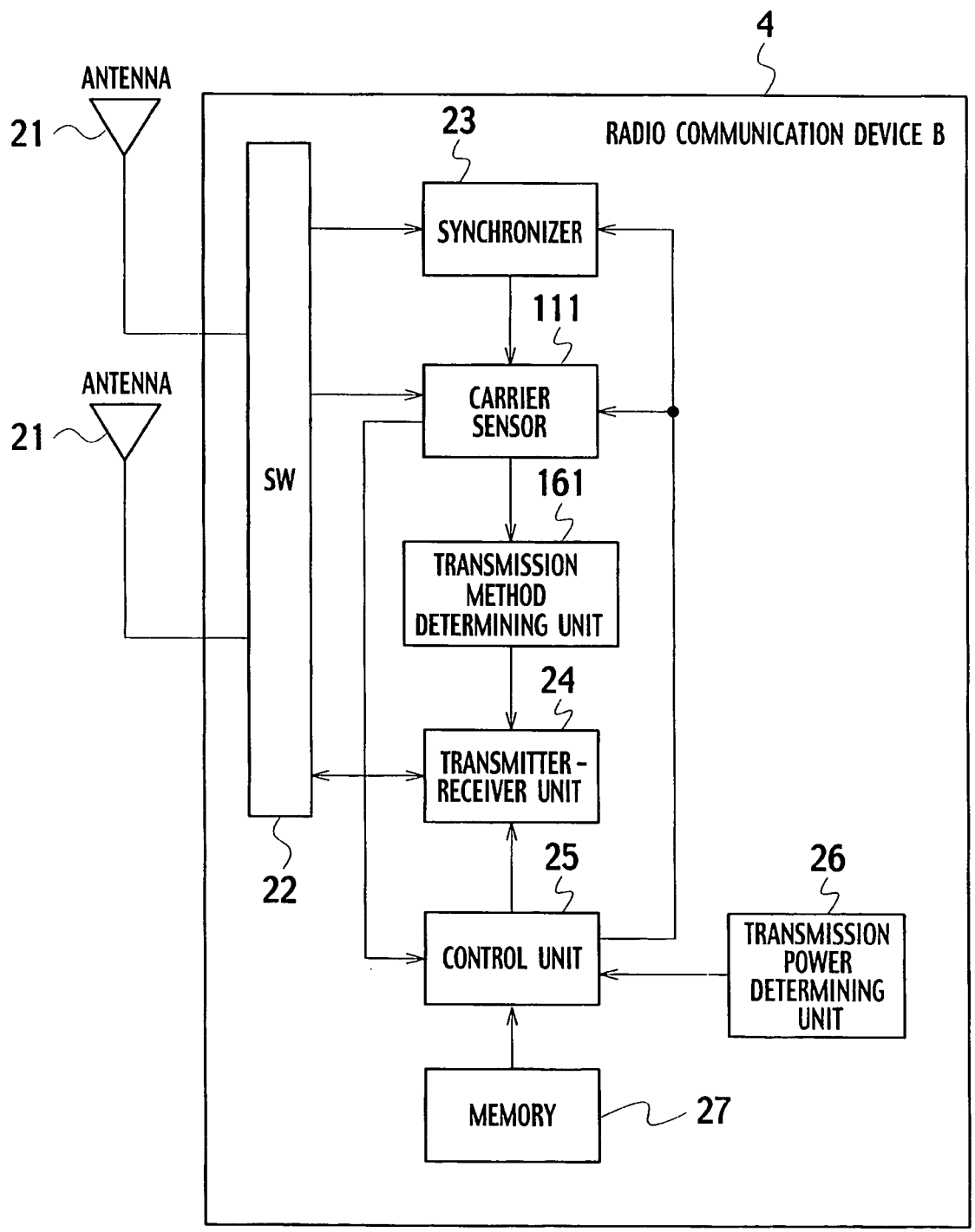
FIG. 21 is a block diagram of a radio communication device constituting a radio communication system in a fifth embodiment of the invention.

Referring to FIG. 21, each communication device 4 constituting the communication system 2 (referred to in the fourth example) includes a signal line (to which no reference number is assigned) extending between the carrier sensor 111 and the control unit 25.

[Operation of the Communication System and Communication Device]

Figure 22:
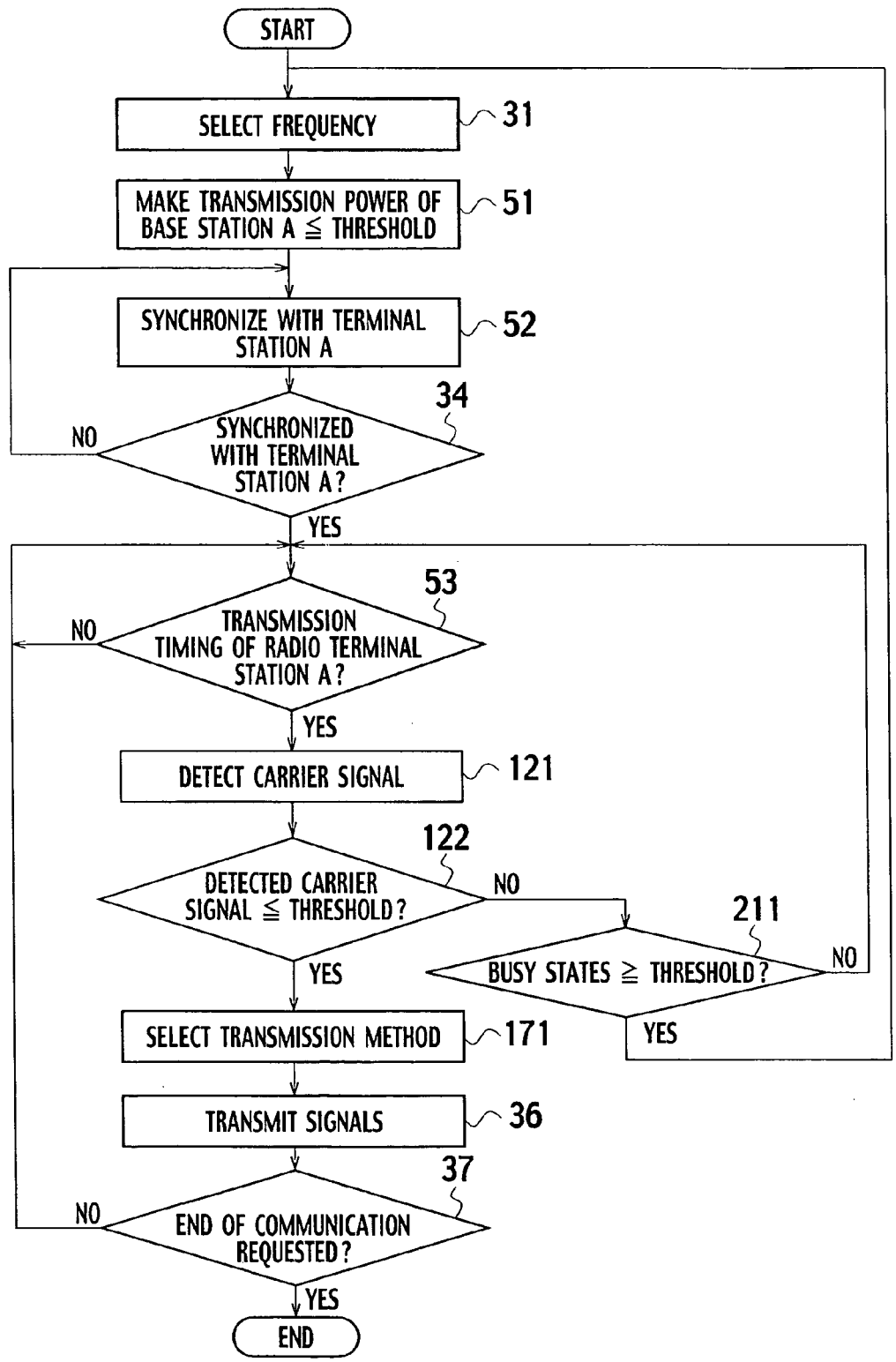
FIG. 22 is a flowchart of one example of data transmission conducted by the communication device of FIG. 21.

FIG. 22 is a flowchart showing sequence for the communication device 4 to transmit data. The control unit 25 of the communication device 4 selects a frequency for the operation of the communication device 4 (step 31), and outputs the selected frequency to the synchronizer 23, the transmitter-receiver unit 24 and the carrier sensor 111. The transmission power determining unit 26 determines signal transmission power so that radio communications can be established between communication devices 4 of the communication system 2, and so that reception power of the base station 5 of the communication system 1 is smaller than a predetermined threshold (step 51). The predetermined threshold has a level equivalent to noises of the base station 5 or the like, and does not affect the signal transmission and reception of the base station 5.

The transmission power determining unit 26 provides the determined transmission power to the control unit 25, which outputs a determination completion signal to the synchronizer 23. Receiving the signal, the synchronizer 23 receives a signal from the base station 5 or the terminal station 6, and acquires timing information concerning signal transmission of the terminal station 6 (step 52). Synchronized with the communication system 1, the synchronizer 23 (step 34) sends the foregoing timing information to the signal transmitter-receiver unit 24 and the carrier sensor 111 (step 53). In response to the timing information, the carrier sensor 111 detects a carrier signal during a short time period in which the terminal station 6 transmits a string of signals (step 121). The carrier sensor 111 compares the detected carrier signal with the predetermined threshold (step 122). When the detected carrier signal is equal to or less than the threshold, the carrier sensor 111 provides the detected result and transmission start timing information to the transmission method determining unit 161.

If the threshold stored by the carrier sensor 111 is −90 dBm, and if the reception power measured by the carrier signal detection function is −93 dBm, the carrier sensor 111 determines "Absence of carrier signal". On the contrary, if the reception power detected by the carrier sensor 111 is −70 dBm, the carrier sensor 111 determines "Presence of carrier signal". If the detected result is larger than the threshold, the carrier sensor 111 compares the number of times (in which the detected result is larger than the threshold, and is referred to as "the number of busy states") with the threshold (step 211). The threshold is two (2) slots when the communication system 1 operates on the TDMA or TDD system, and when one uplink frame is shared by three users. If the number of busy states is above the threshold, the carrier sensor 111 produces a signal indicating the foregoing state and provides it to the control unit 25. The control unit 25 changes the frequency (step 31), and repeats the procedures in step 31 and succeeding steps. When two or more slots out of the three user's slots are considered to have the reception power above the threshold, the carrier sensor 111 issues a signal which indicates the number of busy states being above the threshold, and sends it to the control unit 25.

When the number of busy states is below the threshold, the carrier sensor 111 sends the detected results and the transmission start timing information to the transmission method determining unit 61. In accordance with the detected results received from the carrier sensor 111, the transmission method determining unit 161 selects a transmission method, and outputs the selected transmission method and the transmission start signal to the control unit 24 (step 171). The transmission method may be the modulation system such as the BPSK, QPSK or 16QAM, the coding system such as convoluted coding, turbo coding or LDPC, or STC, SDM and so on for which a plurality of antennas are utilized.

In response to the transmission start signal and the transmission method obtained from the transmission method determining unit 161, the transmitter-receiver unit 24 transmits data using the transmission power obtained from the control unit 25 (step 36). In this case, the transmitter-receiver unit 24 performs the data transmission for the time period which is stored in the memory 27 and in which terminal stations of a target communication system send signals. If there is a radio communication end request from the user or the like (step 37), the current radio communication will be terminated (step 37). Otherwise, the procedures in step 34 and succeeding steps will be repeated.

[Example in which Communication System Adopts TDMA and TDD]

Figure 23:
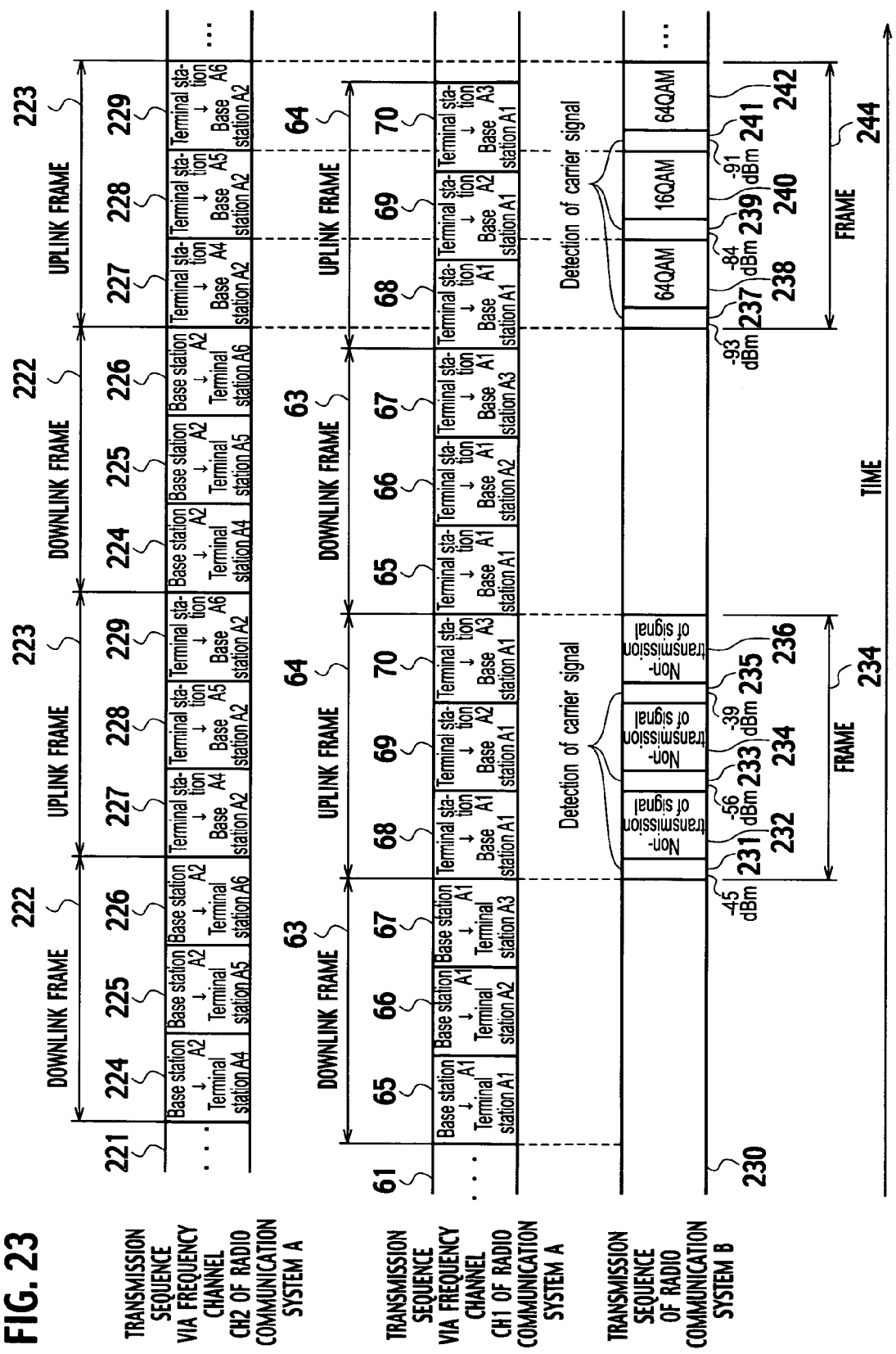
FIG. 23 is a timing chart of one example of transmission sequence between radio communication devices when the radio communication system adopts TDMA and FDD in the fifth embodiment of the invention.

It is assumed here that the communication system 1 adopts the TDMA and TDD. FIG. 23 shows the transmission sequence 61 of the base station 5 (A1) and terminal stations 6 (A1, A2 and A3) belonging to the communication system 1, transmission sequence 221 of the base station 5 (A2) and terminal stations 6 (A4, A5 and A6) belonging to the communication system 1, and transmission sequence 230 of communication devices 4 belonging to the communication system 2. The three terminal stations 6 of the communication system 1 are connected by the TDMA.

First of all, the communication devices 4 of the communication system 4 transmit and receive data using the frequency channel CH1 which is the same as the frequency channel CH1 used by the base station 5 (A1). The transmission method determining unit 161 of the communication device 4 selects a transmission method as shown in the flowchart in FIG. 19 (in which the modulation method is selected). If two slots out of three users' slots are recognized to be busy, the communication device 4 should change the frequency channel.

The communication system 1 adopts the TDD. Therefore, in the transmission sequences 61 and 221, the downlink frames 63 and 222 for transmitting signals from the base stations 5 to the terminal station 6 and the uplink frames 64 and 223 for transmitting signals from the terminal stations 6 to the base station 5 are alternately placed. Further, the TDMA is adopted, so that the downlink frame 63 as the users' slots 65, 66 and 67, and the downlink frame 222 as the users' slots 224, 225 and 226 are allotted to the three terminal stations 6 on the time division basis. The uplink frame 64 as the users' slots 69, 69 and 70 and the uplink frame 223 as the users' slots 227, 228 and 229 are allotted to the three terminal stations 6 on the time division basis. The communication device 4 uses the transmission power which does not adversely affect the signal transmission and reception of the base station 5 (A1) of the communication system 1, and performs carrier detection for short time periods 231, 233 and 235 in the uplink frame 64 from the start timing of the continuous signal transmission by the three terminal stations 6 (A1, A2 and A3) till the slots 68, 69 and 70. When values of the reception power detected in the time periods 231, 233 and 235 is −45 dBm, −56 dBm and −39 dBm, all of the users' slots 68, 69 and 70 are recognized to be busy. Since the number of busy states is above two (2), the communication device 4 will change the frequency channel CH.

The communication device 4 changes the frequency channel CH to a frequency channel CH2 to be used by the base station 5 (A2), calculates transmission power which does not affect the signal transmission-reception of the base station 5 (A2), and synchronizes with a timing at which the terminal station 6 (A4) transmits a signal to the terminal 6 (A6). Thereafter, the communication device 4 conducts the carrier signal detections 237, 239 and 241 for a short period from the timing at which the three terminal stations 6 (A4 to A6) start sending a string of signals to the base station 5 (A2) till the slots 227, 228 and 229. In the carrier detection 237, if the detected reception power is −93 dBm for instance, the 64QAM is selected for the slot 238 in order to transmit a signal. In the carrier detection 239, if the detected reception power is −84 dBm for instance, the 16QAM is selected for the slot 240 in order to transmit the signal. Further, in the carrier detection 241, if the detected reception power of −91 dBm for instance, 64QAM is selected for the slot 242 in order to transmit the signal.

In the foregoing description, it is assumed that the communication device 4 uses the frequency channel 1 which is the same as that of the base station 5 (A1), and that the three terminal stations 6 (A1 to A3) which communicate with the base station 5 (A1) are located in the vicinity of the communication device 4. The carrier signal detections represent that all of the user's slots are busy. However, since the frequency channel of the base station 5 (A2) is changed to the frequency channel CH2, the three terminal stations 6 (A4 to A6) are not in the vicinity of the radio communication unit 4, and the signals can be transmitted in accordance with a value of the reception power obtained by the carrier signal detection. The slots 238, 240 and 242 for the communication device 4 to send the signals at a time should be smaller than the slots 227, 228 and 229 which are allotted to the terminal stations 6 (A4 to A6).

As described so far, the communication device 4 belonging to the communication system 2 changes the frequency channel depending upon the number of times in which busy states are detected during the carrier signal detection. Therefore, even when the communication system 1 frequently interferes, the communication system 1 can continue communications by avoiding such interference.

Sixth Embodiment

This embodiment relates to the configuration and operation of the communication system, and more specifically of the base station communication device 7.

[First Configuration of Communication Device]

Figure 24:
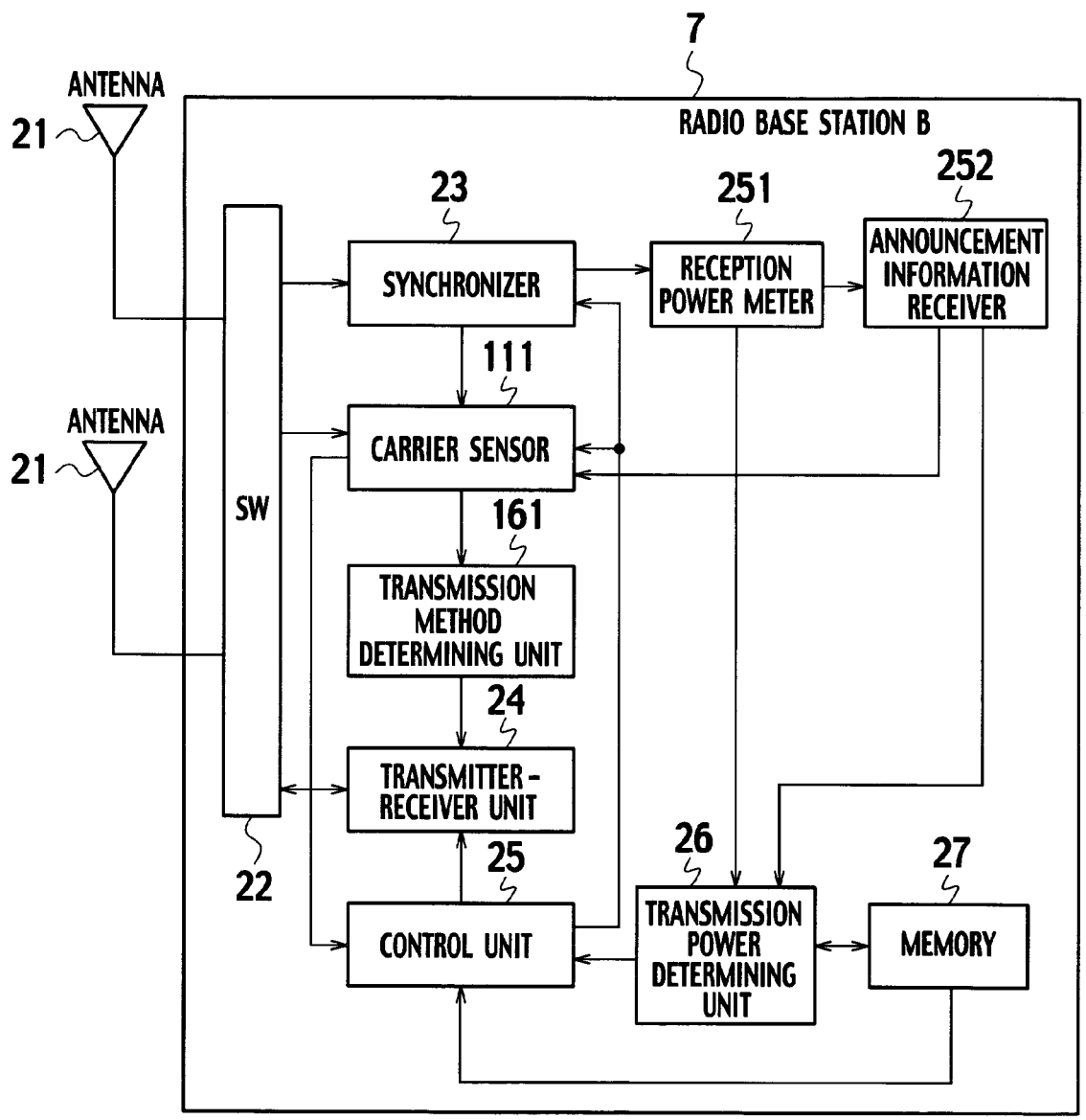
FIG. 24 is a block diagram showing a first configuration of a communication device constituting a radio communication system in a sixth embodiment of the invention.

Referring to FIG. 24, each communication device 7 constituting the communication system 2 (shown in FIG. 2) is configured similarly to the communication device 4 in the fourth embodiment, and further includes a reception power meter 251, and an announcement information receiver 252. In the communication device 7, the transmission power determining unit 26 is connected to the memory 27.

[First Communication Operation of Communication System and Communication Device]

Figure 25:
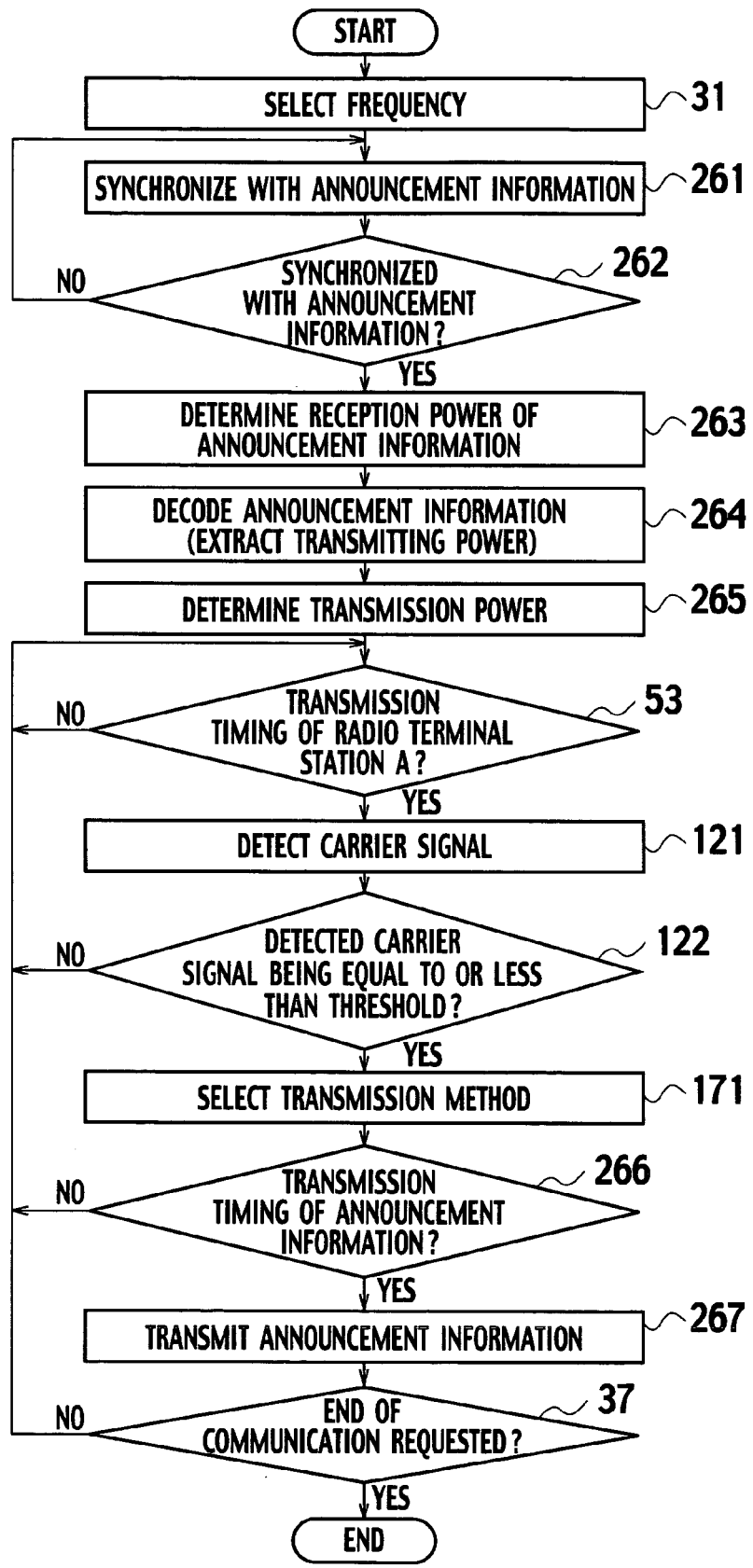
FIG. 25 is a flowchart showing a first operation of the radio communication device for sending announcement information.

The base station communication device 7 transmits the announcement information of the communication system 2 in accordance with the procedure shown in FIG. 25. The control unit 25 selects a frequency for the operation of the communication device 7 (step 31), and outputs it to the synchronizer 23, the transmitter-receiver unit 24 and the carrier sensor 111. The synchronizer 23 synchronizes with the announcement information from the base station 5 (step 261). When synchronized, the synchronizer 23 outputs the timing information and reception signal in the announcement information to the reception power meter 251 (step 262). Further, if the uplink frame transmission timing for the downlink frame is known, the communication device 7 sends the uplink frame transmission timing for the downlink frame to the carrier sensor 111. The reception power meter 251 measures the reception power of the announcement information on the basis of the timing information and the announcement information received from the synchronizer 23 (step 263). It is assumed here that the reception power is Rm [dBm]. The reception power meter 251 provides the measured reception power to the transmission power determining unit 26, and sends the announcement information from the synchronizer 23 to the announcement information receiver 252. The announcement information receiver 252 decodes the announcement information, extracts transmission power from the announcement information (step 264), and outputs it to the transmission power determining unit 26.

Further, when the timing information is included in the announcement information, the uplink frame transmission information is transmitted to the carrier sensor 111. The transmission power extracted from announcement information is assumed to be Rd [dBm]. In step 265, the transmission power determining unit 26 determines the transmission power Pt [dBm] using a formula (1) on the basis of the reception power Rm [dBm] received from the reception power meter 251; the transmission power Rd [dBm] from the announcement information receiver 252; receiver sensitivity information S [dBm] of the base station 5 stored in the memory 27; and margin M [dBm] stored in the memory 27.

$$Pt=Rd-Rm+S-M \tag{1}$$

The transmission power Pt is derived as expressed by a formula (2) when Rd is 40 [dBm]; Rm is −70 [dBm]; S is −90 [dBm]; and M is 10 [dBm].

$$Pt=40-(-70)+(-90)-10=10 \text{ [dBm]} \tag{2}$$

The determined transmission power is transmitted to the control unit 25, which transfers the transmission power to the transmitter-receiver unit 24. In synchronization with the uplink frame signal transmission timing received from the synchronizer 23 or the announcement information receiver 252 (step 53), the carrier sensor 111 performs the carrier signal detection while the communication device 6 belonging to the communication system 1 is transmitting a string of signals. The carrier sensor 111 compares a detected value with a predetermined threshold (step 122). If the detected value is founds to be equal to or less than the predetermined threshold, the carrier sensor 111 outputs the detected value and a transmission start timing to the transmission method determining unit 161.

The transmission method determining unit 161 determines a method of transmitting the announcement information, and sends the determined method and a transmission start signal to the transmitter-receiver unit 24 (step 171). For instance, the BPSK modulation method or the like which assures a high probability of successful reception will be selected as the transmission method. The transmitter-receiver 24 determines whether or not the announcement information transmitting timing reaches (step 266). If so, the transmitter-receiver 24 transmits the announcement information including the transmission power inputted from the control unit 25 using the transmission power inputted from the control unit 25 in response to the transmission start signal from the carrier sensor 111 while the terminal stations are sending a string of signals (step 267). On the contrary, if the announcement transmitting timing does not reach, the procedures following step 53 will be repeatedly executed. In response to the radio communication end request from the user or the like (step 37), the operation will be completed (step 37). Otherwise, the procedures following step 53 will be repeatedly executed.

In the sixth embodiment, the base station communication device 7 is described to send the announcement information. The base station communication device 7 can send other kinds of information using the transmission power derived according to the procedure shown in FIG. 25.

Further, in the sixth embodiment, the transmission power of the base station communication device 7 is determined on the basis of the transmission power included in the announcement information which is sent by the radio base station 5 belonging to the communication system 1. Therefore, the transmission power of the base station communication device 7 can be precisely determined and does not adversely affect the radio base station 5.

[Second Communication Operation of Communication System and Communication Device]

In the first communication operation, the base station communication device 7 receives the announcement information received from the base station 5, and determines the transmission power thereof for sending the announcement information on the basis of the transmission power in the received announcement information. However, if the announcement does not include the transmission power, the base station communication device 7 can determine its transmission power for the announcement information on the basis of the information which relates to the transmission power of the base station 5 and has been stored in the memory.

Figure 26:
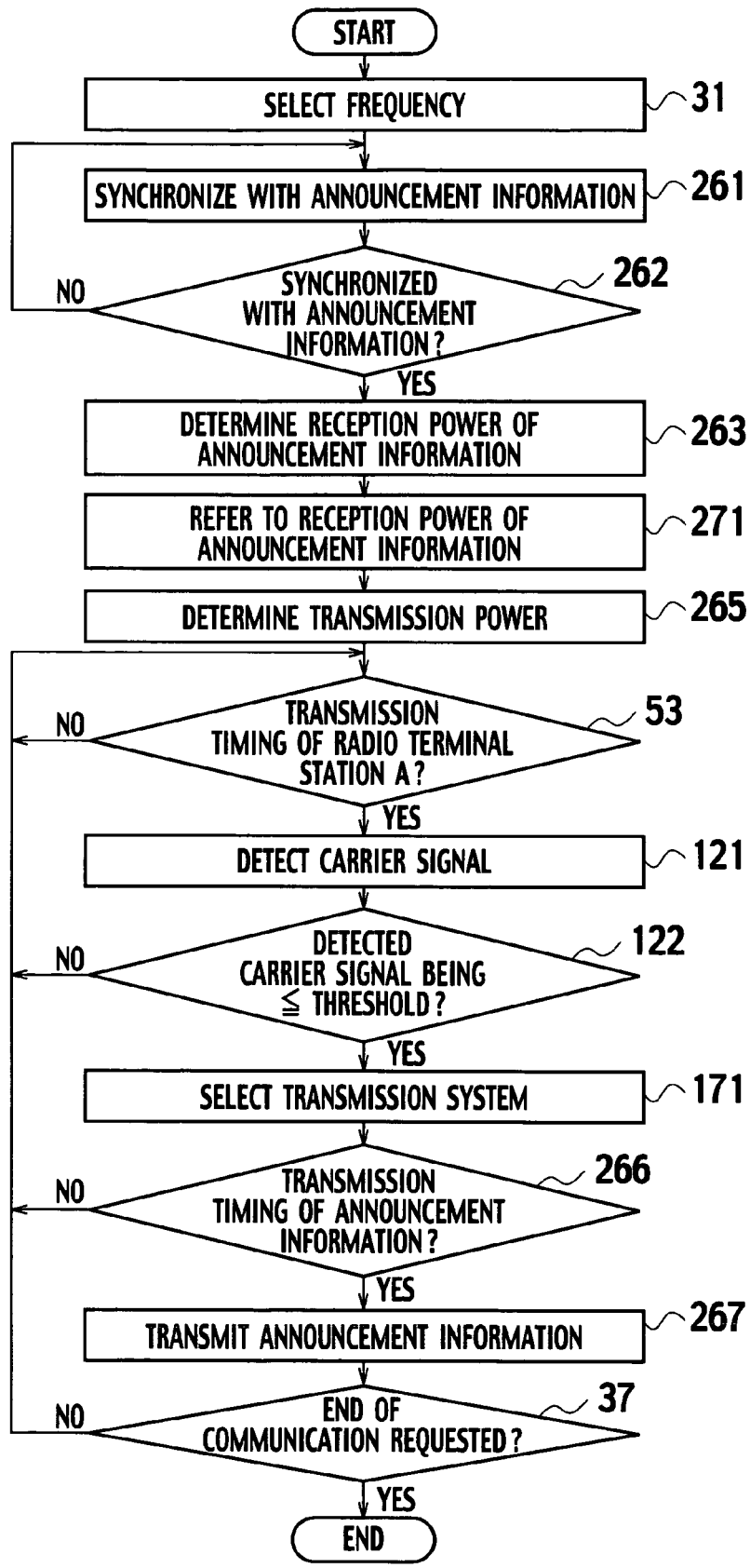
FIG. 26 is a flowchart showing a second operation of the communication device for sending the announcement information.

Referring to FIG. 26, the control unit 25 of the base station communication device 7 belonging to the communication system 2 selects a frequency for the operation of the base station communication device 7 (step 31), and outputs the selected frequency to the synchronizer 23, transmitter-receiver unit 24 and carrier sensor 111. In synchronization with the announcement information from the radio base station 5 (step 261), the synchronizer 23 outputs the timing information of the announcement information and the received signal to the reception power determining unit 251 (step 262). Further, if the uplink frame transmission timing information is known, the synchronizer 23 sends the uplink frame transmission timing information to the carrier sensor 111. The reception power determining unit 251 measures the reception power of the announcement information on the basis of the timing information and the announcement information received from the synchronizer 23 (step 263).

The measured reception power of the announcement information is assumed to be Rm [dBm]. The reception power determining unit 251 outputs the reception power to the transmission power determining unit 26, and provides the announcement information receiver 252 with the announcement information received from the synchronizer 23. The announcement information receiver 252 decodes the announcement information. If the announcement information includes the uplink frame transmission timing information, the announcement information receiver 252 sends the transmission timing information to the carrier sensor 111. The transmission power determining unit 26 determines the transmission power Pt [dBm] using the following formula (step 265) on the basis of the reception power Rm [dBm] received from the reception power determining unit 251; the transmission power Rr [dBm] of the radio base station 5 stored in the memory 27; the reception sensitivity information S [dBm] of the radio base station 5 stored in the memory 27; and the margin M [dBm] stored in the memory 27.

$$Pt=Rr-Rm+S-M \quad (3)$$

For instance, the transmission power Pt is derived as expressed by a formula (4) when Rm is −78 [dBm]; Rr is 42 [dBm]; S is −90 [dBm]; and M is 10 [dBm].

$$Pt=42-(-78)+(-90)-10=20 \text{ [dBm]} \quad (4)$$

The transmission power determining unit 26 sends the determined transmission power to the control unit 25, which transfers the transmission power to the transmitter-receiver unit 24. In synchronization with the uplink frame signal transmission timing received from the synchronizer 23 or the announcement information receiver 252 (step 53), the carrier sensor 111 performs the carrier signal detection for a short time period while the communication device 6 belonging to the communication system 1 is transmitting a string of signals. The carrier sensor 111 compares a detected result with a predetermined threshold (step 122). If the detected result is founds to be equal to or less than the predetermined threshold, the carrier sensor 111 outputs the detected result and a transmission start timing to the transmission method determining unit 161.

The transmission method determining unit 161 selects a method of transmitting the announcement information, and sends the determined method and the transmission start signal to the transmitter-receiver unit 24 (step 171). For instance, the BPSK modulation method or the like which assures a high probability of successful reception will be selected as the transmission method. The transmitter-receiver 24 determines whether or not the announcement information transmitting timing reaches (step 266). If so, the transmitter-receiver 24 transmits the announcement information including the transmission power inputted from the control unit 25 using the transmission power inputted from the control unit 25 with a method of transmitting determined by the transmission method determining unit 161 in response to the transmission start signal from the transmission method determining unit 161 while the terminal stations are sending a string of signals (step 267). On the contrary, if the announcement transmission timing does not reach, the procedures following step 53 will be repeatedly executed. In response to the radio communication end request from the user or the like, the operation will be completed (step 37). Otherwise, the procedures following step 53 will be repeatedly executed.

In the sixth embodiment, the base station communication device 7 is described to send the announcement information. The base station communication device 7 can also send other kinds of information using the transmission power derived according to the procedure shown in FIG. 26. In such a case, the transmission method determining unit 161 can determine a data transmitting method in accordance with the procedure shown in FIG. 19.

Further, in the sixth embodiment, the transmission power of the base station communication device 7 is determined on the basis of the transmission power included in the announcement information and is sent by the radio base station 5 belonging to the communication system 1. Therefore, the transmission power of the base station communication device 7 can be precisely determined and does not adversely affect the radio base station 5.

[Second Configuration of Communication Device]

The base station communication device 7 belonging to the communication system 2 can determine the transmission power by performing radio communications with the base station 5 belonging to the communication system 1.

Figure 27:
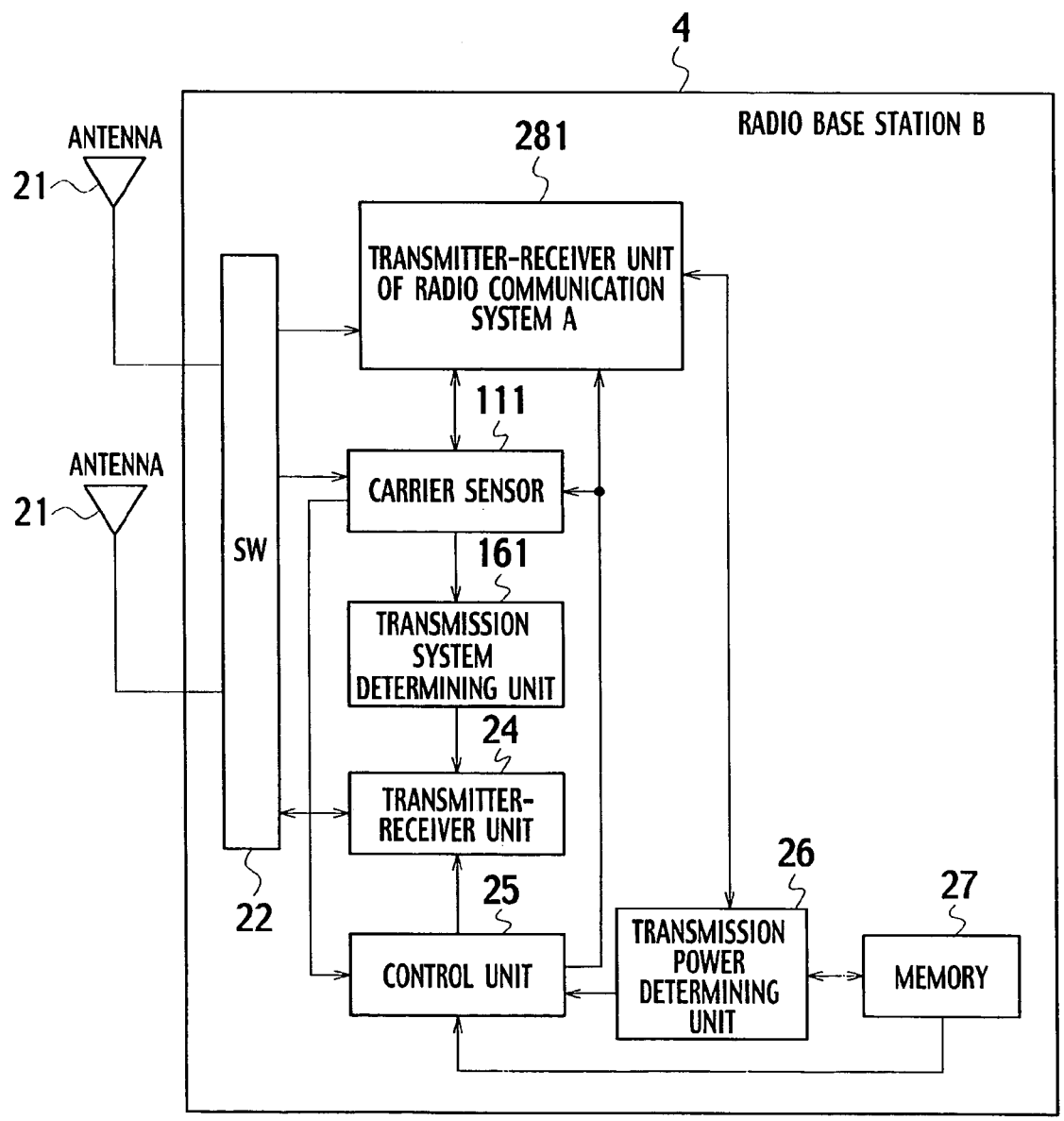
FIG. 27 is a block diagram showing a second configuration of the radio communication device constituting the radio communication system in the sixth embodiment of the invention.

Referring to FIG. 27, the base station communication device 27 of the sixth embodiment is provided with a transmitter-receiver unit 281 for the communication system A in place of the synchronizer 23, reception power meter 251 and announcement information receiver 252 shown in FIG. 24.

[Third Communication Operation of Radio Communication System and Communication Device]

Figure 28:
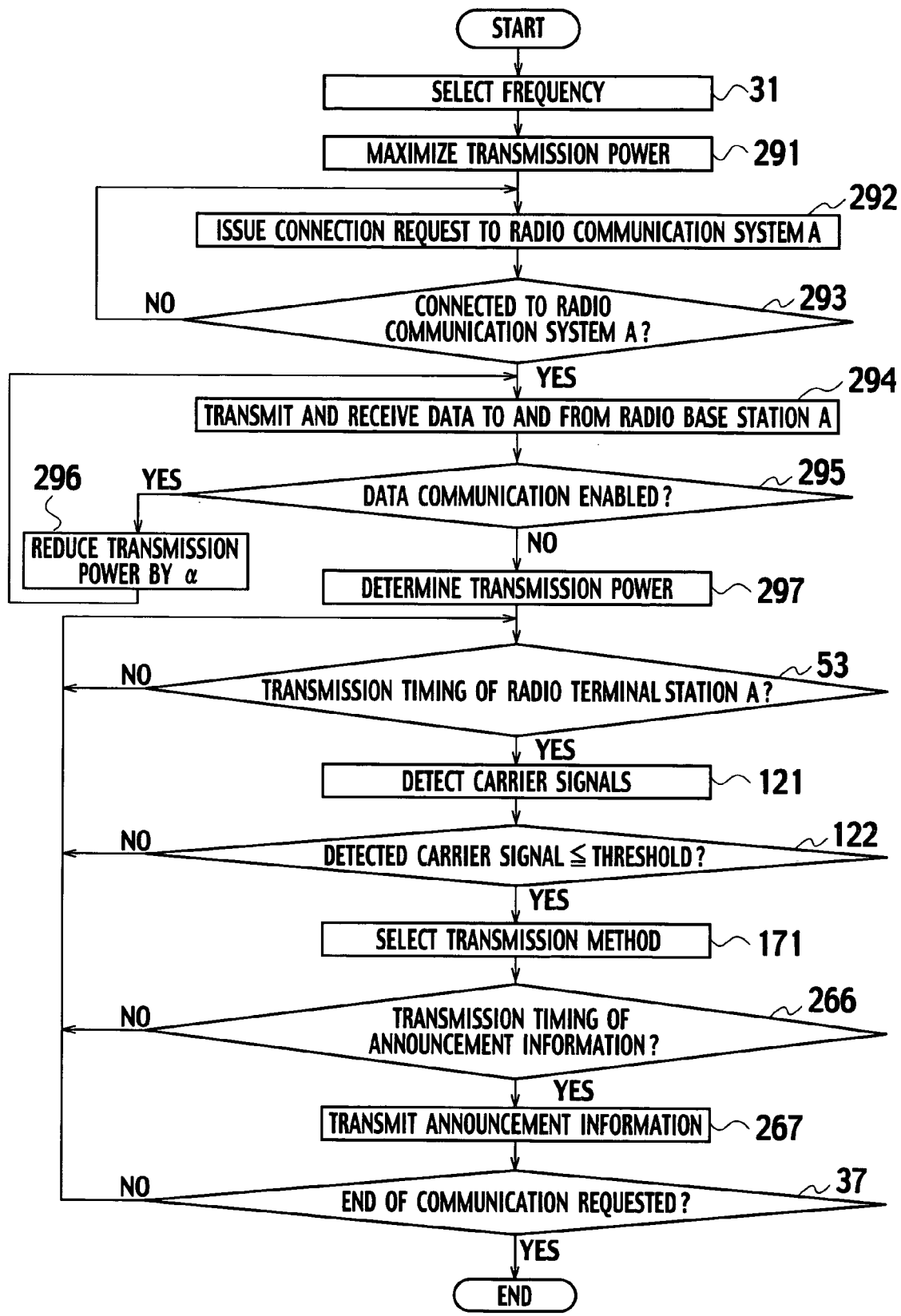
FIG. 28 is a flowchart showing a third operation of the radio communication device for sending the announcement information.

FIG. 28 shows a flowchart for the base station radio communication device 7 to transmit the announcement information of the communication system 2. The control unit 25 of the base station communication device 7 selects a frequency for the operation of the base station communication device 7 (step 31), and outputs the selected frequency to the transmitter-receiver unit 281. The transmitter-receiver unit 281 for the communication system A (called the "transmitter-receiver unit 281"). The transmitter-receiver unit 281 maximizes the transmission power at the frequency channel received from the control unit 25 (step 291), and transmits a connection request signal to the base station 5 (step 292). When connected to the base station 5 (step 293), the transmitter-receiver unit 281 transmits and receives data to and from the radio base station 5 (step 294), determines whether or not the data transmission-reception is successful (step 295), reduces the transmission power by a given amount (α), and repeats the procedures following step 294.

On the contrary, if the data transmission-reception is not successful, the current transmission power is sent to the transmission power determining unit 26, which subtracts the margin from the transmission power received from the transmitter-receiver unit 281, and determines the derived transmission power as the transmission power of the base station communication device 7. For instance, the transmitter-receiver unit 281 maximizes the transmission power to 30 [dBm] first of all, connects itself to the base station 5, and performs the data transmission and reception. It is assumed that the transmission power is reduced by each 5 [dBm]. When the data transmission-reception is successful using the 30 [dBm] transmission power, next data transmission-reception is conducted using the 25 [dBm] transmission power. Further, when the data transmission-reception is successful using the 25 [dBm] transmission power, next data transmission-reception is conducted using the 20 [dBm] transmission power. The margin is assumed to be 10 [dBm]. If the data transmission-reception is not successful using the transmission power of 20 [dBm], the transmission power is reduced by 10 [dBm], and is used for the base station communication device 7. Once the transmission power is determined, the transmission power determining unit 26 sends it to the control unit 25, which transfers the transmission power to the transmitter-receiver unit 24.

In accordance with the signal transmission timing for the uplink frame (step 53), the carrier sensor 111 detects a carrier signal for a short time period during which the radio terminal station 6 belonging to the communication system 1 is sending a string of signals (step 121). The carrier sensor 111 compares the detected carrier signal with the predetermined threshold (step 122). If the detected carrier signal is equal to or less than the predetermined threshold, the transmission method determining unit 161 selects a transmission method for sending the announcement information, and provides the transmitter-receiver unit 24 with the transmission method and the transmission start signal (step 171). For instance, the transmission method may be the BPSK modulation method or the like.

The transmitter-receiver unit 24 determines whether or not the transmission timing of the announcement information reaches (step 266). If so, the transmitter-receiver unit 24 transmits the announcement information including the transmission power inputted from the control unit 25 using the transmission power inputted from the control unit 25 with a method of transmitting determined by the transmission method determining unit 161 in response to the transmission start signal from the transmission method determining unit 161 for the period during which the radio terminal station belonging to the target communication system is sending a string of signals stored in the memory 27 (step 267). If the timing for the announcement information does not reach, the procedures following step 53 will be repeated. If there is a communication end request from the user or the like (step 37), the communication procedure will be terminated. On the contrary, if there is no communication end request, the procedures following step 53 will be repeated.

In the sixth embodiment, the third communication operation relates to the case in which the base station communication device 7 transmits the announcement information. The transmission power derived in accordance with the procedure shown in FIG. 28 can be also used for the base station 7 to send data other than the announcement information. In such a case, the transmission method of the data will be determined by the transmission method determining unit 161 in the procedure shown in FIG. 19.

Further, in the sixth embodiment, the base station communication device 7 is described to communicate with the radio base station 5 belonging to the communication system 1, and adjusts the transmission power which disables the communication with the base terminal station 5. The base station communication device 7 determines its transmission power in accordance with the adjusted transmission power. The base station communication device 7 can reliably determine its own transmission power without adversely affecting the radio base station 5.

[Third Configuration of Communication Device]

The transmission power of the base station communication device 7 belonging to the communication system 2 can be also determined on the basis of positional data of the base station communication device 7 and the positional data of the base station 5. Both of the positional data are acquired via a global positioning system (GPS).

Figure 29:
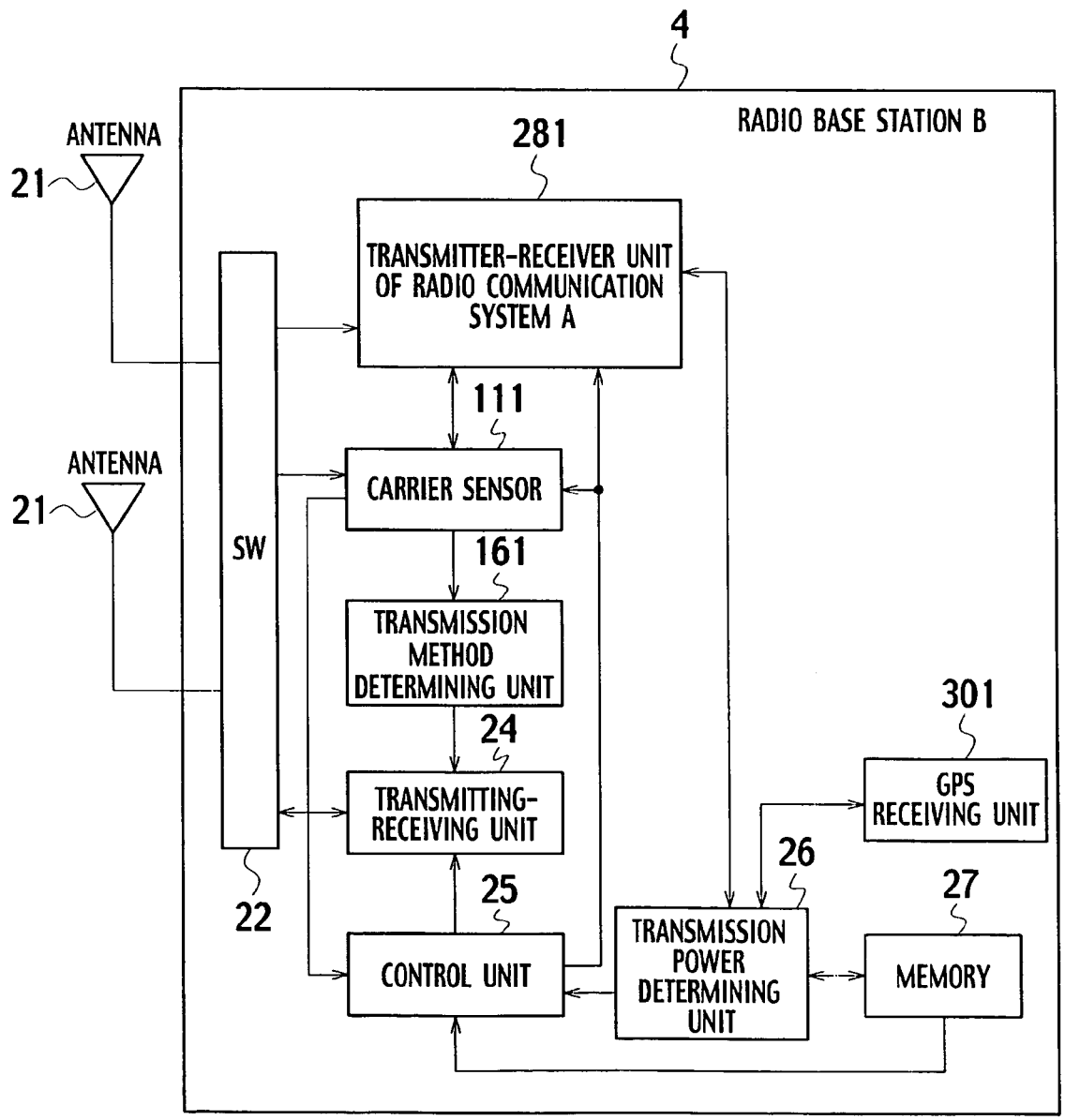
FIG. 29 is a block diagram showing a third configuration of the communication device constituting the radio communication system in the sixth embodiment of the invention.

Referring to FIG. 29, the base station communication device 7 includes a GPS receiver 301 in addition to the units shown in FIG. 27.

[Fourth Communication Operation of Radio Communication System and Communication Device]

FIG. 30 is a table showing the relationship between distances between the base station communication device 7 of the communication system 2 and the radio base station 5 of the communication system 1, and the transmission power depending upon the distances. The table is stored in the memory 27 of the base station communication device 7.

Figure 31:
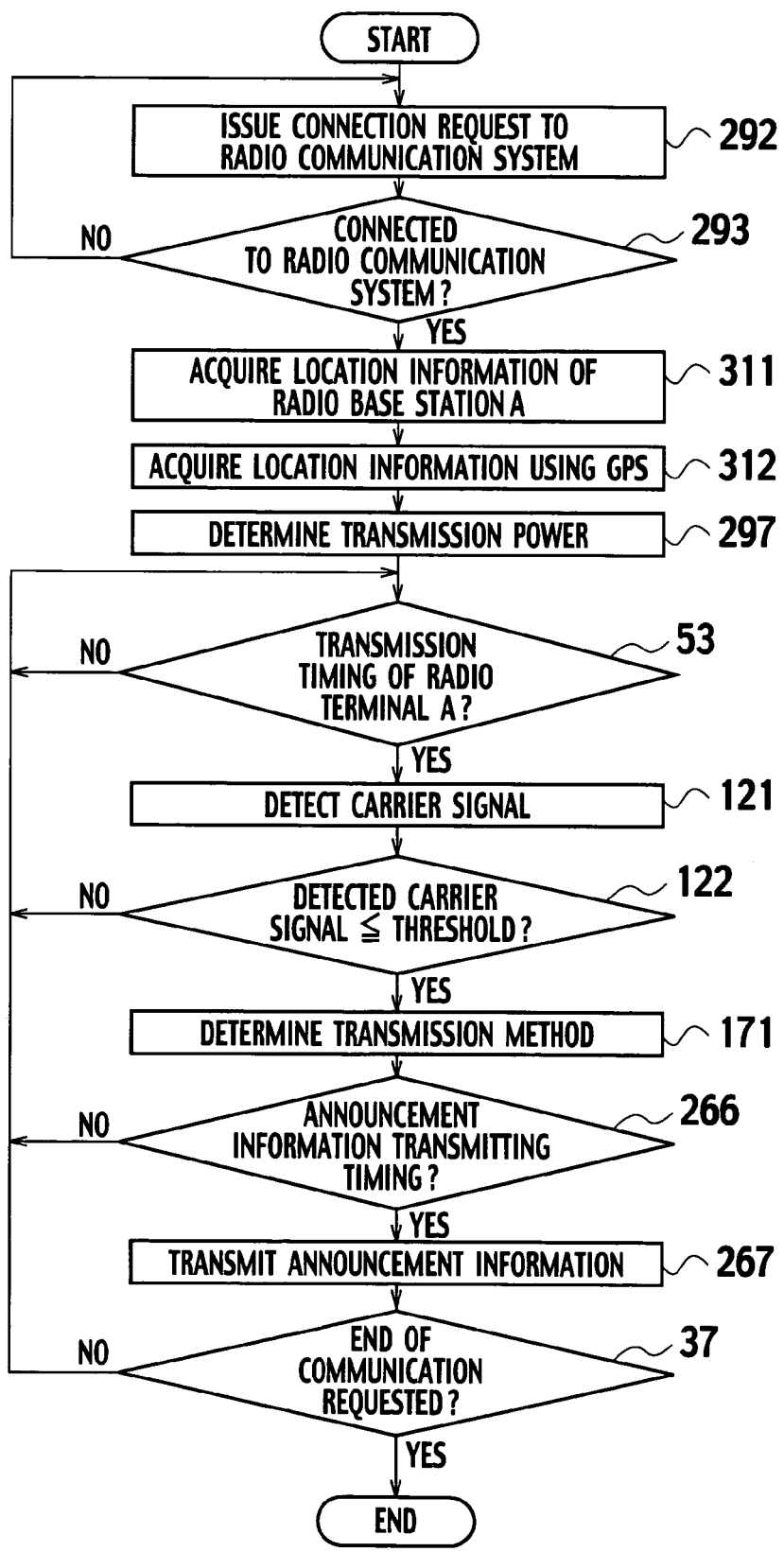
FIG. 31 is a flowchart showing a fourth operation of a radio communication device to transmit announcement information of the radio communication system of FIG. 29.

FIG. 31 is a flowchart showing sequence of operations for the base station communication device 7 to send the announcement information of the communication system 2. The transmitter-receiver 281 sends a communication request signal to the radio base station 5 (step 292). When connected to the base station 5 (step 293), the base station communication device 7 acquires the positional data of the base station 5 via the communication system 1 (step 311), and transfers the acquired positional data to the transmission power determining unit 26. After reception of the positional data of the base station 5, the GPS receiver 301 receives a signal from a GPS satellite, and acquires the positional data of the base station communication device 7 (step 312). The positional data are outputted to the transmission power determining unit 26.

The transmission power determining unit 26 selects the transmission power for the base station communication device 7 on the basis of the positional data of the base station 5, and on the basis of the table stored in the memory 27. For instance, the positional data of the radio base station 5 are assumed to represent coordinates "1028" and "39", and the positional data of the base station communication device 7 represent "574" and "197". The distance between the base station 5 and the base station communication device 7 is calculated to be 480.7 m. Therefore, the transmission power of the base station communication device 7 is determined to be 3 [dBm] on the basis of the calculated distance and the table shown in FIG. 30.

The transmission power determining unit 26 sends the transmission power to the control unit 25, which transfers the transmission power to the transmitter-receiver unit 24. In accordance with the uplink frame signal transmission timing received from the transmitter-receiver unit 281, the carrier sensor 111 detects a carrier signal during a short time period in which the radio terminal station 6 of the communication system 1 is sending a string of signals (step 121). The carrier sensor 111 compares the detected carrier signal with the predetermined threshold (step 122), and sends the detected result and the transmission start timing information to the transmission method determining unit 161 if the detected result is equal to or less than the predetermined threshold. The transmission method determining unit 161 selects a transmission method for the announcement information, and provides the transmission method to the transmitter-receiver unit 24 (step 171). For instance, the transmission method may be the BPSK modulation system or the like.

The transmitter-receiver 24 determines whether or not the announcement information transmitting timing reaches (step 266). If so, the transmitter-receiver 24 transmits the announcement information including the transmission power inputted from the control unit 25 using the transmission power inputted from the control unit 25 with a method of transmitting determined by the transmission method determining unit 161 in response to the transmission start signal from the transmission method determining unit 161 while the terminal stations are continuously sending signals stored in the memory 27 (step 267). On the contrary, if the announcement transmitting timing does not reach, the procedures following step 53 will be repeatedly executed. In response to the communication end request from the user or the like, the operation will be completed (step 37). Otherwise, the procedures following step 53 will be repeatedly executed.

The foregoing communication operation relates to the case in which the base station communication device 7 transmits the announcement information. The transmission power derived in accordance with the procedure shown in FIG. 31 can be also used for the base station 7 to send data other than the announcement information. In such a case, the transmission method of the data will be determined by the transmission method determining unit 161 in the procedure shown in FIG. 19.

With the fourth communication operation of the sixth embodiment, the transmission power of the base station communication device 7 can be reliably determined on the basis of positional data of the base station 5 and the positional data of the base station communication device 7, so that the base station 5 will not be adversely affected.

Seventh Embodiment

In this embodiment, a communication system and a communication device are configured and operate differently from those of the sixth embodiment (shown in FIG. 24).

[First Configuration of Communication Device]

Figure 32:
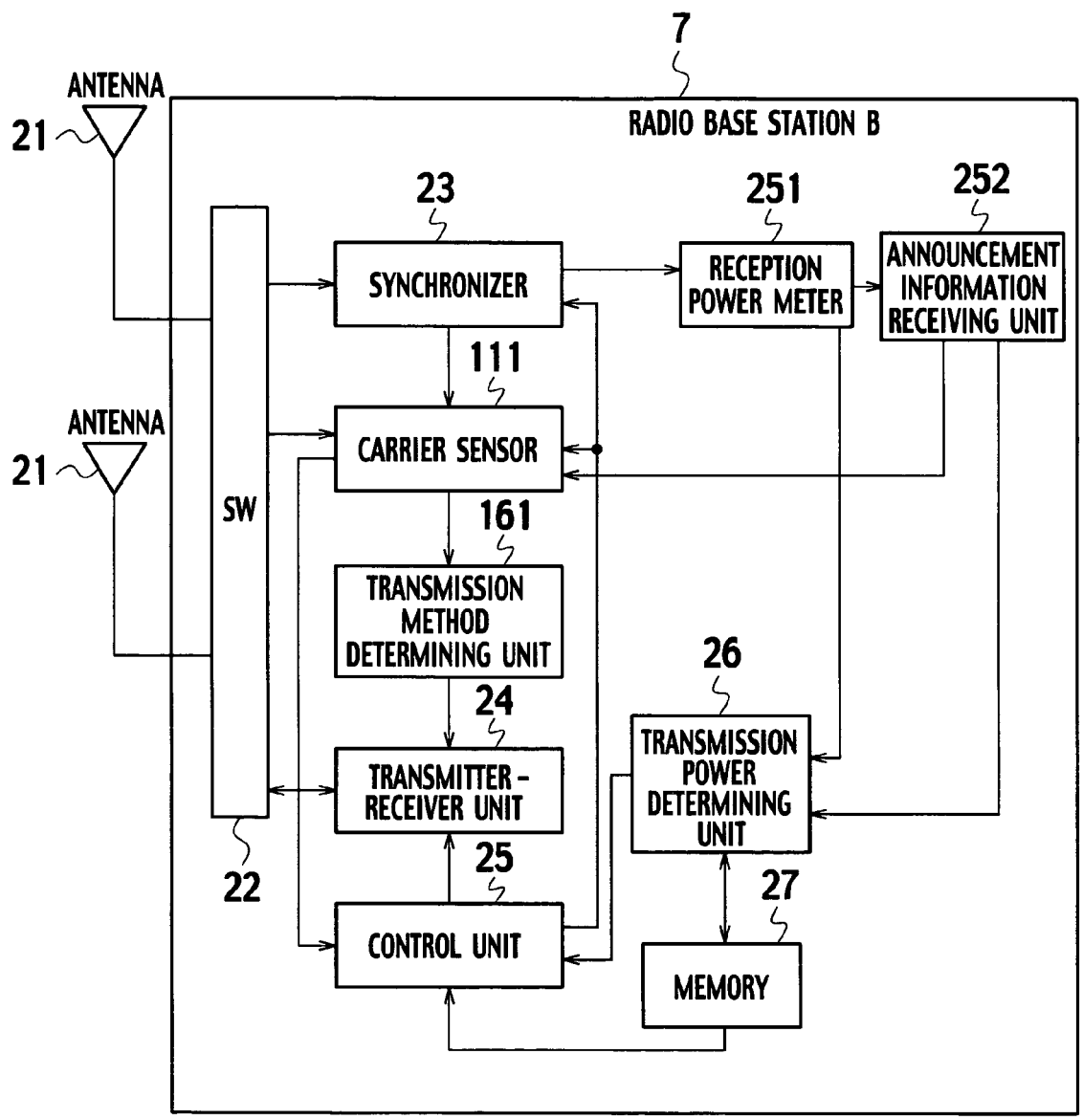
FIG. 32 is a block diagram showing a first configuration of the radio communication device constituting the radio communication system in a seventh embodiment of the invention.

Referring to FIG. 32, each base station communication device 7 (see FIG. 2) constituting the communication system 2 is configured similarly to the base station communication device 7 of the sixth embodiment, but also includes a signal wire extending between the transmission power determining unit 26 and the control unit 25. The memory 27 stores a target value of the transmission power of the base station communication devices 7.

[First Communication Operation of Communication System and Communication Device]

Figure 33:
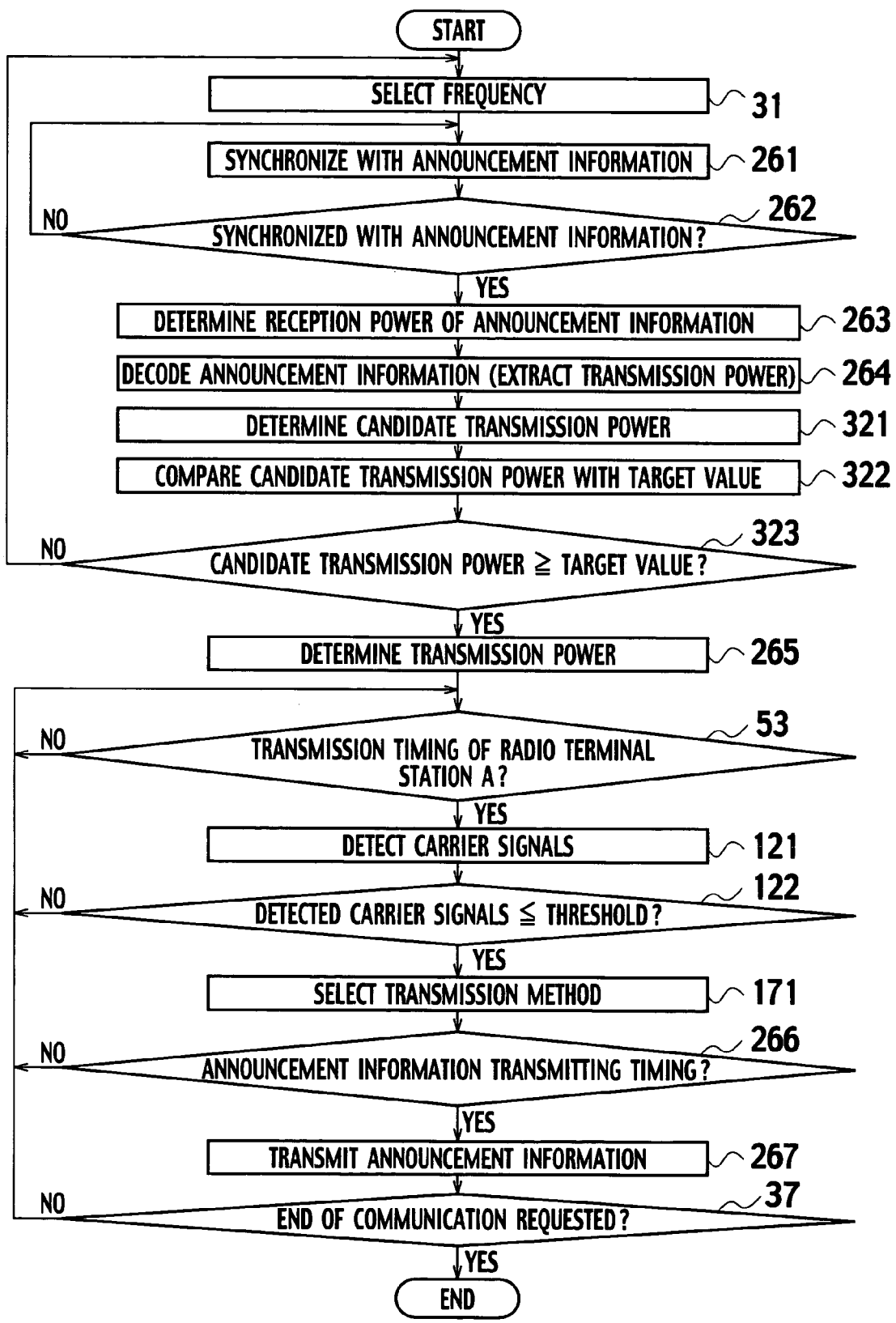
FIG. 33 is a flowchart showing a first operation of the radio communication device to transmit announcement information of the radio communication system of FIG. 32.

The communication device 7 transmits the announcement information of the communication system 2 in accordance with the procedure shown in FIG. 33. The control unit 25 of the communication device 7 selects an operation frequency (step 31), and outputs it to the synchronizer 23, the transmitter-receiver unit 24 and the carrier sensor 111. The synchronizer 23 operates in synchronization with the announcement information from the base station 5 (step 261). When synchronized, the synchronizer 23 outputs the timing information and reception signal in the announcement information to the reception power meter 251 (step 262). Further, the communication device 7 sends an uplink frame transmission timing for the downlink frame to the carrier sensor 111 if such a timing is known. The reception power meter 251 measures reception power of the announcement information on the basis of the timing information and the announcement information received from the synchronizer 23 (step 263). The reception power is assumed to be Rm [dBm].

The reception power meter 251 provides the measured reception power to the transmission power determining unit 26, and sends the announcement information from the synchronizer 23 to the announcement information receiver 252. The announcement information receiver 252 decodes the announcement information, extracts transmission power from the announcement information (step 264), and outputs it to the transmission power determining unit 26. When the announcement information includes the uplink frame transmission timing, it will be sent to the carrier sensor 111. It is assumed here that the transmission power extracted from the announcement information is Rd [dBm]. The transmission power determining unit 26 determines candidate transmission power Pc [dBm] using the following formula (5) (step 265) on the basis of the reception power Rm [dBm] received from the reception power determining unit 251, the transmission power Rd [dBm] received from the announcement information receiver 252, and the information S [dBm] concerning the reception sensitivity of the radio base station 5 and the margin M [dBm], both of which are stored in the memory 27.

$$Pc = Rd - Rm + S - M \tag{5}$$

For instance, if Rm is −70 [dBm], Rd is 40 [dBm], S is −90 [dBm], and M is 10 [dBm], the candidate transmission power Pc will be derived as follows.

$$Pc = 40 - (-70) + (-90) - 10 = 10 \text{ [dBm]} \tag{6}$$

The transmission power determining unit 26 compares the candidate transmission power with a target value (step 322). When the candidate transmission power is equal to or larger than the target value (step 323), the transmission power determining unit 26 selects the candidate transmission power as the transmission power (step 265), and sends it to the control unit 25, which transfers it to the transmitter-receiver unit 24. On the contrary, if the candidate transmission power is below the target value, the control unit 25 changes the frequency (step 31), and repeats the procedures following step 261.

In accordance with the transmission timing of the uplink frame signal received from the transmitter-receiver unit 252, the carrier sensor 111 detects a carrier signal during a short time period in which the radio terminal station 6 of the communication system 1 is sending a string of signals (step 121). The carrier sensor 111 compares the detected carrier signal with the predetermined threshold (step 122), and sends the detected results and the transmission start timing information to the transmission method determining unit 161 if the detected result is equal to or less than the threshold.

The transmission method determining unit 161 selects a method of transmitting the announcement information, and sends the selected method and the transmission start signal to the transmitter-receiver unit 24 (step 171). For instance, the BPSK modulation method or the like will be selected as the transmission method. The transmitter-receiver 24 determines whether or not the announcement information transmission timing reaches (step 266). If so, the transmitter-receiver 24 transmits the announcement information including the transmission power inputted from the control unit 25 using the transmission power inputted from the control unit 25 with a method of transmitting determined by the transmission method determining unit 161 in response to the transmission start signal from the transmission method determining unit 161 while the terminal stations are sending a string of signals (step 267). On the contrary, if the announcement transmission timing does not reach, the procedures following step 53 will be repeatedly executed. In response to the radio communication end request from the user or the like (step 37), the operation will be completed. Otherwise, the procedures following step 53 will be repeatedly executed.

In the first communication operation related to the seventh embodiment, the base station communication device 7 is described to send the announcement information. Further, the base station communication device 7 can use the transmission power acquired in accordance with the procedure shown in FIG. 25 in order to send data other than the announcement information. In such a case, the transmission method for sending the data is determined by the transmission method determining unit 161 according to the procedure shown in FIG. 19.

According to the seventh embodiment, comparisons are made between the transmission power included in the announcement information to be sent by the radio base station 5 of the communication system 1, the candidate transmission power included in the announcement information for the base station communication device 7, and the target value. If the candidate transmission power is below the target value, the frequency channel is changed in order to select transmission power which is equal to or larger than the target value. This enables communications to be carried out by meeting requirements related to the communication system 2.

[Second Configuration of Communication Device]

Figure 34:
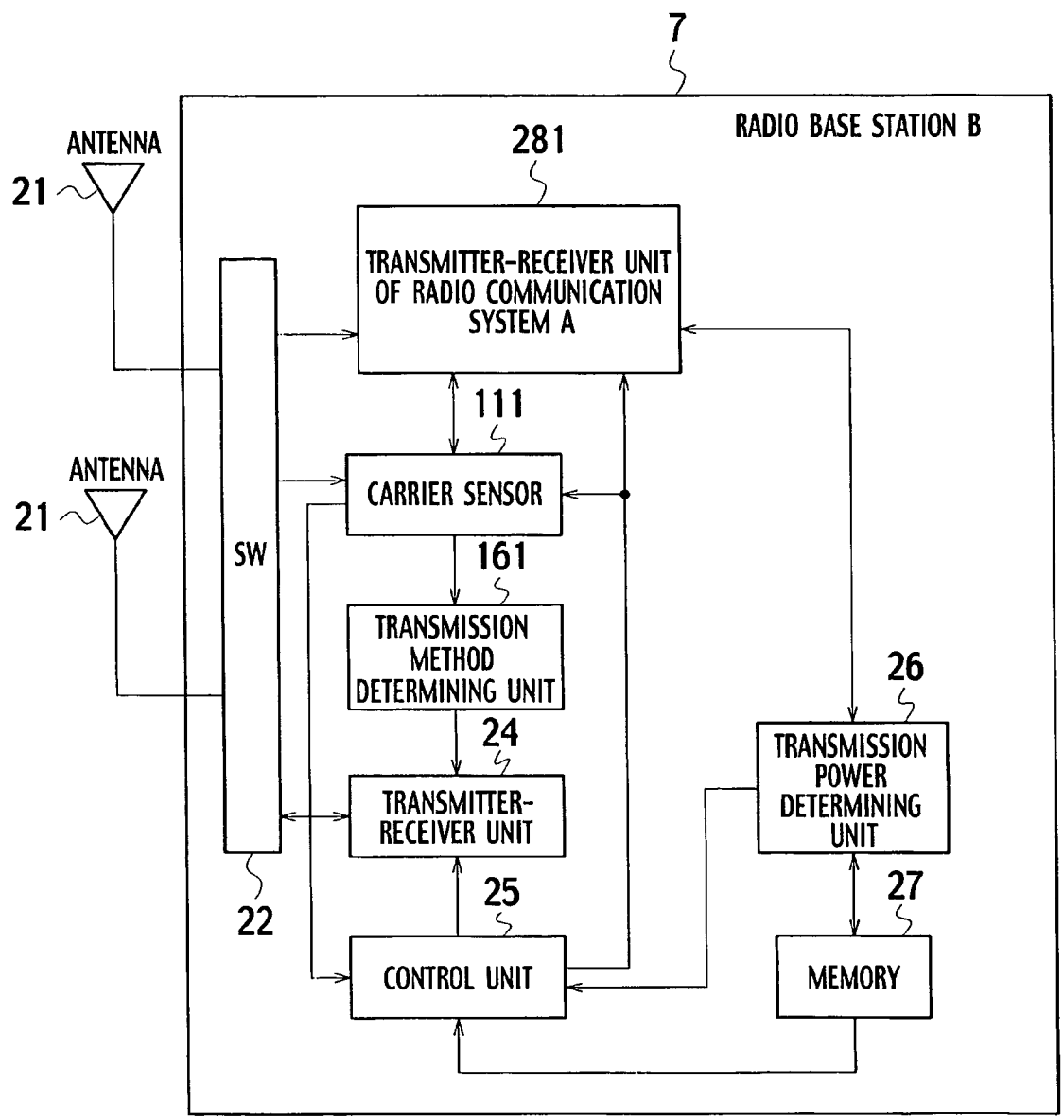
FIG. 34 is a block diagram showing a second configuration of the radio communication device constituting the radio communication system in a seventh embodiment of the invention.

The following describe a modification of the base station communication device 7 of the seventh embodiment. Referring to FIG. 34, the base station communication device 7 (shown in FIG. 32) includes a transmitter-receiver unit 281 in place of the synchronizer 23, reception power meter 251 and announcement information receiver 252. The memory 27 stores the target value of the transmission power of the base station communication device 7.

[Second Communication Operation of Radio Communication System and Communication Device]

Figure 35:
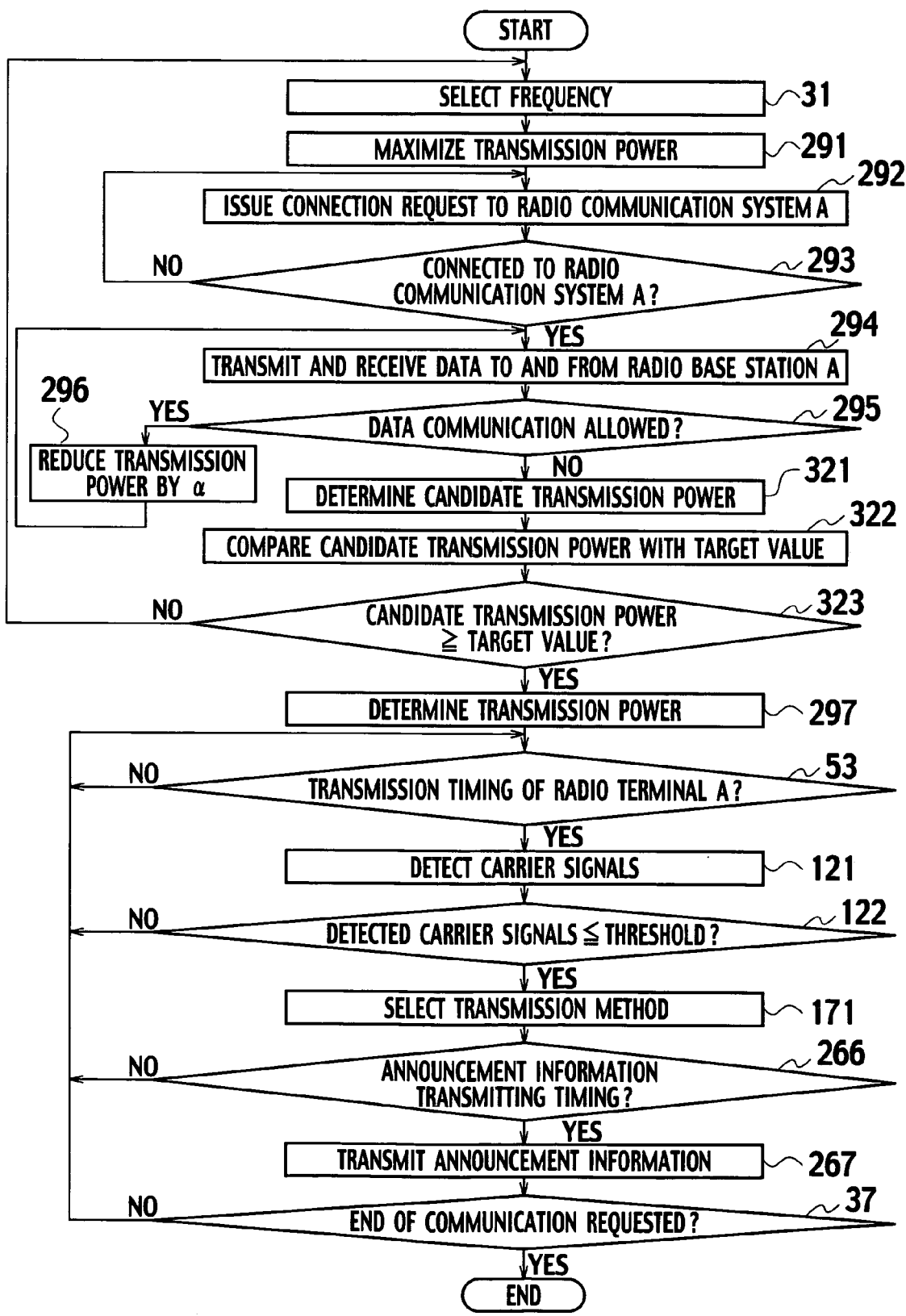
FIG. 35 is a flowchart showing a second operation of the radio communication device to transmit announcement information of the radio communication system of FIG. 34.

The base station communication device 7 (shown in FIG. 34) transmits the announcement information of the communication system 2 in accordance with the procedure shown in the flowchart of FIG. 35. The control unit 25 of the base station communication device 7 selects a frequency at which the base station communication device 7 operates (step 31), and sends the selected frequency to the transmitter-receiver unit 281. The transmitter-receiver unit 281 maximizes the transmission power at the frequency received from the control unit 25 (step 291), and transmits a connection request signal to the base station 5 (step 292). When connected to the base station 5 (step 293), the transmitter-receiver unit 281 transmits and receives data to and from the base station 5 (step 294). It is checked whether or not the data transmission-reception is successful (step 295). When the data transmission-reception is successful, the transmission power is reduced by the given amount (α). Thereafter, the procedure following step 294 will be repeatedly executed. However, if the data transmission is not successful, the current transmission power is outputted to the transmission power determining unit 26, which determines candidate transmission power for the base station communication device 7 by subtracting the margin from the current transmission power. The margin is received from the transmitter-receiver unit 281.

For instance, the transmitter-receiver unit 281 initially maximizes the transmission power to 30 [dBm], connects to the base station 5, and transmits and receives the data to and from the base station 5. It is assumed here that the transmission power is reduced by each 5 [dBm] after the successful data transmission and reception. When the data transmission-reception is successful at the transmission power of 30 [dBm], next data transmission-reception will be executed at the transmission power of 25 [dBm]. If the data transmission-reception is successful at the transmission power of 25 [dBm], next data transmission-reception will be executed at the transmission power of 20 [dBm]. On the contrary, if the data transmission-reception is not successful at the transmission power of 20 [dBm], the margin of 10 [dBm] is subtracted from the transmission power, and the remaining transmission power of 10 [dBm] will be used as candidate transmission power for the base station communication device 7.

The transmission power determining unit 26 compares the candidate transmission power with the target transmission power stored in the memory 27 (step 322). If the candidate transmission power is equal to or larger than the target value (step 265), the transmission power determining unit 26 selects the candidate transmission power as the transmission power (step 265), provides the determined transmission power to the control unit 25, which transfers the transmission power to the transmitter-receiver unit 24. On the contrary, if the candidate transmission power is below the target value, a frequency change request is sent to the control unit 25. The control unit 25 changes the frequency (step 31), so that operations following step 291 will be repeatedly executed.

In accordance with the transmission timing of the uplink frame signal from the transmitter-receiver unit 281 (step 53), the carrier sensor 111 detects a carrier signal for a short period of time while the radio terminal station 6 of the communication system 1 is sending a string of signals (step 121). Then, the carrier sensor 111 compares the detected carrier signal with the predetermined threshold (step 122). When the detected carrier signal is equal to or less than the threshold, the carrier sensor 111 sends the detected carrier signal and the transmission start timing information to the transmission method determining unit 161. The transmission method determining unit 161 selects a transmission method, and sends the transmission method and the transmission start signal to the transmitter-receiver 24 (step 171). For instance, the transmission method may be the BPSK modulation method or the like.

The transmitter-receiver 24 checks whether or not the timing for sending the announcement information reaches (step 266). If so, the transmitter-receiver 24 transmits the announcement information including the transmission power inputted from the control unit 25 using the transmission power inputted from the control unit 25 with a method of transmitting determined by the transmission method determining unit 161 in response to the transmission start signal from the transmission method determining unit 161 while the terminal stations are sending a string of signals (step 267). On the contrary, if the announcement transmitting timing does not reach, the procedures following step 53 will be repeatedly executed. In response to the communication end request from the user or the like (step 37), the operation will be completed (step 37). Otherwise, the procedures following step 53 will be repeatedly executed.

The second communication operation relates to the case in which the base station communication device 7 transmits the announcement information. The transmission power acquired in accordance with the procedure shown in FIG. 35 can be also used for the base station communication device 7 to send data other than the announcement information. In such a case, the transmission method of the data will be determined by the transmission method determining unit 161 in the procedure shown in FIG. 19.

According to the seventh embodiment, the base station communication device 7 is assumed to communicate with the base station 5 belonging to the first communication system 1. Candidate transmission power of the base station communication device 7 is calculated on the basis of transmission power which is adjusted to disable communications with the base station 5. The calculated candidate transmission power is compared with a target value. If the candidate transmission power is below the target value, the frequency channel is changed in order to select transmission power which is above the target value. This enables communications to be carried out by meeting requirements related to the communication system 2.

Eighth Embodiment

Figure 36:
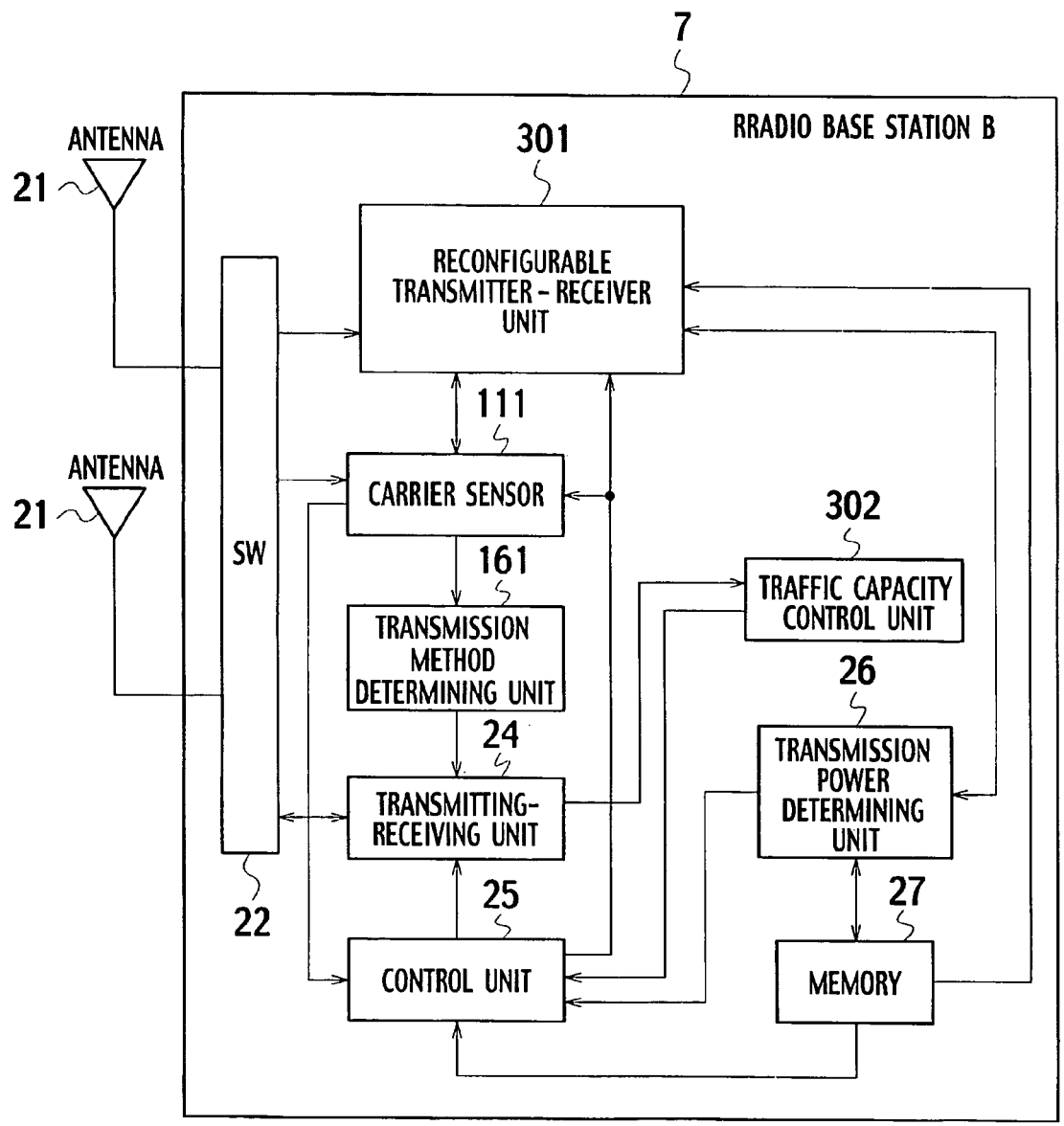
FIG. 36 is a block diagram of a radio communication device constituting a radio communication system in an eighth embodiment of the invention.

In this embodiment, a communication system and a communication device are configured and operate differently from those of the seventh embodiment (shown in FIG. 34).
[Configuration of Communication Device]
Referring to FIG. 36, each base station communication device 7 (see FIG. 2) constituting the communication system 2 is configured similarly to the base station communication device 7 of the seventh embodiment, but includes a re-configurable transmitter-receiver unit 301 in place of the transmitter-receiver unit 281, and a traffic controller 302. For instance, the reconfigurable transmitter-receiver unit 301 is preferably constituted by a reconfigurable processor, a digital signal processor (DSP), a field programmable gate array (FPGA) or the like. The control unit 25 can select a frequency and a target communication system with which the base station communication device 7 shares the frequency.

Figure 37A:
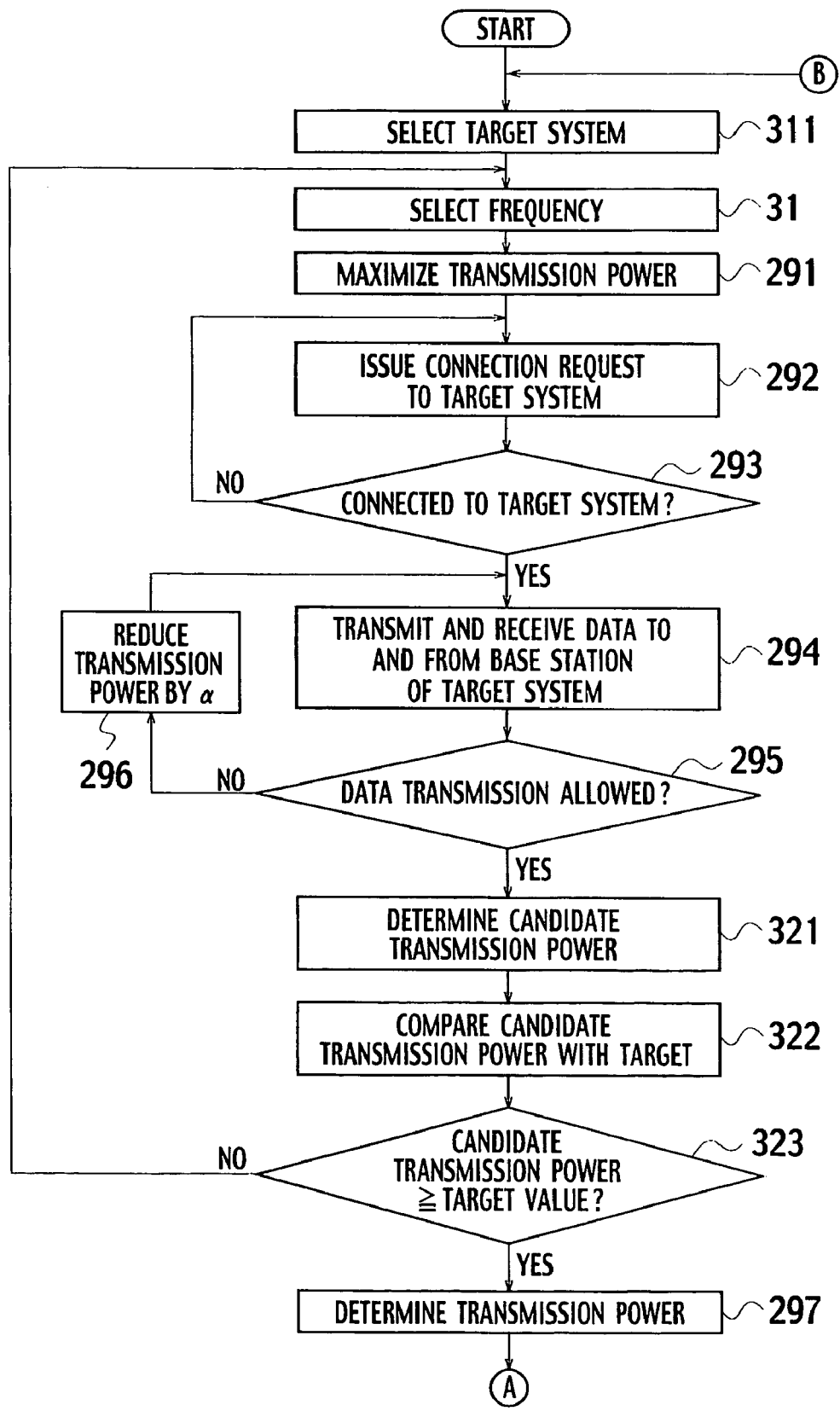
FIG. 37A and FIG. 37B are a flowchart showing operations of the radio communication device to transmit announcement information of the radio communication system in the eighth embodiment of the invention.
Figure 37B:
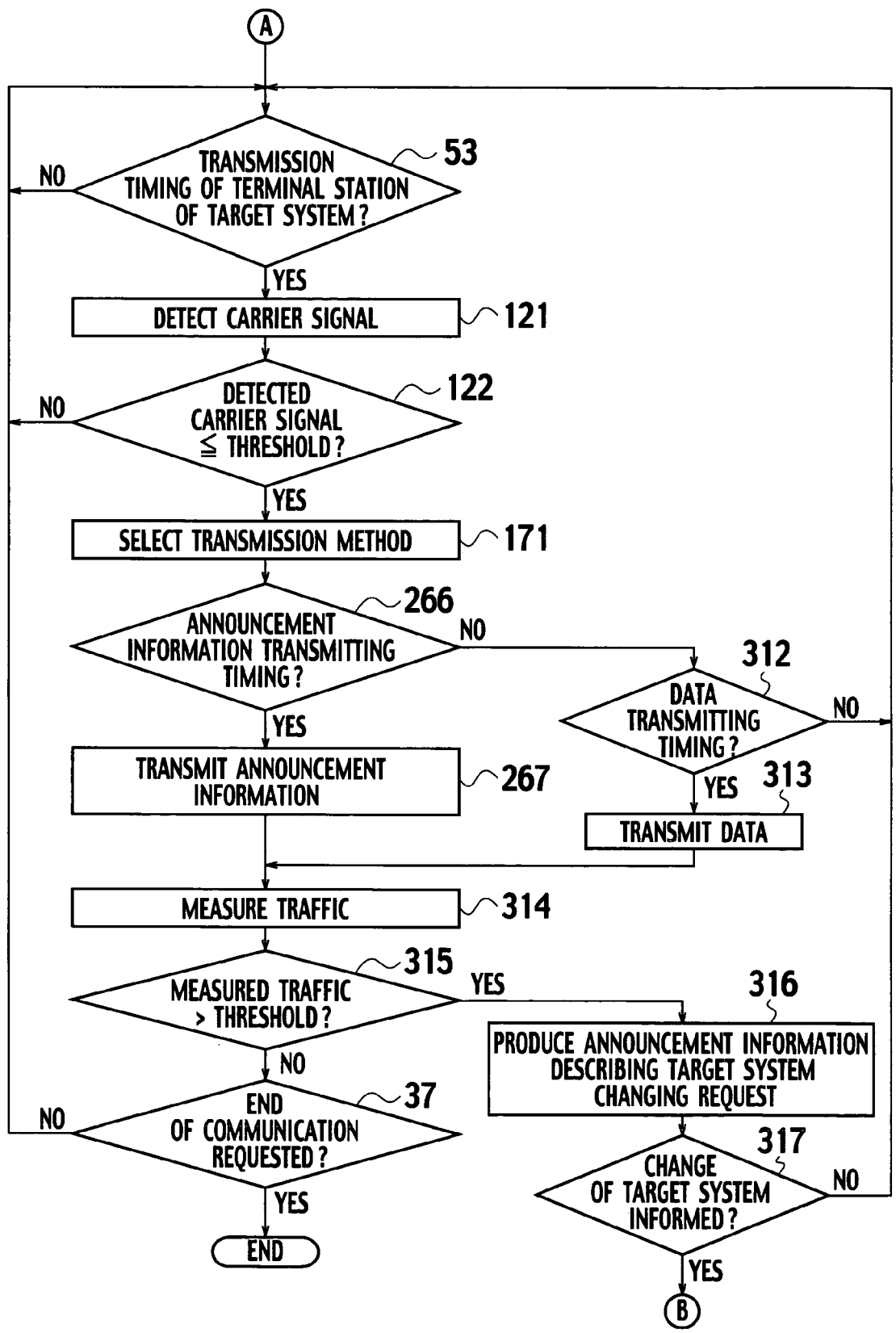

Further, the memory 27 stores not only information concerning the data transmission-reception of the communication systems 1, C, D and so on in addition to the communication system 2, but also target value of the transmission power of the base station communication device 7. The foregoing information covers software and hardware data for the communication systems 1, C, D and so on which are necessary to process data.
[Communication Operation of Communication System and Communication Device]
The base station communication device 7 (shown in FIG. 36) transmits the announcement information of the communication system 2 according to the procedures shown in the flowchart of FIG. 37A and FIG. 37B. The control unit 25 of the base station communication device 7 selects a target communication system with which the communication system 2 shares the frequency, and downloads in the reconfigurable transmitter-receiver unit 301 information related to the data transmission-reception for the communication system and selected from the memory 27 (step 311). Thereafter, the control unit 25 selects a frequency channel for the base station communication device 7 out of a plurality of frequency channels assigned to the target communication system (step 31), and outputs the selected frequency channel to the reconfigurable transmitter-receiver unit 301. The reconfigurable transmitter-receiver unit 301 maximizes the transmission power received from the control unit 25 (step 291), and sends a connection request signal to the base station of the target communication system (step 292). When connected to the target communication system (step 293), the reconfigurable transmitter-receiver unit 301 transmits and receives the data to and from the radio base station of the target communication system (step 294). The success or failure of the data transmission-reception is checked (step 295). The given amount (a) is reduced from the transmission power when the data transmission-reception is successful. Thereafter, the procedure following step 294 will be repeatedly executed. On the contrary, if the data transmission-reception is unsuccessful, the current transmission power is outputted to the transmission power determining unit 26, which subtracts the margin from the transmission power (received from the transmitter-receiver unit 281, so that resultant transmission power is selected as candidate transmission power.

For instance, the reconfigurable transmitter-receiver unit 301 initially maximizes the transmission power to 30 [dBm], connects to the base station 5, and transmits and receives the data to and from the base station 5. It is assumed here that the transmission power is reduced by each 5 [dBm] after the successful data transmission and reception. When the data transmission-reception is successful at the transmission power of 30 [dBm], next data transmission-reception will be executed at the transmission power of 25 [dBm]. If the data transmission-reception is successful at the transmission power of 25 [dBm], next data transmission-reception will be executed at the transmission power of 20 [dBm]. On the contrary, if the data transmission-reception is not successful at the transmission power of 20 [dBm], the margin of 10 [dBm] is subtracted from the transmission power, and the remaining transmission power of 10 [dBm] will be used as candidate transmission power for the base station communication device 7. The transmission power determining unit 26 compares the candidate transmission power with the target value of the transmission power stored in the memory 27 (step 322). If the candidate transmission power is equal to or more than the target value (step 323), it is selected as the transmission power (step 297), and sends it to the control unit 25. The control unit 25 transfers the transmission power to the transmitter-receiver unit 24. If the candidate transmission power is below the target value, the control unit 25 issues a frequency changing command, and changes the frequency (step 31), and repeats the procedure following step 291.

At the signal transmission timing of the uplink frame (received from the reconfigurable transmitter-receiver unit 301 (step 53), the carrier sensor 111 detects a carrier signal during a short time period in which the radio terminal station 6 of the communication system 1 is sending a string of signals (step 121). The carrier sensor 111 compares the detected carrier signal with the predetermined threshold (step 122), and sends the detected result and the transmission start timing information to the transmission method determining unit 161 if the detected result is equal to or less than the predetermined threshold. The transmission method determining unit 161 selects a transmission method for the announcement information, and notifies the transmission method to the transmitter-receiver unit 24 (step 171). For instance, the transmission method may be the BPSK modulation system or the like. The data transmission method can be selected in accordance with the procedure as shown by the flowchart in FIG. 19.

The transmitter-receiver unit 24 checks whether or not the transmission timing for the announcement information reaches (step 266). If so, the transmitter-receiver 24 transmits the announcement information including the transmission power inputted from the control unit 25 using the transmission power inputted from the control unit 25 with a method of transmitting determined by the transmission method determining unit 161 in response to the transmission start signal from the transmission method determining unit 161 while the terminal stations belonging to the target communication system are sending a string of signals stored in the memory 27 (step 267). On the contrary, if the announcement information transmitting timing does not reach, it is checked whether or not the data transmitting timing reaches (step 312). If the data transmitting time is reached, the transmitter-receiver 24 transmits the announcement information including the transmission power using the transmission power in response to the transmission start signal from the carrier sensor 111 while the terminal stations belonging to the target communication system are sending a string of signals stored in the memory 27 (step 313).

During the data transmission and reception, the traffic controller 302 measures traffic in the communication system 2 (step 314), compares the measured traffic with a threshold (step 315). If the measured traffic is above the threshold, the traffic controller 302 produces announcement information concerning a request for changing the target system (step 316). It is checked whether or not the announcement information representing the request for changing the target system has been transmitted (step 317). If so, the communication system 2 changes the target communication system with which the communication system 2 shares the frequency (step 311). Thereafter, the procedure following step 31 will be repeatedly executed. Otherwise, the procedure following step 53 will be repeated, thereby transmitting the announcement information representing the target system change request. The traffic is represented by an average throughput. The average throughput as a threshold is assumed to be 30 [Mbps]. If the throughput measured by the traffic controller 302 is above 30 [Mbps], the target communication system will be changed. In step 312, if the data transmitting timing does not reach, the procedure following step 53 will be repeated. Further, if there is a communication end request from the user or the like, the communication operation will be terminated (step 37). Otherwise, the procedure following step 53 will be repeated.

The procedure shown in the flowchart related to the eighth embodiment is executed when the communication system 1 whose frequency channel bandwidth is 30 [kHz] is selected as the target communication system with which the base station communication device 7 shares the frequency. However, if the traffic of the communication system 2 is above the threshold, the communication system C whose frequency channel bandwidth is 5 [MHz] is selected as a target communication system with which the base station communication device 7 shares the frequency.

According to the eighth embodiment, the base station communication device 7 is provided with the reconfigurable transmitter-receiver unit whose transmission-reception functions are reconfigurable. Therefore, even if the traffic is increased in the communication system 2, the target communication system which shares the frequency with the communication system 2 can be changed to a communication system having a broadband. This enables the communication system 2 to meet transmission-reception requests.

Ninth Embodiment

This embodiment relates to a modification of the communication system and communication device of the fifth embodiment shown in FIG. 21, and also relates to a modified configuration and an operation of a terminal station communication device 8.

[First Configuration of Communication Device]

Figure 38:
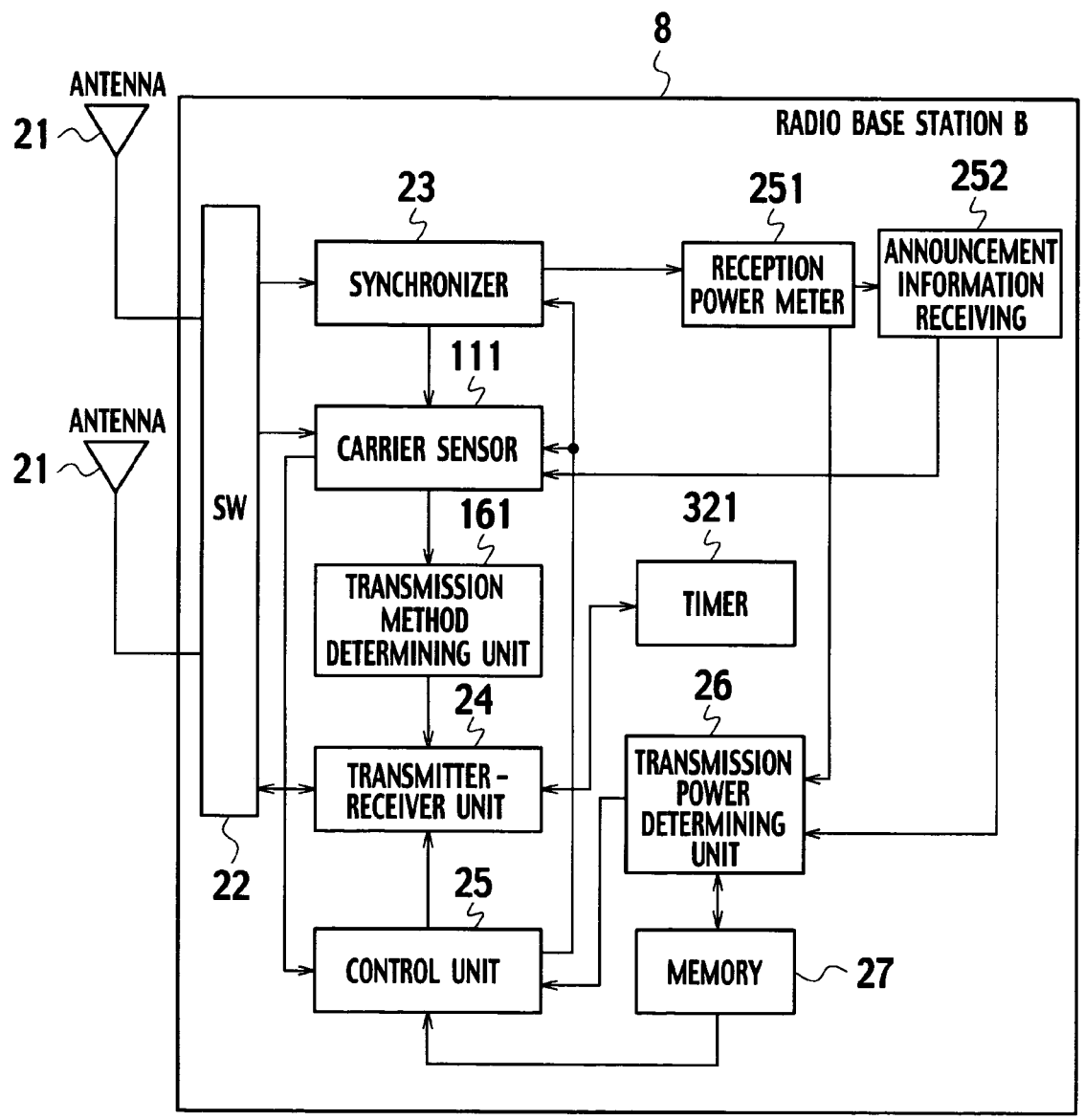
FIG. 38 is a block diagram showing a first configuration of the radio communication device constituting the radio communication system in a ninth embodiment of the invention.

Referring to FIG. 38, the terminal station communication device 8 (shown in FIG. 2) constitutes the communication system 2, and includes the reception power meter 251, the announcement information receiver 252, and a timer 321 in addition to the units in the communication device 4 in the fifth embodiment. Further, the memory 27 is connected to the transmission power determining unit 26.

[First Operation of Communication System and Communication Device]

Figure 39A:
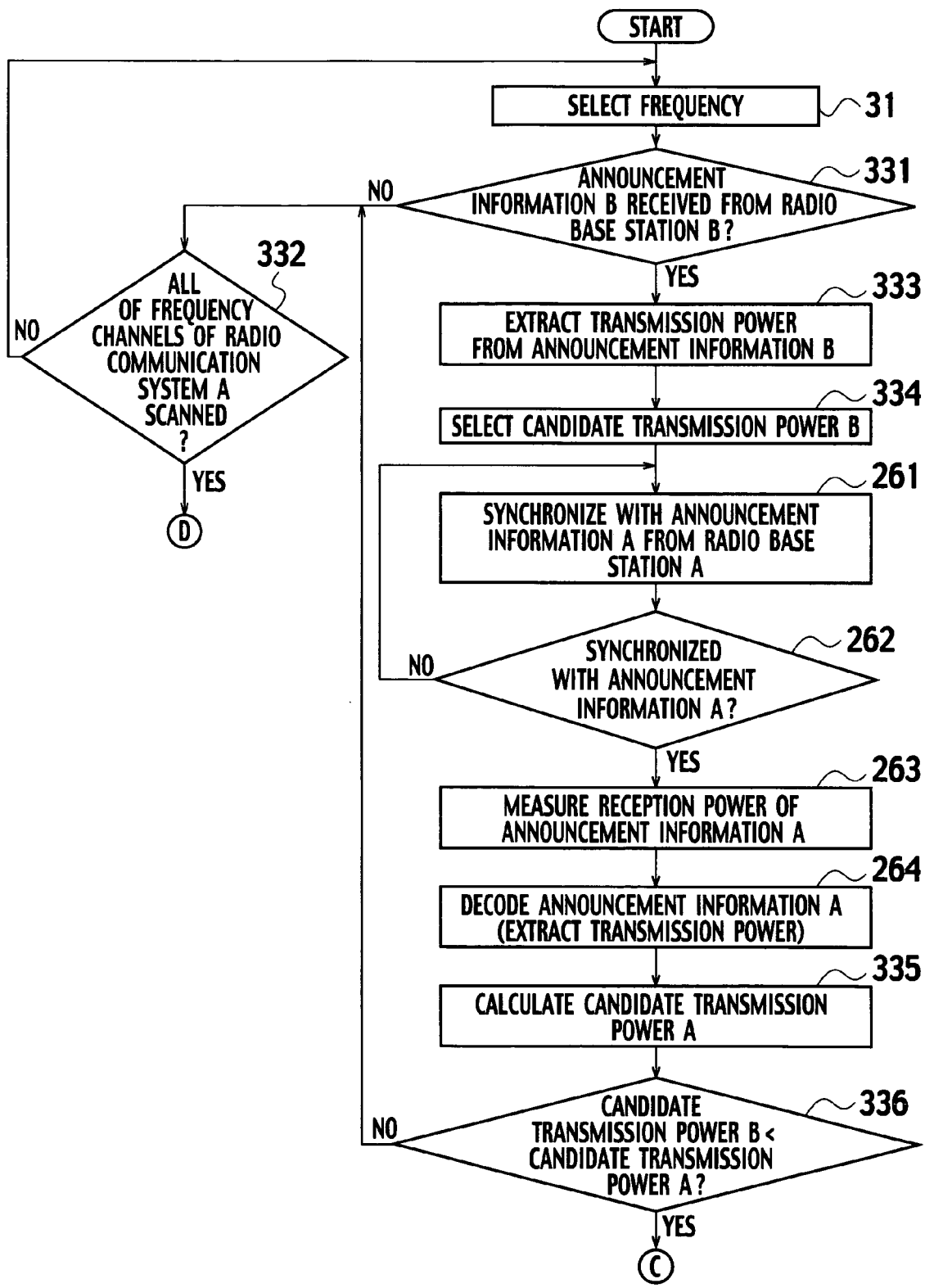
FIG. 39A and FIG. 39B are a flowchart showing a first operation of the radio communication device to transmit data of the radio communication system of FIG. 38.
Figure 39B:
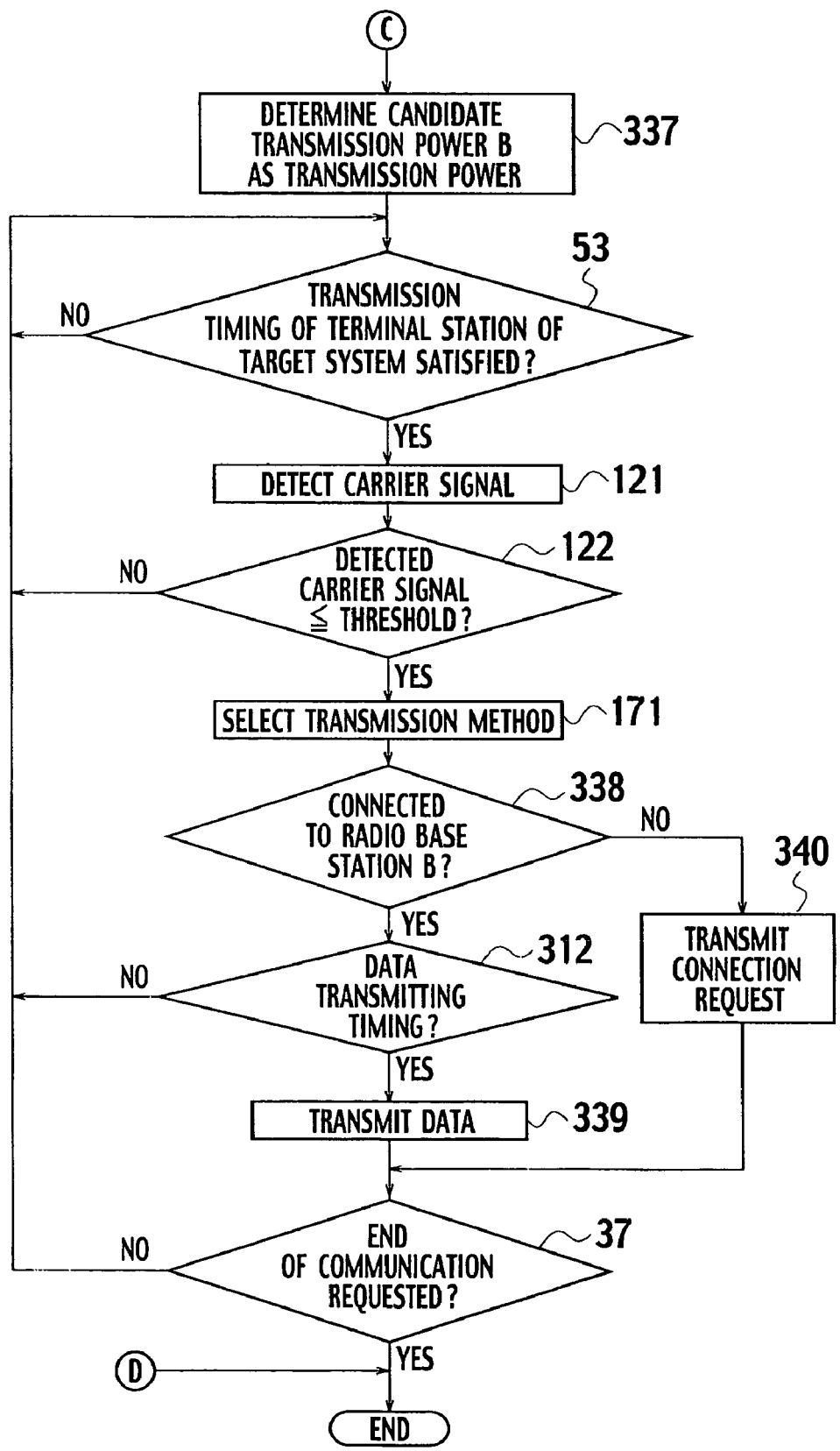

The terminal station communication device 8 (shown in FIG. 38) transmits data of the communication system 2 according to the procedure shown in the flowchart in FIG. 39A and FIG. 39B. In the terminal station communication device 8, the control 25 selects a frequency (step 31), and outputs the selected frequency to the synchronizer 23 and the carrier sensor 111. The transmitter-receiver unit 24 sets in the timer 321 a maximum wait time for receiving the announcement information B from the base station communication device 7. It is checked whether or not the announcement information B is received in the set maximum wait time (step 331).

If the announcement information B is received in the set maximum wait time, it is decoded in order to extract transmission power (step 333). The extracted transmission power is set as candidate transmission power B (step 334), and is sent to the transmission power determining unit 26. On the contrary, when no announcement information B is received within the set maximum wait time in step 331, it is checked whether or not all the frequency channels of the communication system 1 have been scanned (step 332). If all the frequency channels have not been scanned, a frequency will be reselected (step 31), the procedure following the step 331 will be repeatedly executed. On the other hand, when all the frequency channels have been scanned (step 332), the communication operations will be completed.

The synchronizer 23 operates in response to the announcement information from the base station 5 (step 261). When synchronized, the synchronizer 23 outputs the timing information and reception signal in the announcement information to the receiving power meter 251 (step 262). Further, if the uplink frame transmission timing information is known, the communication device 7 sends it to the carrier sensor 111. The reception power meter 251 measures reception power of the announcement information on the basis of the timing information and the announcement information received from the synchronizer 23 (step 263). The reception power is assumed to be Rm [dBm]. The reception power meter 251 provides the measured reception power to the transmission power determining unit 26, and sends the announcement information from the synchronizer 23 to the announcement information receiver 252. The announcement information receiver 252 decodes the announcement information, extracts transmission power of the announcement information (step 264), and outputs it to the transmission power determining unit 26. When the uplink frame transmission timing is included in the announcement information, it will be outputted to the carrier sensor 111.

The transmission power extracted from the announcement information is assumed to be Rd [dBm]. The transmission power determining unit 26 determines candidate transmission power Pc [dBm] using the following formula (5) (step 335) on the basis of the reception power Rm [dBm] received from the reception power determining unit 251, the transmission power Rd [dBm] received from the announcement information receiver 252, and the information S [dBm] concerning the reception sensitivity of the radio base station 5 and the margin M [dBm], both of which are stored in the memory 27. For instance, the candidate transmission power A, and Pc [dBm] will be determined as in the formula (7).

$$Pc=Rd-Rm+S-M \quad (7)$$

For instance, if Rm is −70 [dBm], Rd is 40 [dBm], S is −90 [dBm], and M is 10 [dBm], the candidate transmission power Pc will be derived as follows.

$$Pc=40-(-70)+(-90)-10=10 \text{ [dBm]} \quad (8)$$

The transmission power determining unit 26 compares the candidate transmission power A with the candidate transmission power B received from the transmission-receiver unit 24 (step 336). When the candidate transmission power B is equal to or smaller than the candidate transmission power A, the transmission power determining unit 26 selects the candidate transmission power B as the transmission power (step 337). On the other hand, if the candidate transmission power B is equal to or larger than the candidate transmission power A, the procedure following step 332 will be repeatedly executed. The transmission power determining unit 26 sends the selected transmission power to the control unit 25, which outputs the transmission power to the transmitter-receiver unit 24.

In accordance with the uplink frame signal transmitting timing (step 53) received from the announcement information receiver 252 (step 53), the carrier signal detection is conducted while the base terminal station 6 of the communication system 1 is sending a string of signals (step 121). The carrier sensor 111 compares the detected carrier signal with the threshold (step 122). When the detected carrier signal is equal to or less than the threshold, the carrier sensor 111 sends the detected carrier signal and the transmission start timing to the transmission method determining unit 161. The transmission method determining unit 161 determines a method for sending a connection request or data, and provides the transmitter-receiver unit 24 with the determined transmission method and the transmission start timing (step 171). For instance, the connection request transmitting method may be the BPSK modulation method or the like. The data transmission method may be selected on the basis of the procedure shown in the flowchart of FIG. 19.

The transmitter-receiver unit 24 checks whether or not it is in connection with the base station communication device 7 (step 338). When connected to the base station communication device 7, it is checked whether or not the data transmission timing reaches (step 312). If the data transmission timing reaches, the transmitter-receiver unit 24 transmits the data in response to the transmission start signal and the transmission method received from the transmission method determining unit 161, and by using the transmission power from the control unit 25 (step 339). On the contrary, if the data transmission timing does not reach, the procedures following step 53 will be repeatedly executed. Further, if not connected to the base station communication device 7 (step 338), the transmitter-receiver unit 24 transmits a connection request (step 340) while a terminal station belonging to the target communication system memorized in the memory 27 (step 340) sends a string of signals in response to the transmission start signal and the transmission method received from the transmission method determining unit 161, and by using the transmission power from the control unit 25. When there is a connection end request from the user or the like, the communication operation will be terminated (step 37). On the contrary, if no connection end request is present, the procedures following step 37 will be repeatedly executed.

In the ninth embodiment, the terminal station communication device 8 receives the announcement information from the base station communication device 7, and uses the transmission power, which is included in the received announcement information, as the first candidate transmission power. Further, the terminal station communication device 8 receives the announcement information from the base station 5, and calculates the second candidate transmission power on the basis of the transmission power and reception power included in the announcement information from the base station 5, reception sensitivity of the base station 5 and margin. The calculated transmission power is used as the second candidate transmission power. The first and second candidates are compared. If the first candidate transmission power is below the second candidate transmission power, the terminal station communication device 8 can transmit and receive the signal to and from the base station communication device 7 without adversely affecting the signal transmission-reception.

[Second Communication Operation of Communication System and Communication Device]

In the first communication operation, the terminal station communication device 8 receives the announcement information from the base station 5, and determines the transmission power thereof for sending the announcement information on the basis of the transmission power in the received announcement information. However, if the announcement received from the base station 5 does not include the transmission power, the terminal station communication device 8 can determine its transmission power for the announcement information on the basis of the information which relates to the transmission power and has been stored in the memory.

Figure 40A:
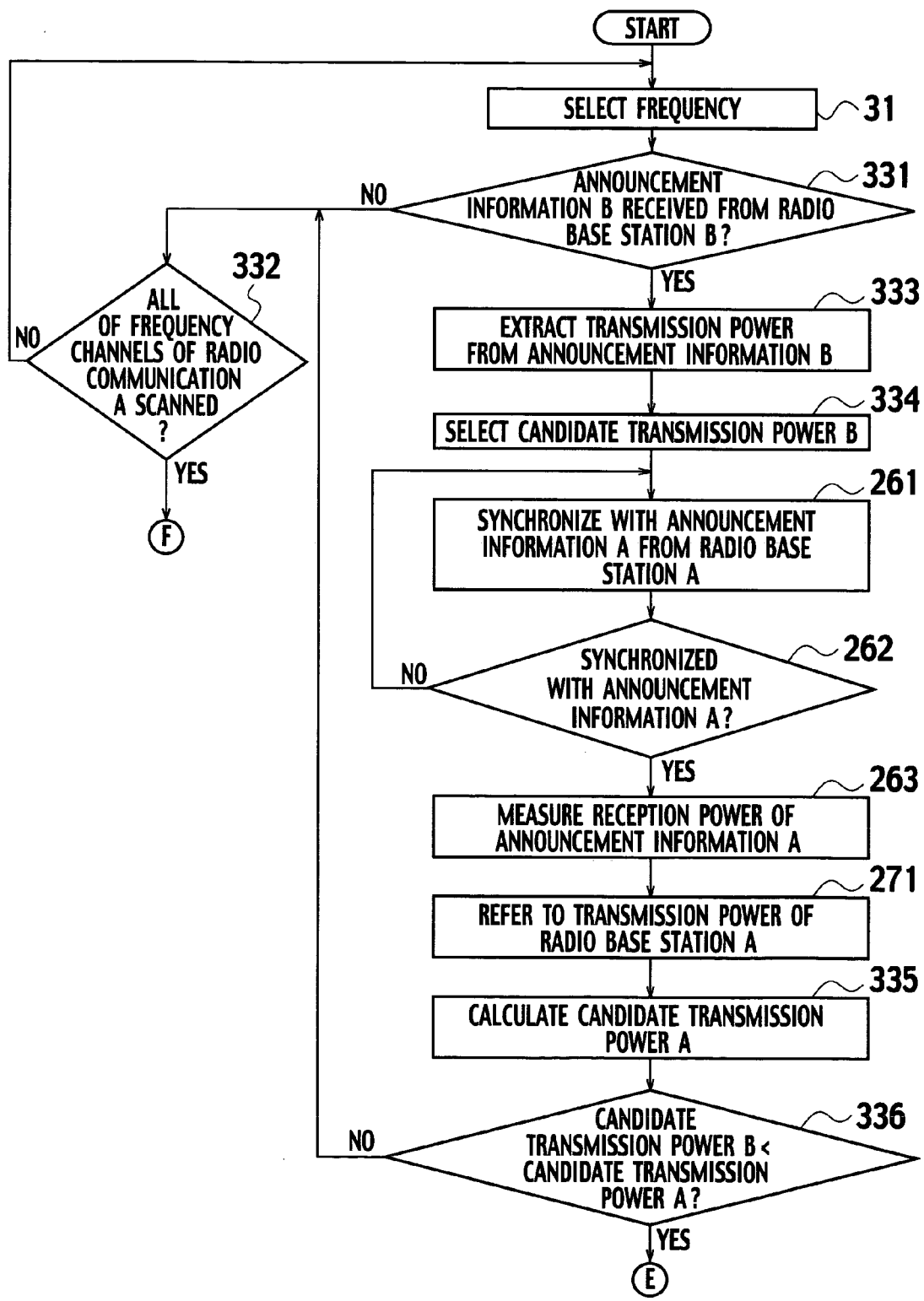
FIG. 40A and FIG. 40B are a flowchart showing a second operation of the radio communication device to transmit data of the radio communication system of FIG. 38.
Figure 40B:
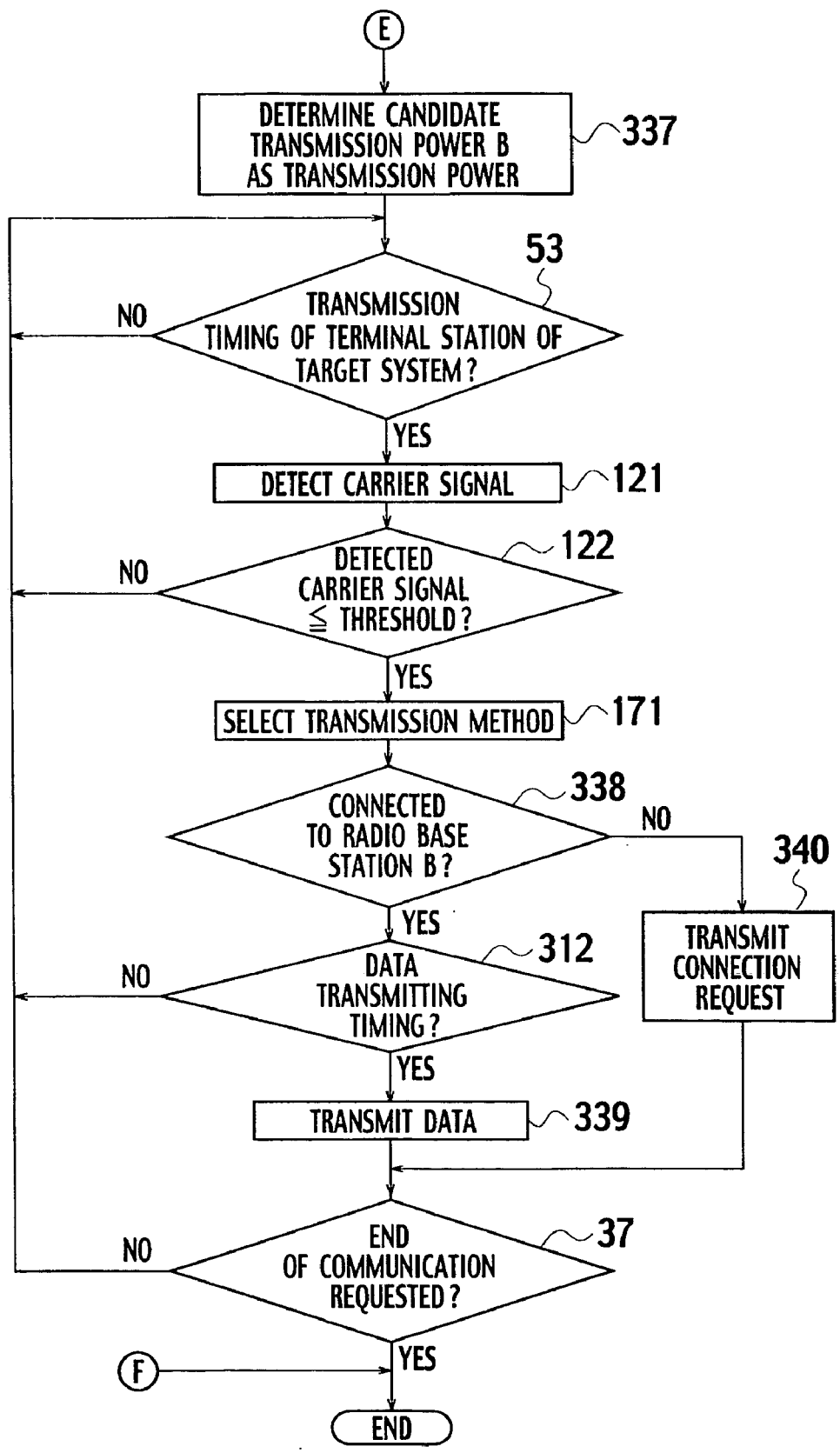

Referring to FIG. 40A and FIG. 40B, the control unit 25 of the terminal station communication device 8 belonging to the communication system 2 selects a frequency for the operation of the terminal station communication device 8 (step 31), and outputs the selected frequency to the synchronizer 23, transmitter-receiver unit 24 and carrier sensor 111. The transmitter-receiver unit 24 sets a maximum time period for receiving for the announcement information B which is transmitted by the base station communication device 7 at the selected frequency. It is checked whether or not the announcement information B arrives within the set maximum wait time (step 331). If the announcement information B is received with the maximum wait time, it is decoded in order to extract the transmission power (step 333). The extracted transmission power is selected as the candidate transmission power B (step 334), and is sent to the transmission power determining unit 26. In step 331, if no announcement information B is received from the base station communication device 7 within the maximum wait time, it is checked whether or not all the frequency channels of the communication system 1 have been scanned (step 332). If all the frequency channels have not been scanned, a frequency will be reselected (step 31), and the procedures following step 331 will be repeatedly executed.

On the contrary, if all the frequency channels have been scanned in step 332, the communication operation will be completed.

In response to the announcement information from the base station 5 (step 261), the synchronizer 23 outputs the timing information of the announcement information and the received signal to the reception power determining unit 251 (step 262). Further, if the uplink frame transmitting timing information for the downlink frame is known, the synchronizer 23 sends the carrier sensor 111 the uplink frame transmitting timing information. The reception power determining unit 251 measures the reception power of the announcement information on the basis of the timing information and the announcement information received from the synchronizer 23 (step 263).

The measured reception power of the announcement information is assumed to be Rm [dBm]. The reception power determining unit 251 outputs the reception power to the transmission power determining unit 26, and provides the announcement information receiver 252 with the announcement information received from the synchronizer 23. The announcement information receiver 252 demodulates the announcement information. If the announcement information includes the transmission timing information of the uplink frame, the announcement information receiver 252 sends the transmission timing information to the carrier sensor 111. For instance, the transmission power determining unit 26 determines the transmission power Pt [dBm] using the following formula (steps 271 and 335) on the basis of the reception power Rm [dBm] included in the announcement information from the reception power determining unit 251; the transmission power Rr [dBm] of the base station 5 stored in the memory 27; the reception sensitivity information S of the radio base station 5 stored in the memory 27; and the margin M [dBm] stored in the memory 27.

$$Pc=Rr-Rm+S-M \quad (9)$$

The transmission power Pc is derived using a formula (9) when Rm is −70 [dBm]; Rd is 40 [dBm]; S is −90 [dBm]; and M is 10 [dBm].

$$Pc=40-(-70)+(-90)-10=10 \text{ [dBm]} \quad (10)$$

The transmission power determining unit 26 selects the candidate transmission power A, which is compared with the candidate transmission power B received from the transmitter-receiver unit 24 (step 336). If the candidate transmission power B is smaller than the transmission power A, the procedures following step 332 will be repeatedly executed. The transmission power determining unit 26 sends the determined transmission power to the control unit 25, which transfers the transmission power to the transmitter-receiver unit 24. In response to the uplink frame signal transmitting timing received from the synchronizer 23 or the announcement information receiver 252 (step 53), the carrier sensor 111 performs the carrier signal detection while the communication device 6 belonging to the communication system 1 is transmitting a string of signals (step 121). The carrier sensor 111 compares a detected value with a predetermined threshold (step 122). If the detected value is founds to be equal to or less than the predetermined threshold, the carrier sensor 111 outputs the detected value and a transmission start timing to the transmission method determining unit 161.

The transmission method determining unit 161 determines a method of transmitting the announcement information, and sends the determined method and the transmission start signal to the transmitter-receiver unit 24 (step 171). For instance, the BPSK modulation method or the like will be selected as the transmission method.

The transmitter-receiver 24 determines whether or not the connection has been established with the base station communication device 7 (step 338), and checks whether or not the announcement information transmitting timing reaches (step 312). If so, the transmitter-receiver 24 transmits the announcement information including the transmission power inputted from the control unit 25 using the transmission power inputted form the control unit 25 with a method of transmitting determined by the transmission method determining unit 161 in response to the transmission start signal from the transmission method determining unit 161 while the terminal stations are sending a string of signals (step 339). On the contrary, if the announcement transmitting timing does not reach, the procedures following step 53 will be repeatedly executed. In response to the communication end request from the user or the like (step 37), the operation will be completed. Otherwise, the procedures following step 53 will be repeatedly executed.

In the ninth embodiment, the terminal station communication device 8 receives the announcement information from the base station communication device 7, and uses the transmission power, which is included in the received announcement information, as the first candidate transmission power. Further, the terminal station communication device 8 receives the announcement information from the radio base station 5, measures the reception power of the announcement information, and calculates the second candidate transmission power on the basis of the transmission power stored in memory and the reception power of the announcement information from the base station 5, reception sensitivity of the base station 5 and margin. The calculated transmission power is used as the second candidate transmission power. The first and second candidates are compared. If the first candidate transmission power is smaller than the second candidate transmission power, the terminal station communication device 8 can transmit and receive the signal to and from the base station communication device 7 without adversely affecting the signal transmission-reception.

[Second Configuration of Communication Device]

Figure 41:
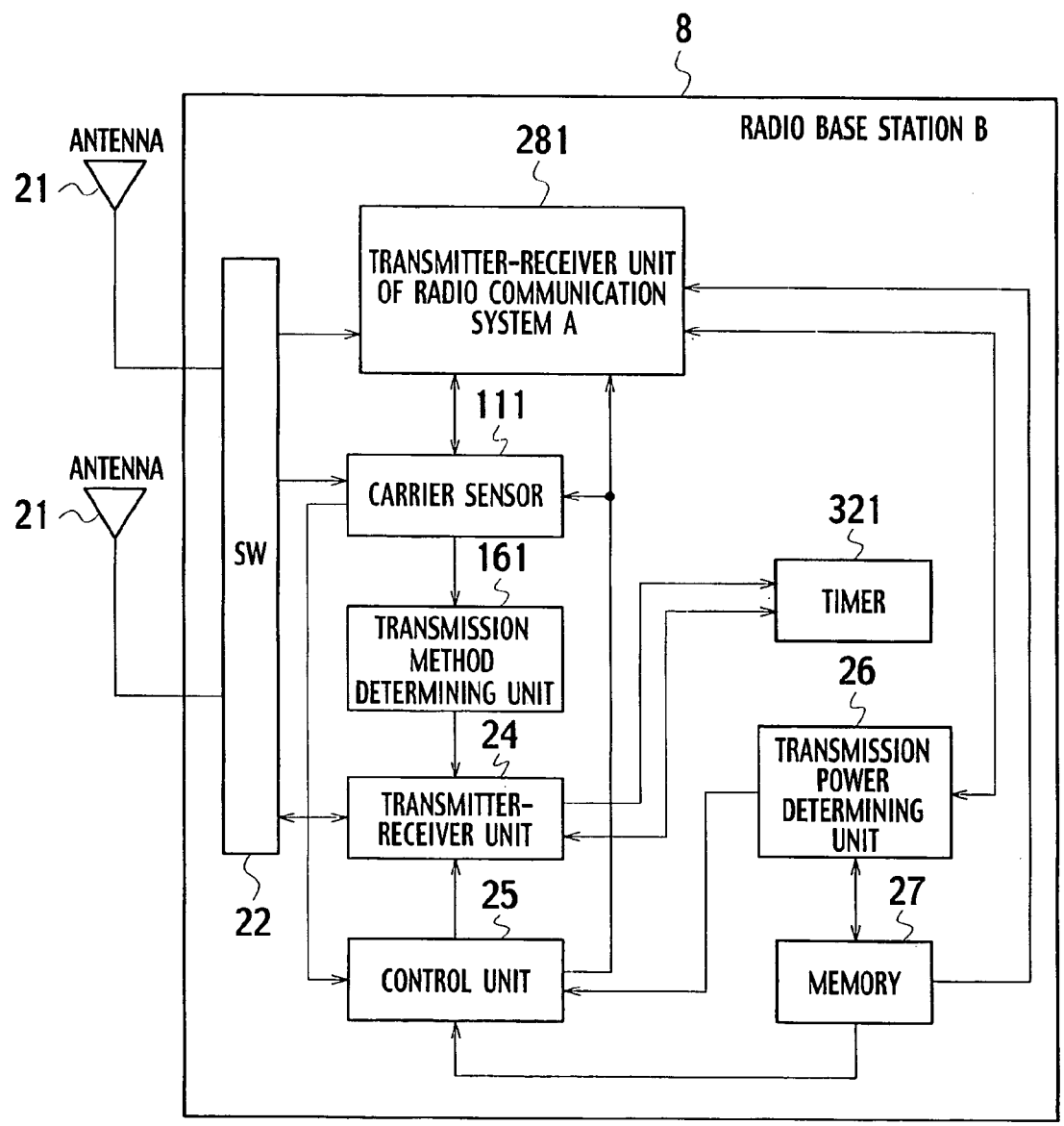
FIG. 41 is a block diagram showing a second configuration of the radio communication device constituting the radio communication system in the ninth embodiment of the invention.

The following describe a modification of the terminal station communication device 8 of the ninth embodiment. Referring to FIG. 41, the terminal station communication device 8 (shown in FIG. 38) includes a transmitter-receiver unit 281 for the communication system A (called the "transmitter-receiver unit 281") in place of the synchronizer 23, reception power meter 251 and announcement information receiver 252.

[Third Communication Operation of Communication System and Communication Device]

Figure 42A:
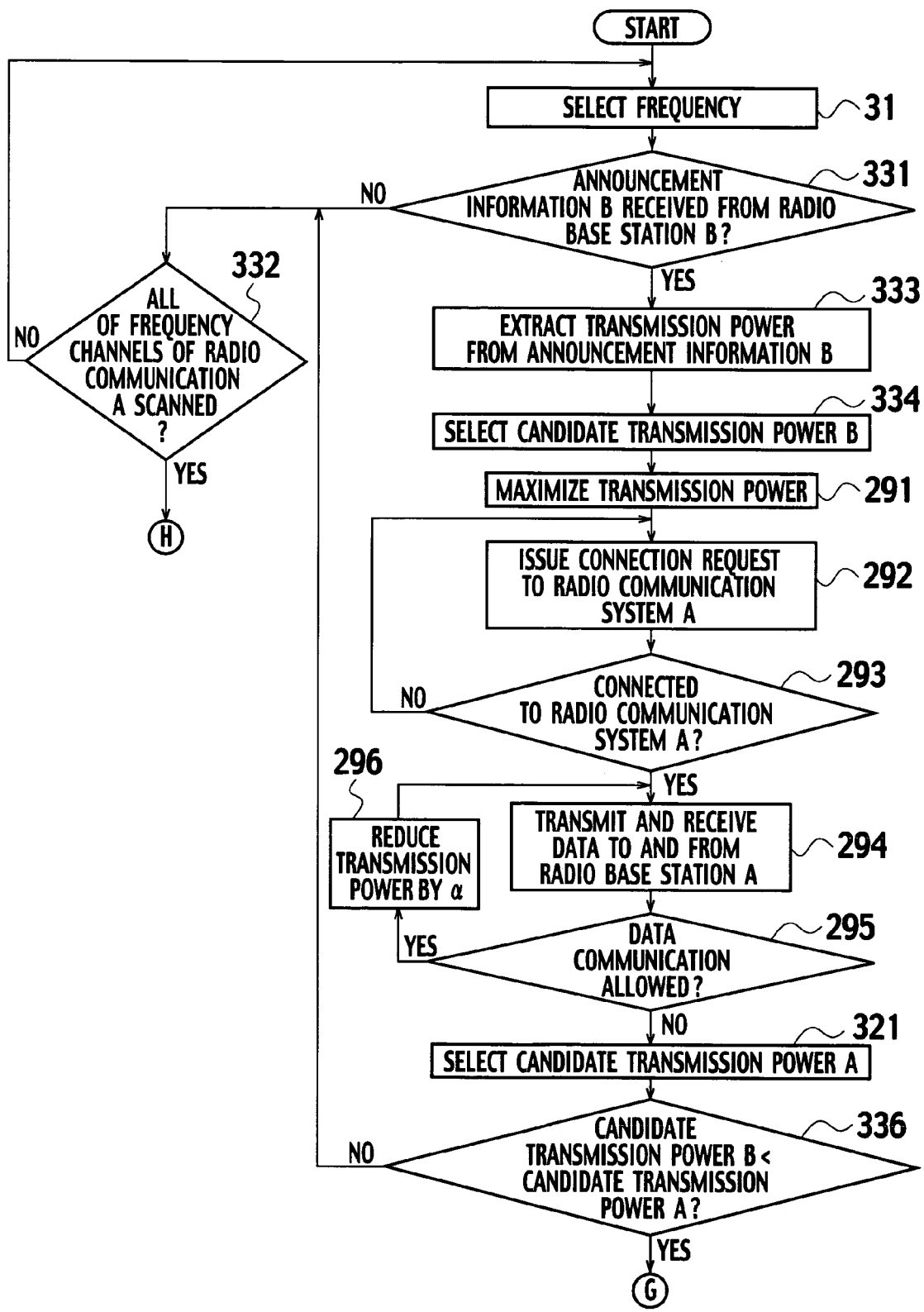
FIG. 42A and FIG. 42B are a flowchart showing a third operation of the radio communication device to transmit data of the radio communication system of FIG. 41.
Figure 42B:
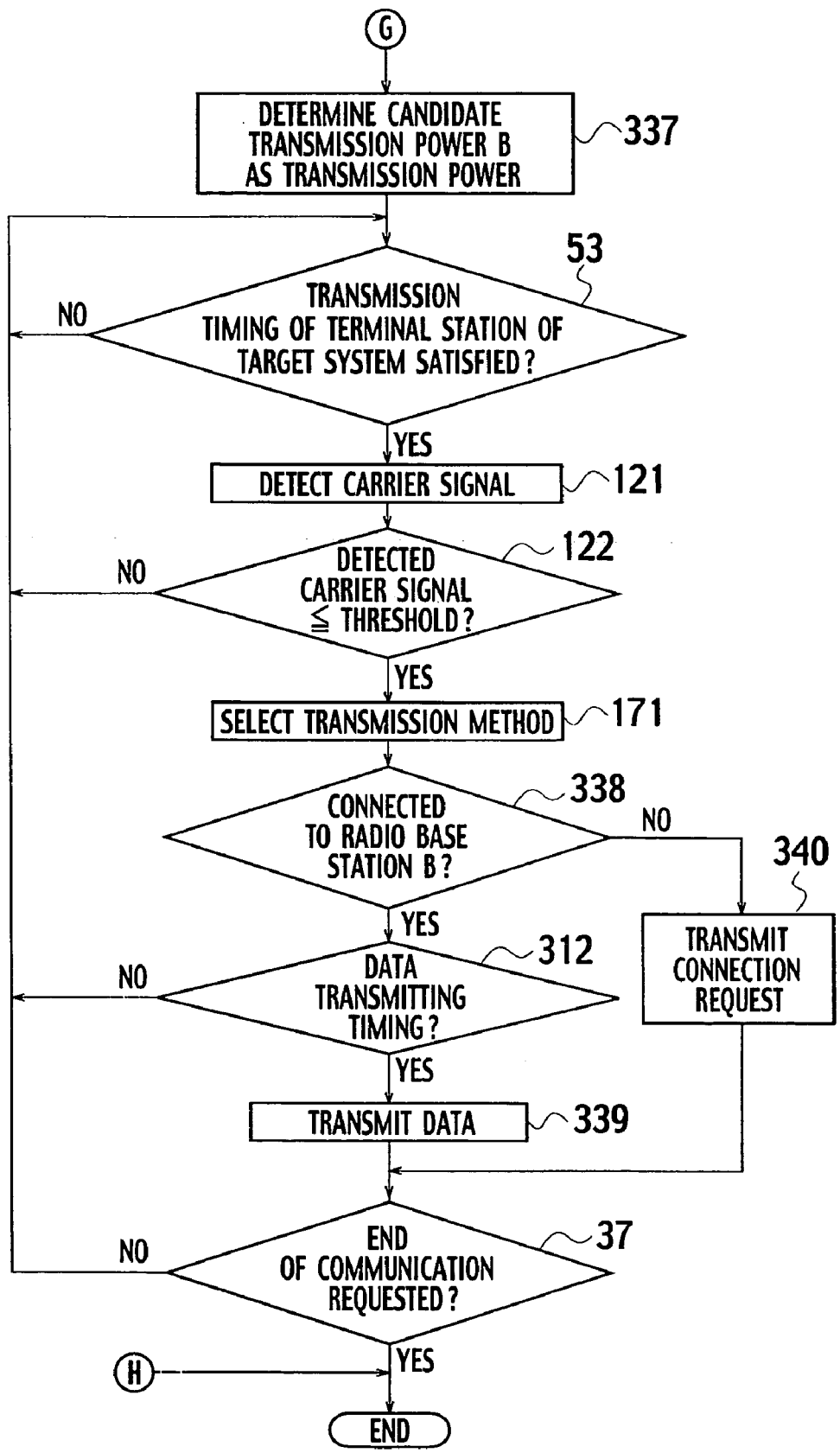

In the ninth embodiment, the terminal station communication device 8 transmits the data of the communication system 2 in accordance with the procedures shown in the flowchart of FIG. 42A and FIG. 42B. The control unit 25 of the terminal station communication device 8 selects the frequency for the communication device 8 (step 31), and sends the selected frequency to the transmitter-receiver unit 281 and the transmitter-receiver unit 24. The transmitter-receiver unit 24 sets in the timer 321 a maximum time period for receiving the announcement information B from the base station communication device 7. It is checked whether or not the announcement information B is received in the set maximum wait time (step 331). If the announcement information B is received within the set maximum time, it is decoded in order to extract transmission power (step 333). The extracted transmission power is set as candidate transmission power B (step 334), and is sent to the transmission power determining unit 26. On the contrary, when no announcement information B is received within the set maximum wait time in step 331, it is checked whether or not all the frequency channels of the communication system 1 have been scanned (step 332). If all the frequency channels have been scanned, frequencies will be reselected (step 31), the procedure following the step 331 will be repeatedly executed. On the other hand, when all the frequency channels have been scanned (step 332), the communication operation will be completed.

The transmitter-receiver unit 281 maximizes the transmission power at the frequency channel received from the control unit 25 (step 291), and transmits a connection request signal to the base station 5 (step 292). When connected to the base station 5 (step 293), the transmitter-receiver unit 281 transmits and receives data to and from the radio base station 5 (step 294), determines whether or not the data transmission-reception is successful (step 295), reduces the transmission power by the given amount (α), and repeats the procedures following step 294. If the data transmission-reception is not successful, the current transmission power is outputted to the transmission power determining unit 26, which reduces the margin from the transmission power which has been received from the transmitter-receiver 281, and uses the result as the candidate transmission power A for the base station communication device 7.

For instance, the transmitter-receiver unit 281 maximizes the transmission power to 30 [dBm], and connects to the base station 5 for the purpose of data transmission-reception. When the data transmission-reception is successful, it is assumed that the transmission power is reduced by 5 [dBm]. If the data transmission-reception is successful with the transmission power of 30 [dBm], the next data transmission-reception is conducted with the transmission power of 25 [dBm]. Further, if the data transmission-reception is successful with the power of 25 [dBm], it will be conducted with the transmission power of 20 [dBm]. If the data transmission-reception is not successful with the transmission power of 20 [dBm], the margin will be set to be 10 [dBm]. Therefore, the candidate transmission power A of the base station communication device 7 will be 10 [dBm] (=20 [dBm]−10 [dBm]).

The transmission power determining unit 26 compares the candidate transmission power A with the candidate transmission power B received from the transmitter-receiver unit 24 (step 336). If the candidate transmission power B is below the candidate transmission power A, the candidate transmission power B will be selected as the transmission power (step 337). On the contrary, if the candidate transmission power B is equal to or larger than the candidate transmission power A, the procedures following step 332 will be repeatedly executed. The transmission power determining unit 26 provides the control unit 25 with the determined transmission power. The control unit 25 transfers the received transmission to the transmitter-receiver unit 24.

At the uplink frame signal transmission timing (step 53), the carrier sensor 111 detects the carrier signal while the radio terminal station 6 of the communication system 1 is sending a string of signals (step 121). The carrier sensor 111 compares the detected carrier signal with the threshold (step 122). If the detected carrier signal is equal to or less than the threshold, the carrier sensor 111 sends the detected carrier signal and the transmission start timing to the transmission determining unit 161, which determines a method for transmitting a connecting request or data, and transmits the method to the transmitter-receiver unit 24 (step 171). For instance, the BPSK modulation method or like may be selected as the transmission method. The data transmission method will be determined by the procedures shown in the flowchart of FIG. 19.

The transmitter-receiver unit 24 checks whether or not the terminal station communication device 8 has been connected to the base station communication device 7 (step 338). If so, the transmitter-receiver unit 24 checks whether or not the data transmission timing reaches (step 312). If the data transmission timing reaches, the transmitter-receiver unit 24 transmits the signal using the transmission power from the control unit 25 in response to the transmission start signal from the transmission method determining unit 161 while the terminal stations of the target system are sending a string of signals (step 339). On the contrary, if the data transmission timing does not reach, the procedures following step 53 will be repeatedly executed.

In step 338, if no connection has been established to the base station communication device 7, the transmitter-receiver unit 24 transmits a connection request to the base station communication device 7 in accordance with the transmission method specified by the transmission determining unit 161, using the transmission power from the control unit 25, in response to the transmission start signal from the transmission method determining unit 161 while the terminal stations of the target system are sending a string of signals (step 340). If there is a connection end request from the user or the like, the communication operation will be terminated (step 37). Otherwise, the procedures following step 53 will be repeatedly executed.

As described so far with respect to the ninth embodiment, the terminal station communication device 8 receives the announcement information from the base station communication device 7, uses the transmission power specified in the announcement information as the first candidate transmission power. The terminal station communication device 8 serves as the terminal station 6, and communicates with the base station 5. The transmission power is adjusted in order to calculate the second candidate transmission power for the terminal station communication device 8 on the basis of the transmission power which prevents the communication with the base station 5. The first candidate transmission power and the second candidate transmission power are compared. If the first candidate transmission power is below the second candidate transmission power, the terminal station communication device 8 transmits and receives the signal to and from the base station communication device 7. Therefore, the terminal station communication device 8 can transmit and receive the signal to and from the terminal station communication device 8 without adversely affecting the signal transmission-reception of the base station 5.

Tenth Embodiment

A tenth embodiment of the invention relates to a modification of the communication system and communication device of the ninth embodiment, and more particularly relates to a modified configuration and communication operation.

[Configuration of Communication Device]

Figure 43:
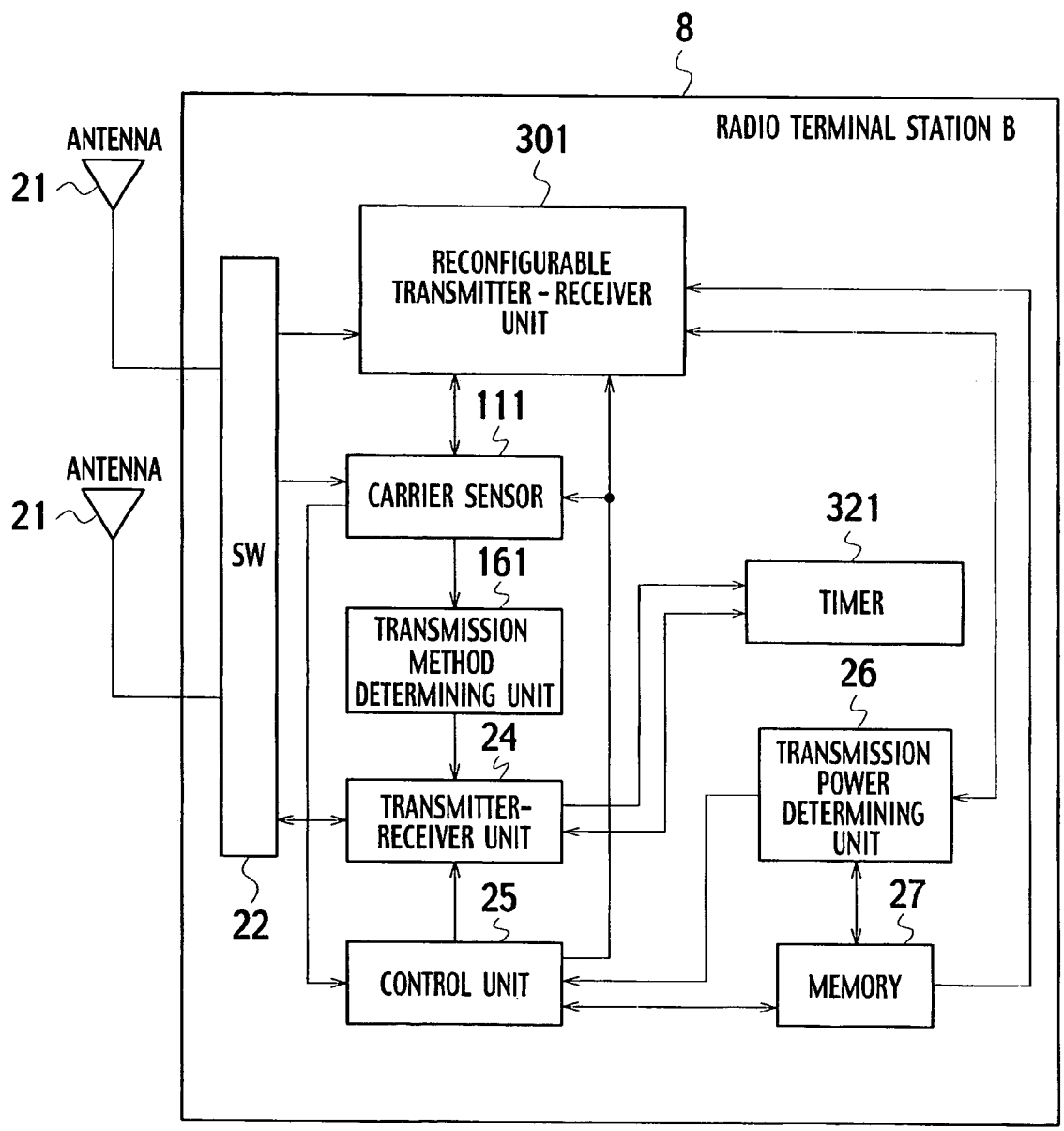
FIG. 43 is a block diagram of a radio communication device constituting a radio communication system in a tenth embodiment of the invention.

Referring to FIG. 43, a terminal station communication device 8 of the communication system 2 includes a reconfigurable transmitter-receiver unit 301 in place of the transmitter-receiver unit 281 in the terminal station communication device 8 of the ninth embodiment. The reconfigurable transmitter-receiver unit 301 is preferably constituted by a reconfigurable processor, DSP, FPGA or the like.

The control unit 25 selects not only a frequency but also a target communication system with which the terminal station communication device 8 shares the frequency. The memory 27 stores information related to the data transmission-reception of the communication systems 1, C and D, and so on as well as the information related to the data transmission-reception of the communication system 2. For instance, the foregoing information is concerned with software and hardware and so on for the transmission and reception of the communication systems 1, C and D.

[Communication Operations of Communication System Communication Device]

Figure 44A:
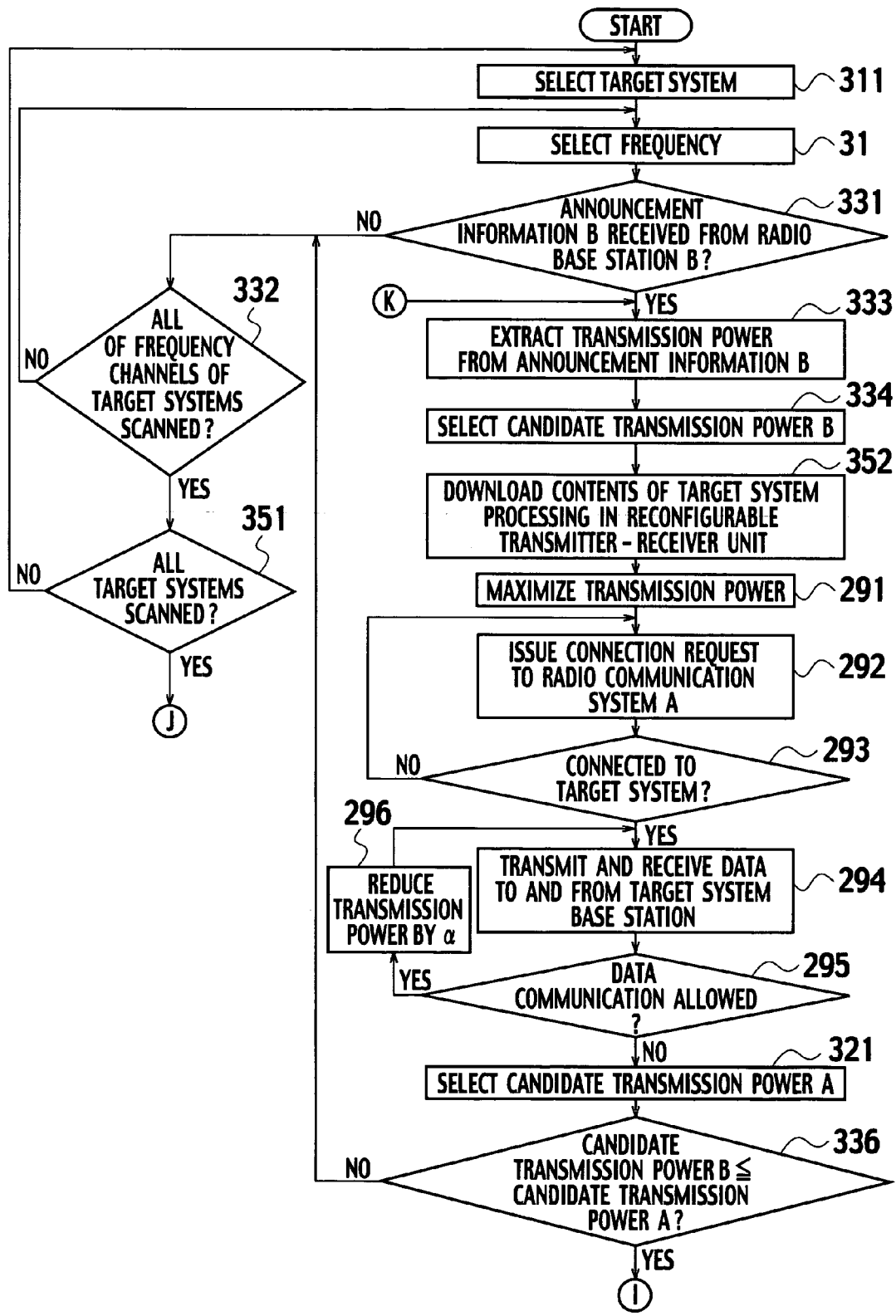
FIG. 44A and FIG. 44B are a flowchart showing an operation of the radio communication device of FIG. 43 to transmit and receive signals to and from other radio communication devices.
Figure 44B:
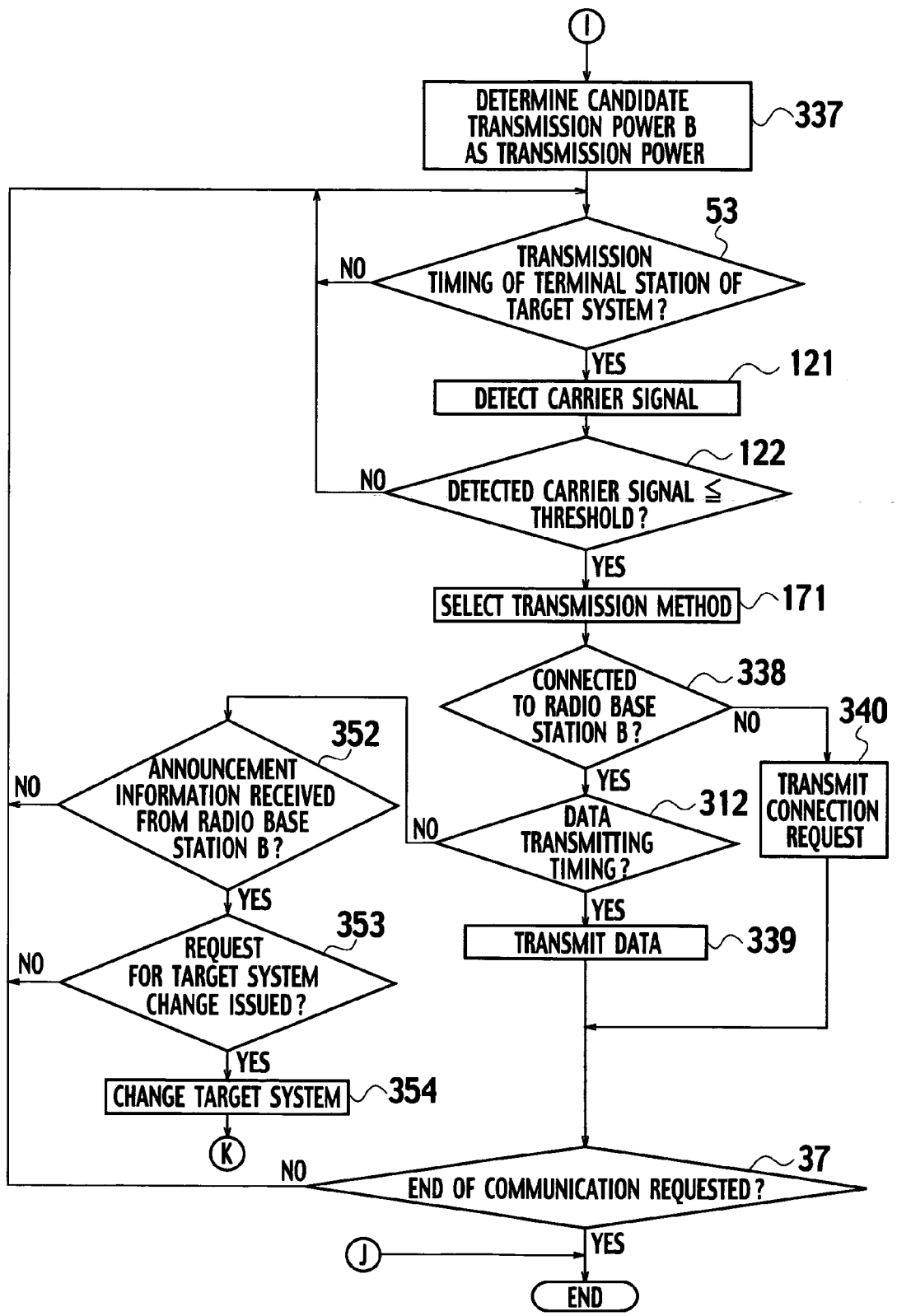

According to the procedures shown in the flowchart of FIG. 44A and FIG. 44B, the terminal station communication device 8 transmits and receives the signal to and from the base station communication device 7 of the communication system 2. In the terminal station communication device 8, the control unit 25 selects a target communication system with which the communication system 2 shares the frequency (step 311), selects one of frequency channels assigned to the target communication system in order to enable the operation of the terminal communication device 8 (step 31), and sends the selected frequency to the reconfigurable transmitter-receiver unit 301 and the transmitter-receiver unit 24. The transmitter-receiver unit 24 sets in the timer 32 a maximum wait time for the base station communication device 7 to receive the announcement information B sent at the selected frequency by the base station communication device 7. The transmitter receiver unit 24 sets in the timer 321 a maximum time period for receiving the announcement information B from the base station communication device 7. It is checked whether or not the announcement information B is received in the set maximum wait time (step 331). When the announcement information B arrives within the maximum wait time, it is decoded in order to extract the transmission power from in the announcement information B (step 333). The extracted transmission power is set as candidate transmission power B (step 334), and is sent to the transmission power determining unit 26.

The control unit 25 downloads the data transmission-reception information (concerning the communication system and selected from the memory 27) in the reconfigurable transmitter-receiver unit 301 (step 352). If no announcement information B arrives from the base station communication device 7 within the maximum wait time, it is checked whether or not all the frequency channels of the target communication system have been scanned (step 332). If not, a frequency will be reselected (step 31), and the procedures following step 331 will be repeatedly executed. On the contrary, if all the frequency channels have been scanned, it is checked whether or not all of the target communication systems have been scanned (step 351). If not, the control unit 25 changes the target communication system (step 311), and the procedures following step 31 will be repeatedly executed. On the contrary, if all of the target communication systems have been scanned, the communication operations will be terminated.

The reconfigurable transmitter-receiver unit 301 maximizes the transmission power at the frequency channel received from the control 25 (step 291), and sends a connection request signal to the base station of the target communication system (step 292). When connected to the base station of the target communication system (step 293), the terminal station communication device 8 transmits and receives data to and from the base station of the target communication system (step 294). It is checked whether or not the data transmission-reception is successful. If so, the transmission power is reduced by the given amount (α), and the procedures following step 294 will be repeatedly executed. On the contrary, if the data transmission-reception is not successful, the current transmission power is outputted to the transmission power determining unit 26, which deducts the margin from the transmission power received from the reconfigurable transmitter-receiver unit 301, and selects the result as candidate transmission power A (step 321).

For instance, the reconfigurable transmitter-receiver unit 301 initially maximizes the transmission power to 30 [dBm], connects to the base station 5, and transmits and receives the data to and from the base station 5. It is assumed here that the transmission power is reduced by each 5 [dBm] after the successful data transmission and reception. When the data transmission-reception is successful at the transmission power of 30 [dBm], next data transmission-reception will be executed at the transmission power of 25 [dBm]. If the data transmission-reception is successful at the transmission power of 25 [dBm], next data transmission-reception will be executed at the transmission power of 20 [dBm]. On the contrary, if the data transmission-reception is not successful at the transmission power of 20 [dBm], the margin of 10 [dBm] is subtracted from the transmission power, and the remaining transmission power of 10 [dBm] will be used as candidate transmission power A for the base station communication device 7.

The transmission power determining unit 26 compares the candidate transmission power A with the candidate transmission power B received from the transmission-reception unit 24 (step 336). If the candidate transmission power B is below the candidate transmission power A, it is selected as the transmission power (step 337). If the candidate transmission power B is above the candidate transmission power A, the procedures following step 332 will be repeatedly executed. The transmission power determining unit 26 notifies the determined transmission power to the control unit 25, which outputs the transmission power to the transmitter-receiver unit 24.

In accordance with the signal transmitting timing of the uplink frame (received from the synchronizer 23 or the announcement information receiver 252) (step 53), the carrier sensor 111 detects a carrier signal during a short time period in which the terminal station of the target communication system is sending a string of signals (step 121). The carrier sensor 111 compares the detected carrier signal with the predetermined threshold (step 122), and sends the detected result and the transmission start timing information to the transmission method determining unit 161 if the detected results are equal to or less than the predetermined threshold.

The transmission method determining unit 161 selects a transmission method for the announcement information, and provides the transmission method to the transmitter-receiver unit 24 (step 171). For instance, the transmission method may be the BPSK modulation system or the like. The data transmission method can be selected in accordance with the procedure as shown by the flowchart in FIG. 19.

The transmitter-receiver unit 24 checks whether or not the terminal station communication device 8 is in connection with the base station communication device 7 (step 388). When the connection has been established, the transmitter-receiver unit 24 checks whether or not the data transmission timing reaches (step 312). If so, the transmitter-receiver unit 24 transmits the data using the transmission power received from the control unit 25, using the transmission method and in response to the transmission start signal from the transmission method determining unit 161 while the terminal station of the target communication system is sending a string of signals (step 339). If the data transmission timing does not reach, the transmitter-receiver unit 24 checks whether or not the announcement information B arrives from the base station communication device 7 (step 352). If the announcement information B is received, it is checked whether or not the announcement information B includes a change request for the target communication system (step 353). If the announcement information B includes the change request, the control 25 downloads the transmission-reception information of a new target communication system from the memory 27 to the reconfigurable transmitter-receiver unit 301 (step 354), and the procedures following step 333 will be repeatedly executed. If there is no target system change request, the procedure following step 53 will be repeatedly executed.

In step 338, if no connection has been established to the base station communication device 7, the transmitter-receiver unit 24 transmits a connection request to the base station communication device 7 in accordance with the transmission method specified by the transmission determining unit 161, using the transmission power from the control unit 25, and in response to the transmission start signal from the transmission method determining unit 161 while the terminal stations of the target system are sending a string of signals (step 340). If there is a connection end request from the user or the like, the communication operation will be terminated (step 37). Otherwise, the procedures following step 53 will be repeatedly executed.

In the tenth embodiment, the base station communication device 7 selects the communication system 1 whose bandwidth of the frequency channel is 300 [kHz] as the target communication system and with which shares the frequency. However, since the traffic of the communication system 2 exceeds the threshold, the communication system C whose frequency channel has a 5 [MHz] bandwidth is selected as the target communication system in place of the radio communication system 2. Therefore, the base station communication device 7 will share the frequency with the communication system C. A request for changing the communication system is sent to the terminal station communication device 8, which changes its target communication system over to the communication system C and so on.

The terminal station communication device 8 includes the reconfigurable transmitter-receiver unit. Even if the communication system 2 increases its traffic, the target communication system with which the terminal station communication device 8 shares the frequency can be replaced with a more wideband communication system. This enables the communication system 2 to satisfy the transmission requests.

Eleventh Embodiment

An eleventh embodiment relates to modified communication operations of the communication devices 4 shown in FIGS. 4, 11, 16 and 21, the base station communication devices 7 shown in FIGS. 4, 24, 27, 29, 32, 34,39A and 39B, and the terminal station communication devices 8 shown in FIGS. 7, 38, 41 and 43. Hereinafter, the communication devices 4, base station communication devices 7 and terminal station communication devices 8 will be referred to as the "communication devices 4".

[Communication Operations of Communication Systems and Communication Devices]

Figure 45:
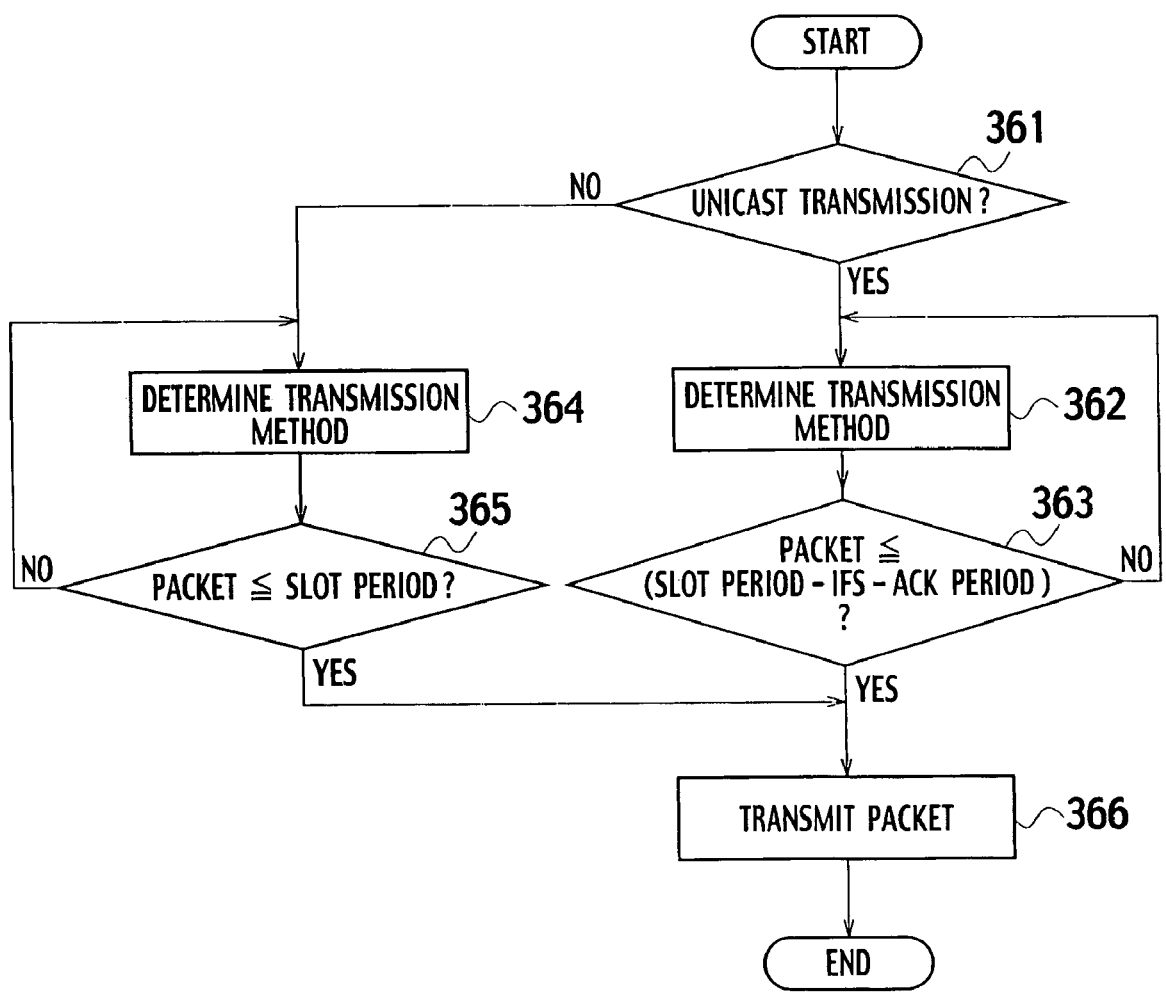
FIG. 45 is a flowchart showing an operation of a radio communication device constituting a radio communication system in an eleventh embodiment of the invention.

Each communication device 4 performs the communication operation according to the flowchart shown in FIG. 45. The communication device 4 checks whether or not signals are subject to unicast transmission (step 361). If the unicast transmission is the case, the communication device 4 selects a transmission method (step 362), and checks whether or not a transmission packet length (i.e., a time period for continuously transmitting one packet) is equal to or smaller than a value derived by subtracting IFS (inter-frame space) and Ack (acknowledgement) packet from a slot length (stored in the memory 27) or from an uplink frame time (step 363). The IFS is a total of decoding delay time of previously received packet, and a time period for producing a next packet.

If the transmission packet length is equal to or less than the value derived by subtracting IFS and Ack packet from the slot length (stored in the memory 27) or from an uplink frame time, the packet will be transmitted (step 366). On the contrary, if the transmission packet length is above the value derived by subtracting IFS and Ack packet from a slot length or from an uplink frame time, the transmission method will be changed, or the number of information bits to be sent is reduced (step 362). Thereafter, the procedures following step 363 will be repeatedly executed.

If the unicast transmission is not used for the signal transmission of the communication device 4 in step 361, a transmission method will be selected (step 364). It is checked whether or not the transmission packet length is equal to or shorter than the slot length or the frame time stored in the memory 27 or the uplink frame time (step 365). The situation in which no unicast transmission is conducted represents a broadcast transmission in which packets are transmitted to the communication devices 4 connected to the base station communication system 7; a multi-cast transmission in which packets are sent to a plurality of communication devices 4 connected to the base station communication device 7 and so on.

In step 365, if the transmission packet length is equal to or shorter than the uplink slot length of the communication system 1 sharing the frequency and stored in the memory 27 or the frame time, the packet will be transmitted (step 366). Otherwise, the transmission method will be changed, or the number of information bits to be transmitted will be reduced (step 364). In this state, the procedures following step 363 will be repeatedly executed.

[Example in which Communication System Adopts TDMA and TDD]

Figure 46:
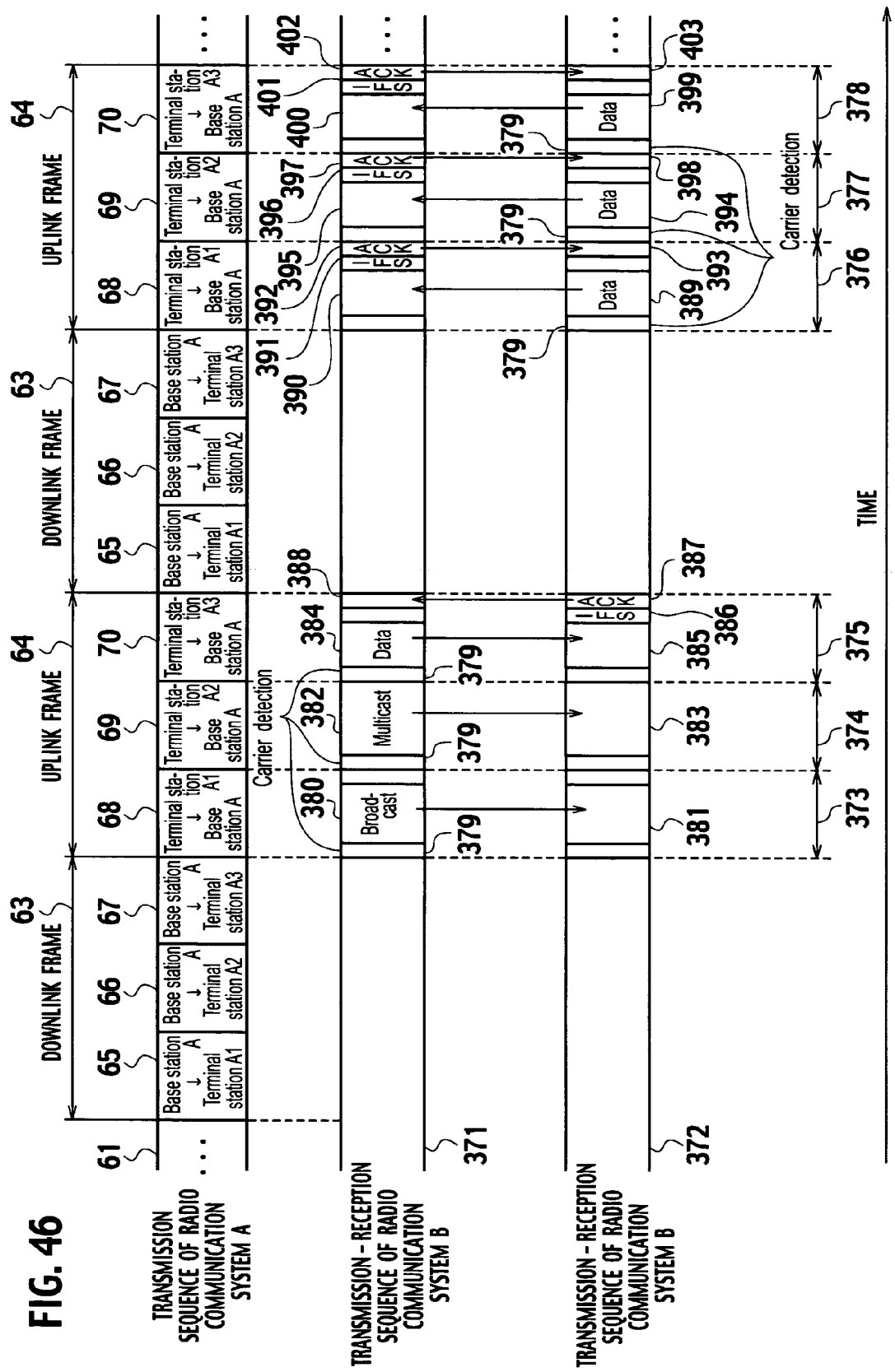
FIG. 46 is a timing chart of one example of transmission sequence between radio communication devices when the radio communication system adopts TDMA and FDD in the eleventh embodiment of the invention.

It is assumed that the communication system 1 adopts TDMA and TDD. FIG. 46 shows transmission sequence 61 of the base station 5 and terminal station 6 belonging to the communication system 1, transmission-reception sequence 371 of the communication device 7 of the communication system 2, and transmission-reception sequence 371 of the terminal station communication device 8. In this case, three terminal stations 6 of the communication system 1 are connected by TDMA.

Since the communication system 1 adopts the TDD, downlink frames 63 in which the base station 5 sends the signal to the terminal station 6 and uplink frames 64 in which the terminal station 6 sends the signal to the base station 5 are repeated one after the other. Further, the communication system 1 adopts the TDMA, so that the downlink frame 63 is allotted as users' slots 65, 66 and 67 on the time division basis to three terminal stations 6. Further, the uplink frame 64 is allotted as users' slots 68, 69 and 70 to the three terminal stations 6 on the time division basis.

The base station communication device 7 belonging to the communication system 2 uses transmission power determined in accordance with the flowchart of FIG. 25. The terminal station communication device 8 uses the transmission power determined in accordance with the flowchart shown in FIG. 39A and FIG. 39B. Further, carrier detection 379 is conducted for a short time period from the signal transmission timing of the three terminal stations 6 to the base station 5 till the slots 68, 69 and 70 in the uplink frame 64. It is assumed here that the detected carrier signals are equal to less than the predetermined threshold. Therefore, in a slot 373, the base station communication device 7 sends a broadcast packet 380 which is shorter than the slot 68. The terminal station communication device 8 receives the packet 380 (381). In a slot 374, the base station communication device 7 sends a multicast packet 382 which is shorter than the slot 69. The multicast packet 382 is received by the terminal station communication device 8 (383). In the slot 374, the base station communication device 7 transmits a data packet 384 which is shorter than (slot 70-IFS-Ack). The terminal station communication device 8 receives the data packet 384 (385). After the lapse of IFS (386), the Ack packet 387 is sent to and received by the base station communication device 7 (388).

In each of the slots 376, 377 and 378 of the uplink frame 64, the terminal station communication device 8 sends each of data packets 389, 394 and 399 which are shorter than each of the slots 68, 69 and 70 with the IFS and Ack deducted. The base station communication device 7 receives the data packets (390, 395 and 400), and sends each of the Ack packets 392, 397 and 402 to the terminal station communication device 8 after the lapse of IFS times 391, 396 and 401. The terminal station communication device 8 receives the Ack packets (393, 398 and 403).

According to the eleventh embodiment, during the unicast transmission, packet-switching is performed once in one uplink slot. However, no limitation is placed on the number of packet-switching operations. At least one packet-switching is effective.

In the eleventh embodiment, one or more package exchanges are conducted during one uplink slot or one uplink frame as stored in the memory of the communication systems sharing the frequency.

Twelfth Embodiment

Figure 47:
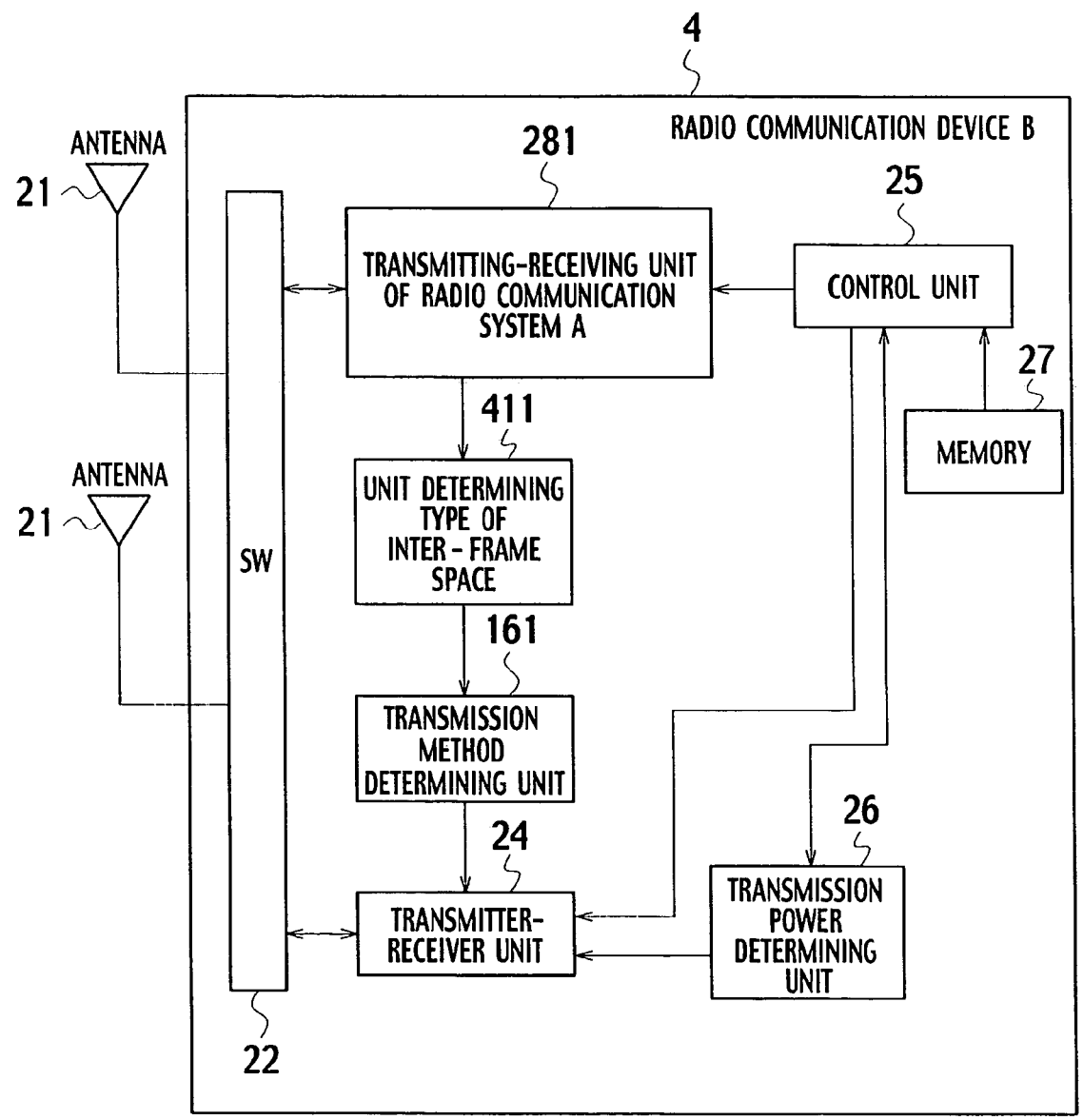
FIG. 47 is a block diagram of a radio communication device constituting a radio communication system in a twelfth embodiment of the invention.
Figure 48:
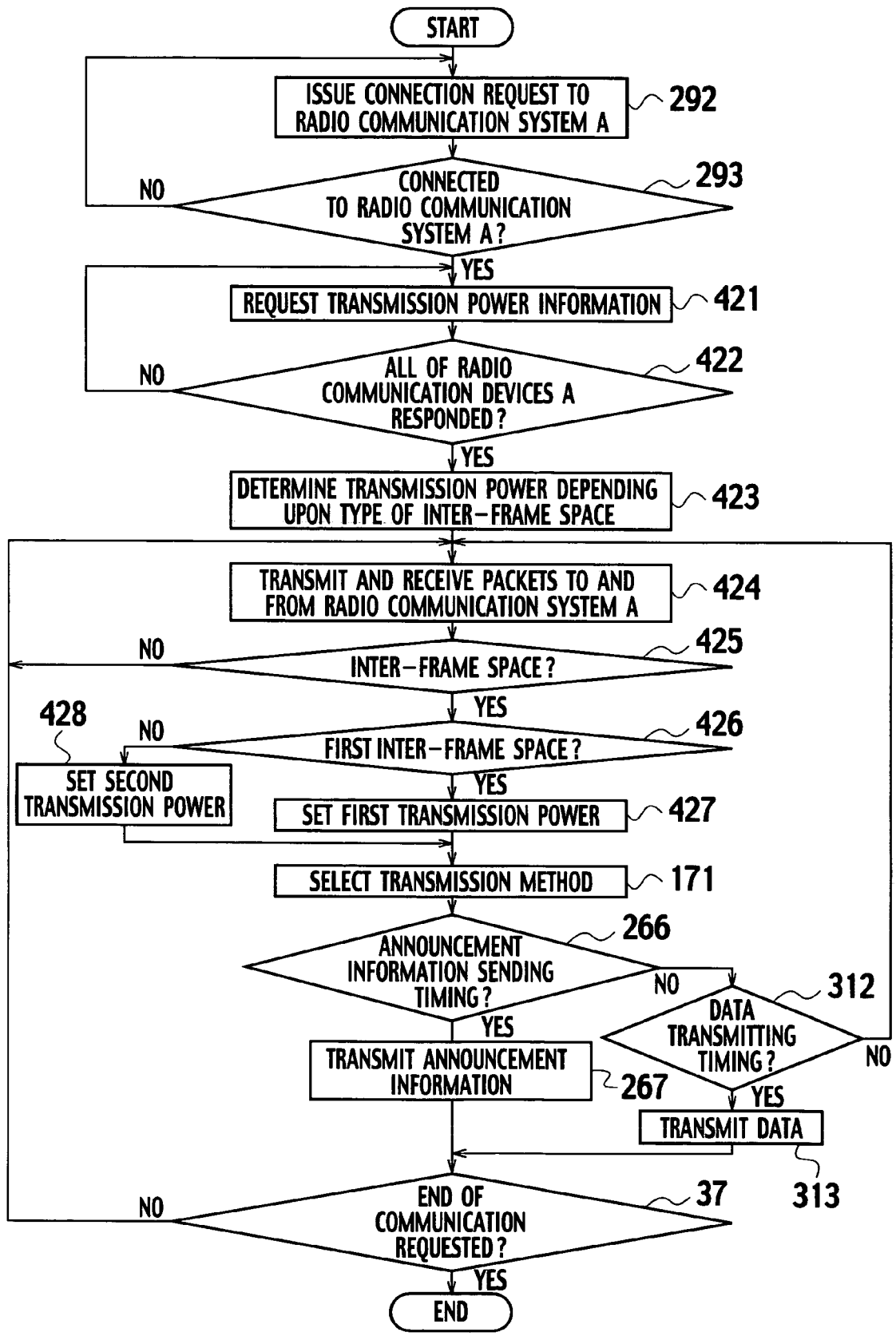
FIG. 48 is a flowchart showing an operation of the radio communication device (of FIG. 47) to transmit announcement information and data in the radio communication system.

A twelfth embodiment relates to modified configuration and operation of the communication system and communication device of the first embodiment shown in FIG. 4.
[Configuration of Communication Device]
Referring to FIG. 47, the communication device 4 (base station communication device 7) constituting the communication system 2 includes the transmitter-receiver unit 281 in place of the synchronizer 23 of the communication device 4 in the fourth embodiment, and an inter-frame space type determining unit 411.
[First Communication Operation of Communication System and Communication Device]
In the twelfth embodiment, the base station communication device 7 (see FIG. 47) sends the announcement information and data of the communication system 2 according to the procedures shown in the flowchart of FIG. 48. The transmitter-receiver unit 281 sends a connection request to the base station 5 (step 292). When the base station communication device 7 is connected to the communication system 1 (step 293), the control unit 25 controls the transmitter-receiver unit 281, and transmits a transmission power information request to the communication device 3 (refer to FIG. 1) of the communication system 1 (step 421). On the contrary, when no connection is established to the communication system 1, the connection request is repeatedly transmitted. The transmitter-receiver unit 281 checks whether or not the communication devices 3 of the communication system 1 have responded to the transmission power information request (step 422). If the communication devices 3 do not respond to the request, the transmission power information request will be repeatedly transmitted. On the contrary, if the communication devices 3 have responded, the transmitter-receiver unit 281 outputs the responses of the communication devices 3 to the transmission power determining unit 26, which determines transmission power depending upon the inter-frame space type (first or second inter-frame space) of the communication system 1 (step 423).

Inter-frame spaces between packets are SIFS (short inter-frame spaces) or DIFS on the basis of the IEEE802.11 system or radio LAN standard, for example. With the IEEE802.11 system, a data packet and an Ac packet following the data packet are connected by the SIFS. Receiving the data packet, the communication device does not detect carrier signals during the SIFS but sends the Ack packet. The data packet and a succeeding data packet are connected in a space between the DIFS and random back-off period, and carrier signal detection is performed during the DIFS. For instance, with the IEEE802.11a, a carrier sense level in the SIFS is designed to be −62 [dBm]. The SIFS is assumed to be a first inter-frame space here. In such a case, first transmission power is set to a maximum in a frequency band covered in law, for instance. The DIFS is assumed to be a second inter-frame space. Second transmission power is set to be a value in such a manner that reception power for receiving the signal from the base station communication device 7 is equal to or less than a carrier sense level in the DIFS when the communication devices 3 of the communication system 1 receive such a signal.

The transmitter-receiver unit 281 transmits and receives the packet to and from the communication system 1 (step 424), and checks whether or not there is an inter-frame space between the adjacent packets (step 425). If there is no inter-frame space, the procedures following step 424 will be repeatedly executed. On the contrary, if there is the inter-frame space, the inter-frame space type determining unit 411 determines the type of the inter-frame space (step 426), and sends the determined result to the transmission power determining unit 26.

In the case of the first inter-frame space, the transmission power determining unit 26 selects the first transmission power as the transmission power (step 427). In the case of the second inter-frame space, the transmission power determining unit 26 selects the second transmission power as the transmission power (step 428). The transmission power determining unit 26 sends the selected transmission power to the control unit 25, which transfers the transmission power to the transmitter-receiver unit 24. Once the transmission power is set up, the transmission method determining unit 161 selects a packet transmission method for the communication system 2 (step 171), and sends the transmission method to the transmitter-receiver unit 24. The transmitter-receiver unit 24 checks whether or not the announcement information transmission timing reaches (step 266). If the announcement information transmission timing reaches, the transmitter-receiver unit 24 transmits the announcement information of the communication system 2 during the inter-frame space of the communication system 1, using the transmission power received from the control unit 25 (step 267). On the contrary, if the announcement information transmission timing does not reach, it is checked whether or not the data transmission timing reaches (step 312). If the data transmission timing is reached, the transmitter-receiver unit 24 transmits the data of the communication system 2 during the foregoing inter-frame space, using the transmission power set by the transmission power determining unit 26 (step 313). If the data transmission timing does not reach, the procedure following step 424 will be repeatedly executed. Further, if there is a communication end request from the user or the like, the communication operation will be terminated (step 37). On the contrary, if there is no communication end request, the procedures following step 424 will be repeatedly executed.

In the communication device 4 in FIG. 47, the inter-frame space type determining unit 411 is independent from the transmitter-receiver unit 281. Alternatively, the inter-frame space type determining unit 411 may be included in the transmitter-receiver unit 281.

[Communication Operation in Response to Transmission Power Information Request of Communication Device]

Figure 49:
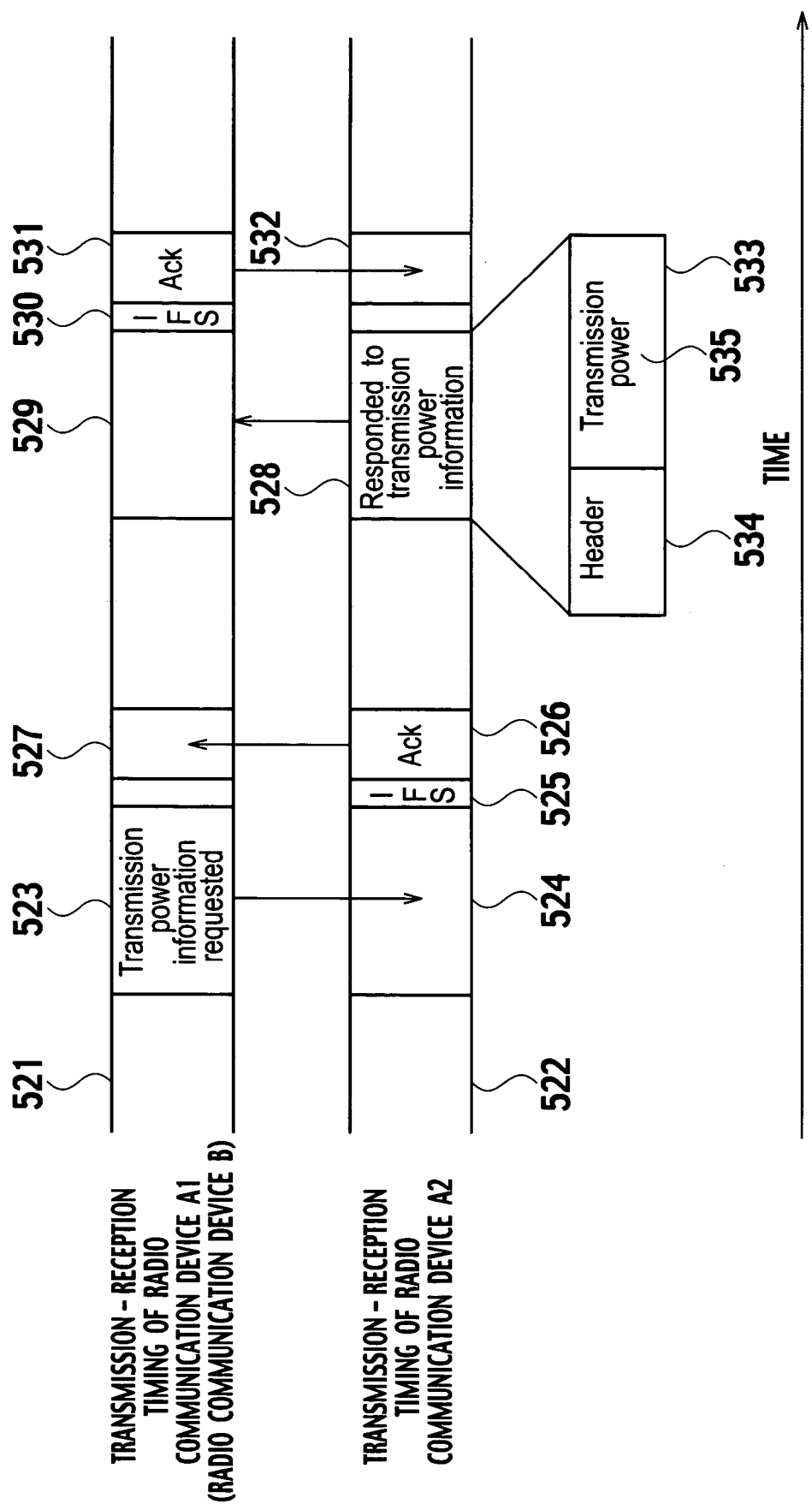
FIG. 49 is a timing chart showing one example of operations of the communication device of the twelfth embodiment of the invention.

FIG. 49 shows a timing of sequence 521 in which the transmitter-receiver unit 281 transmits the transmission power information request to the communication device 3, and a timing of sequence 522 in which the communication device 2 responds to the transmission power information request. The communication device 4 transmits the transmission power information request 523 to the communication device 3 (A2), which receives the request (524). The request 523 sent by the communication device 4 may be a TPC (transmission power control) request frame defined by the IEEE802.11h, for example. The communication device 3 (A2) transmits an Ack packet 526 in response to the request 523 after a lapse of IFS time 525. The communication device 4 receives the Ack packet 526 (527). When getting ready to respond to the transmission power information request, the communication device 3 (A2) transmits a response 528 to the communication device 4, which receives the response 528 (529). The response 528 may be a TPC report frame defined by the IEEE802.11h, for example. The communication device 4 transmits an Ack packet 531 in response to the response 528 after a lapse of IFS space 530. The communication device 3 (A2) receives the Ack packet 531 (532). In FIG. 49, reference numeral 533 denotes contents of the response 528 to the transmission power information request, which includes a header 534 and transmission power 535 for sending the transmission power information response packet. The header 534 includes information such as a modulation system or a size necessary for receiving the packet, packet addressee, and so on.

The communication device 3 is assumed to receive the transmission power information request from the communication device 4 and sends the transmission power information response packet 528 at 10 [dBm]. Further, the reception power of the transmission power information response packet is assumed to be −40 [dBm]. In this case, transmission losses between the communication device 4 issuing the transmission power information request and the communication device 3 responding to the request are calculated to be 50 (=10−(−40)) [dB]. Therefore, when the communication system 1 operates on the IEEE802.11a, a carrier sense level during the DIFS space is −62 [dBm], so that the transmission power of the packet to be sent during the DIFS space is to be −15 (=(−62)+50−3)[dBm] by deducting a 3 [dB] margin from −12 [dB], for instance.

FIG. 50 shows communication losses caused between the communication devices 3 and 4. The losses are calculated on the basis of the transmission power information responses received from the four communication devices 3 (i.e. A1 to A4). If the communication system 1 is assumed to operate on the IEEE802.11a, the carrier sense level in the DIFS space is −62 [dBm]. Therefore, the transmission power of the packet to be sent in the DIFS space is determined to be −62 [dBm]+ 67 [dBm]=5 [dBm] or less in accordance with the communication device 3 (A3) having the minimum transmission loss. For instance, the transmission loss is calculated to be 0 [dBm] by deducting the 5 [dBm] margin from 5 [dBm].

[Second Communication Operations of Communication System and Communication Device]

Figure 51:
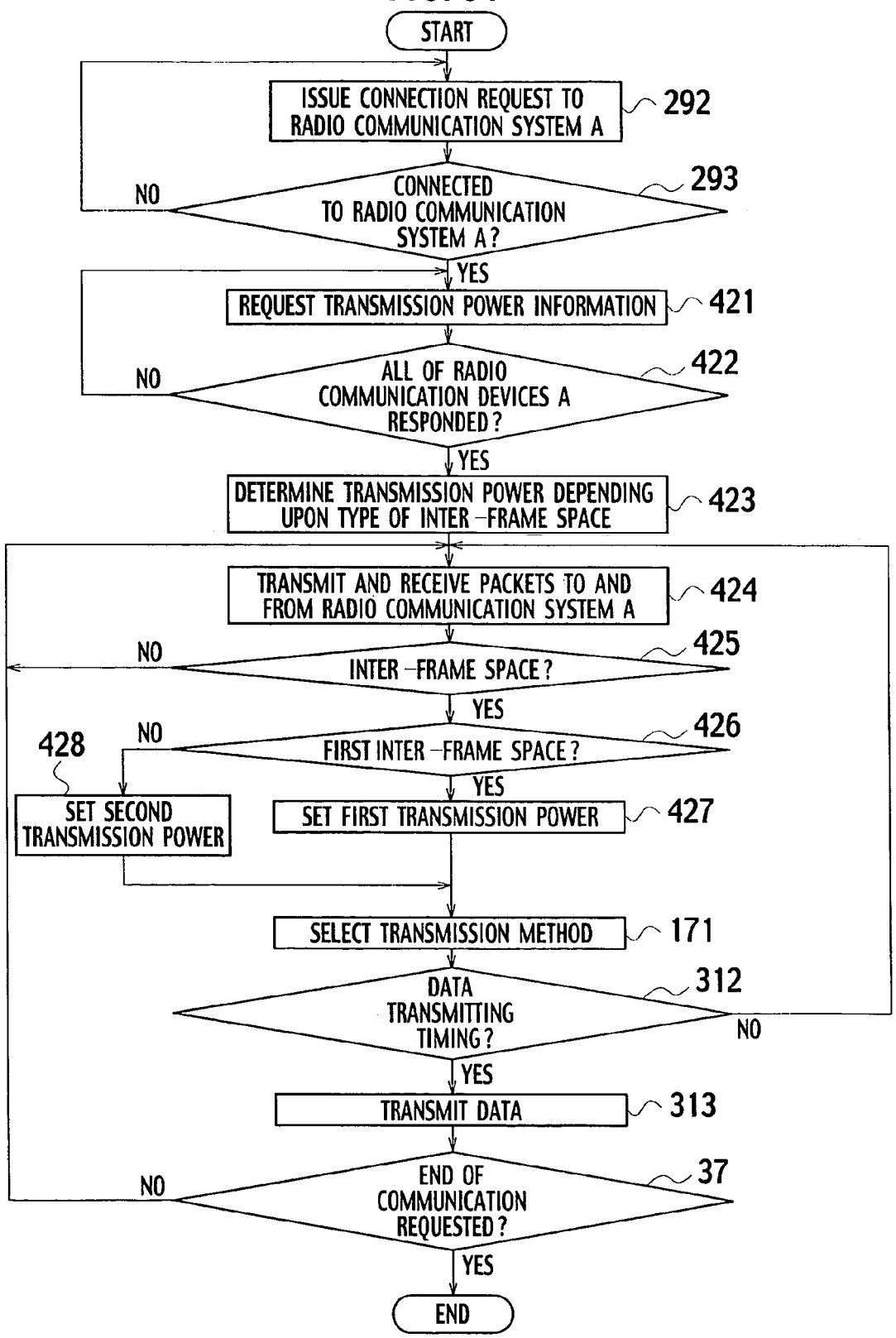
FIG. 51 is a flowchart showing a second operation of the radio communication device to transmit data of the radio communication system of FIG. 47.

The terminal station communication device 8 (shown in FIG. 47) transmits the data of the base station communication device 7 in accordance with the procedures shown in the flowchart of FIG. 51. The transmitter-receiver unit 281 of the terminal station communication device 8 sends a connection request to the base station 5 (step 292). When connected to the communication system 1, the transmitter-receiver unit 281 sends the transmission power information request to communication devices 3 of the communication system 1 (step 421). On the contrary, if any terminal station communication device 8 is not connected to the communication system 1, the connection request will be repeatedly transmitted. The transmitter-receiver unit 281 checks whether or not communication devices 3 of the communication system 1 have responded to the transmission power information request (step 422). If there are any communication devices 3 of the communication system 1 that has not responded to the transmission power information request, the transmission power information request will be repeatedly issued to the communication devices 3.

When receiving responses from the communication devices 3 of the communication system 1, the transmitter-receiver unit 281 sends the responses to the transmission power determining unit 26, which determines transmission power in accordance with an inter-frame space type of the communication system 1 (step 423). The types of the inter-frame spaces between adjacent packets are classified into SIFS, DIFS and so on of IEEE802.11 or LAN standard. With the IEEE802.11 system, a data packet and an Ack packet following the data packet are connected by SIFS. A communication device receiving the data packet transmits an Ack packet without carrier sensing within the SIFS space. On the contrary, the carrier sensing is performed in the DIFS space since the Ack packet and a next data packet are connected by the DIFS and random back-off spaces.

For instance, with the IEEE802.11a, the carrier sense level is designed to be 62 [dBm] in the DIFS space. The SIFS space is assumed to be a first inter-frame space. In this case, the first transmission power is set to a maximum transmission power in a frequency band covered in law. Conversely, the DIFS space is assumed to a second inter-frame space. The second transmission power at the communication devices 3 of the communication system 1 is designed to have a value which makes the reception power of the signal sent by the terminal station communication device 8 equal to or smaller than the carrier sense level in the DIFS space. The transmitter-receiver unit 281 transmits and receives packets for the communication system 1 (step 424), and checks whether or not the inter-frame space is present between the current packet and a succeeding packet (step 425). If no inter-frame space is present, the procedures following step 424 will be repeatedly executed. Conversely, if the inter-frame space is present, the inter-frame space type determining unit 411 checks the type of the inter-frame space (step 426), and sends the checked result to the transmission power determining unit 26. The transmission power determining unit 26 selects the first transmission power when the inter-frame space is the first inter-frame space (step 427). In the case of the second inter-frame space, the transmission power determining unit 26 select the second transmission power (step 428). After the determination of the transmission power, the transmission method determining unit 161 selects the packet transmitting method (step 171), and sends it to the transmitter-receiver unit 24. The transmitter-receiver unit 24 checks whether or not the timing to send the data to the communication system 2 reaches (step 312). If the data transmitting timing reaches, the transmitter-receiver unit 24 sends the data of the communication system 2 during the inter-frame space, using the transmission power determined by the transmission power determining unit 26 (step 313). On the contrary, if the data transmitting timing does not reach, the procedures following step 424 will be repeatedly executed. When a connection end request arrives from the user or the like, the communication operation will be terminated (step 37). Otherwise, the procedures following step 424 will be repeatedly executed.

In the terminal station communication device 8 (shown in FIG. 47), the inter-frame space type determining unit 411 is independent from the transmitter-receiver unit 281. Alternatively, the inter-frame space type determining unit 411 is included in the transmitter-receiver unit 281.

[Packet Transmission-Reception of Communication Device]

Figure 52:
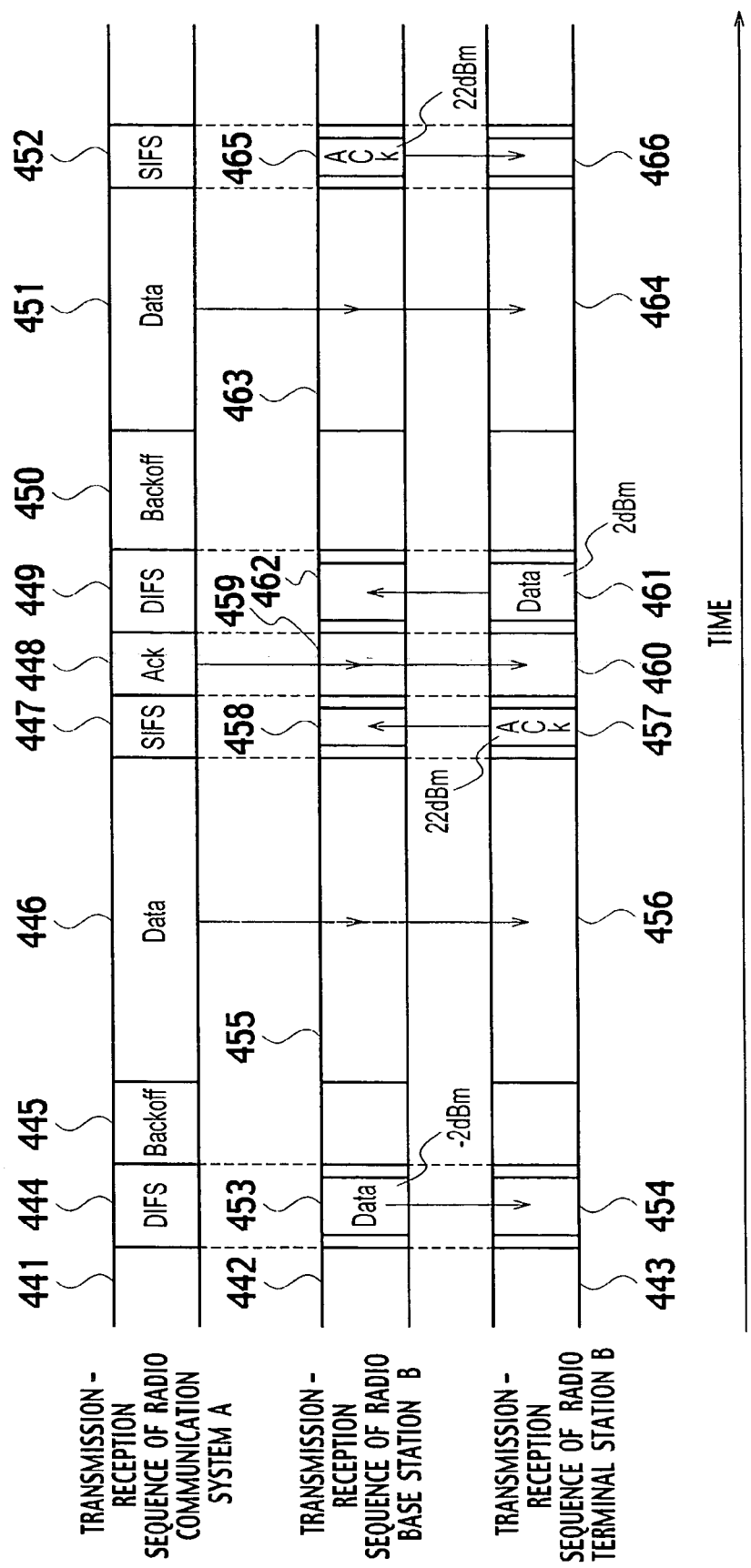
FIG. 52 is a timing chart showing one example of operation of the radio communication device in the twelfth embodiment.

FIG. 52 shows a timing of packet transmission-reception sequence 441 of the communication device 3 belonging to the communication system 1, and a timing of packet transmission-reception sequence 442 of the communication device 7 belonging to the communication system 2. The communication system 1 is assumed to adopt the IEEE802.11a. In this case, the power of 22 [dBm] is used for the base station communication device 7 and the terminal station communication device 8 to send the data in the SIFS; a minimum transmission loss is calculated to be 65 [dB] when the base station communication device 7 receives the transmission power information request from all of the communication devices 3; and a minimum transmission loss is calculated to be 69 [dB] when the terminal station communication device 8 receives the transmission power information request from all of the communication devices 3. Further, a margin of 5 [dB] is used to determine the transmission power of the packet for the base station communication device 7 and the terminal station communication device 8 to send the data during the DIFS. Since the carrier sense level is −62 [dBm] during the DIFS of the IEEE802.11a, the transmission power of the packet to be sent by the base station communication device 7 in the DIFS is determined to be −2 (=(−62)+65−5) [dBm], and the transmission power of the packet to be sent by the terminal station communication device 8 in the DIFS is determined to be 2 (=(−62)+69−5) [dBm].

In a DIFS space 444, the base station communication device 7 provides the terminal station communication device 8 with the data packet 453 of the communication system 2 using the transmission power of −2 [dBm] (step 454). After a back-off space 445, the base station communication device 7 and the terminal station communication device 8 receive and recognize the data packet which relates to the communication system 1 and is sent by the communication device 3 (455, 456). The terminal station communication device 8 sends an Ack packet 457 in response to the data packet 453 in the SIFS space, using the 22 [dBm] transmission power. The base station communication device 7 receives the Ack packet 457 (458). Both of the base station and terminal communication devices 7 and 8 recognizes the Ack packet which relates to the communication system 1 and is sent by the communication device 3 (459, 460). In a DIFS space 449, the terminal station communication device 8 sends a data packet 461 of the communication system 2 using the 2 [dBm] transmission power. The base station communication device 7 receives a data packet 461 (462). After the back-off space 450, both the base station and terminal station communication devices 7 and 8 receives and recognizes the data packet which relates to the communication system 1 and is sent by the communication device 3 (463, 464). In the SIFS space 452, the base station communication device 7 sends an Ack packet 465 in response to the data packet 461, using the 22 [dBm] transmission power. The terminal station communication device 8 receives an Ack packet 465 (466).

In the twelfth embodiment, the communication device 4 changes the transmission power depending upon the types of the inter-frame spaces in which no packet of the communication system 1 is transmitted, and sends and receives the packet during the inter-frame space of the communication system 1. This enables the communication device 4 to share the frequency band with the communication system 1, to send and receive packets without adversely affecting the signal transmission-reception of the communication device 3, and promotes more efficient use of radio communication resources.

Further, the communication device 4 transmits and receives the packet only while no packet is transmitted for the communication system 1. Alternatively, the communication device 4 may transmit and receive the packet as the communication device 4 of the communication system 2 in addition to the packet transmission-reception as the communication device 3 of the communication system 1 while no packet is transmitted for the communication system 1.

Thirteenth Embodiment

This embodiment relates to modified configuration and operation of the communication system and communication device in the first embodiment (shown in FIG. 4)

[Configuration of Communication Device]

Figure 53:
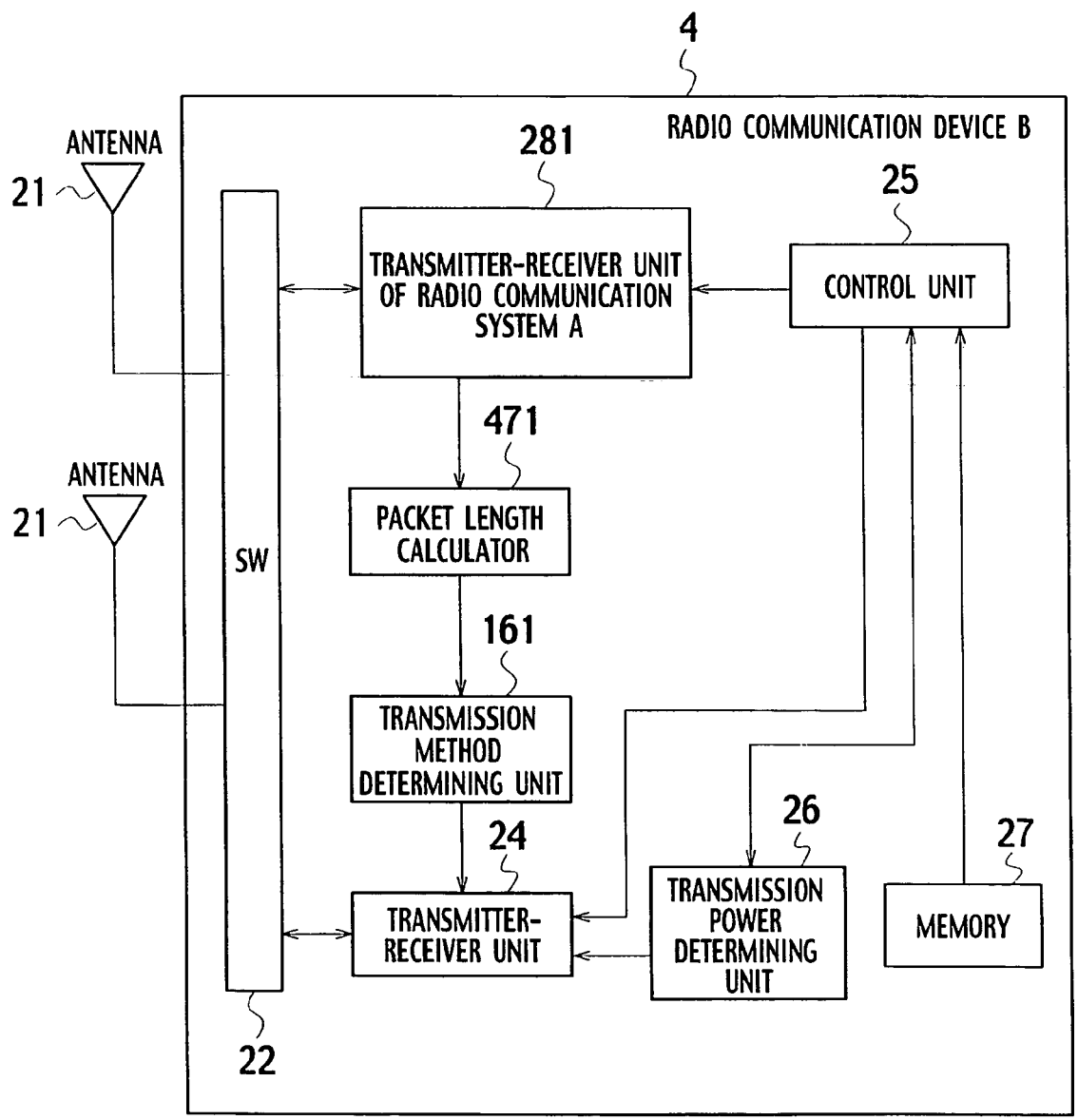
FIG. 53 is a block diagram of a radio communication device constituting a radio communication system in a thirteenth embodiment of the invention.

Referring to FIG. 53, the communication device 4 (base station communication device 7) constituting the communication system 2 includes the transmitter-receiver unit 281 in place of the synchronizer 23; the control unit 25; and a packet length calculator 411.

[First Communication Operation of Communication System and Communication Device]

Figure 54:
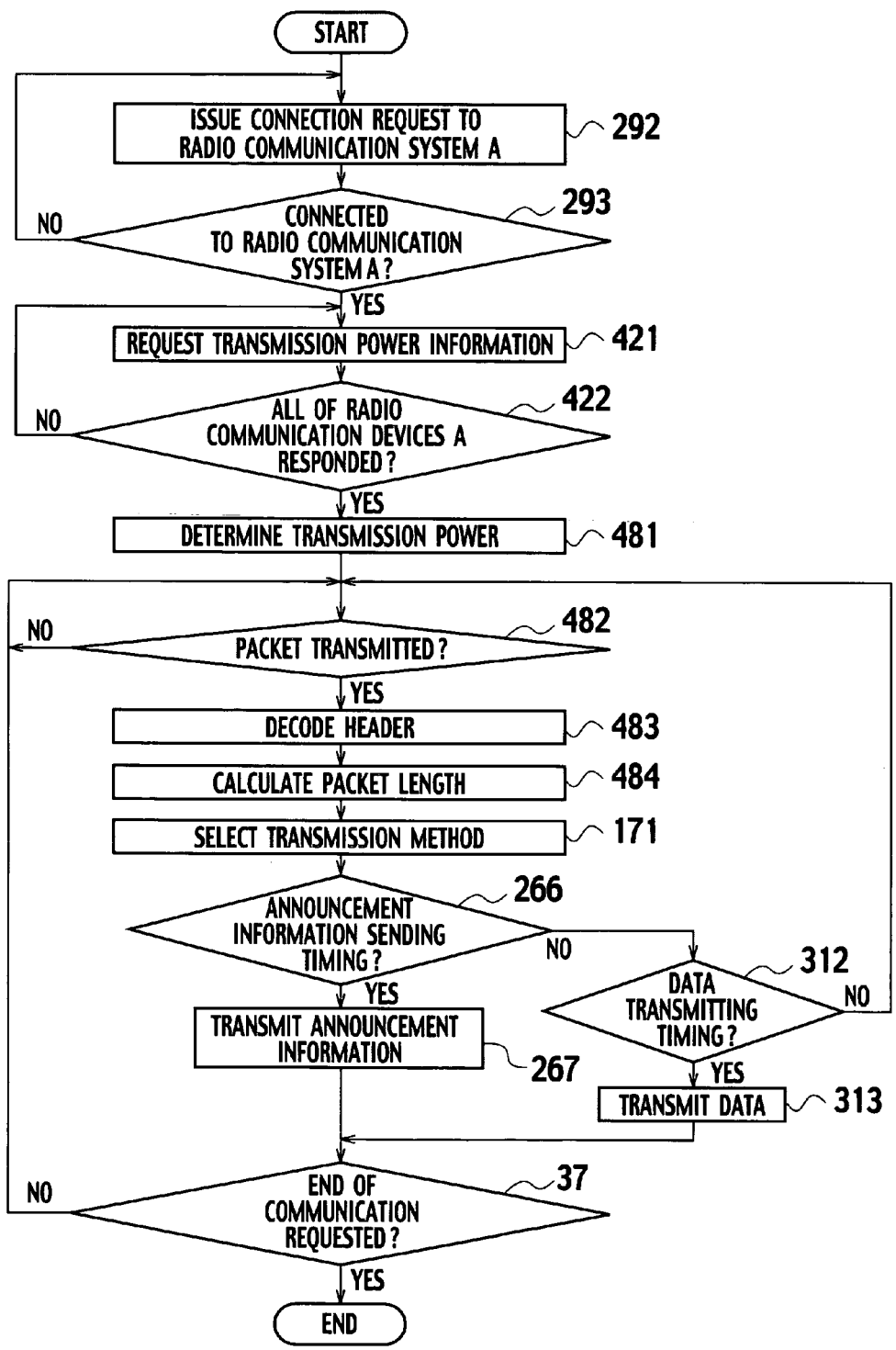
FIG. 54 is a flowchart showing an operation of the radio communication device (of FIG. 53) to transmit announcement information and data in the radio communication system.

The base station communication device 7 (shown in FIG. 53) transmits data and announcement information of the communication system 2 according to the procedures shown in the flowchart of FIG. 54. The transmitter-receiver unit 281 of the base station communication device 7 sends a connection request to the base station 5 (step 292). When connected to the communication system 1, the control unit 25 controls the transmitter-receiver unit 281, and transmits a transmission power information request to the communication device 3 (step 421). In step 293, when not connected to the communication system 1, the connection request will be repeatedly transmitted. The transmitter-receiver unit 281 checks whether or not the communication devices 3 have responded to the transmission power information request (step 422). If none of the communication devices 3 respond to the foregoing request, the transmission power information request will be repeatedly transmitted. On the contrary, if the communication devices 3 have responded, the transmitter-receiver unit 281 transfers the responses to the transmission power determining unit 26. On the basis of an allowable level of the communication device 3 stored in the memory 27, the transmission power determining unit 26 determines transmission power in order that reception power for receiving the signal from the base station communication device 7 is equal to or less than the allowable level in all of the communication devices 3 (step 481). The transmission power determining unit 26 sends the determined transmission power to the control unit 25, which transfers the transmission power to the transmitter-receiver unit 24.

The transmitter-receiver unit 281 checks whether or not the packet is detected (step 482). When the packet is detected, the transmitter-receiver unit 281 decodes a header (step 483). A packet length calculator 471 calculates a packet length D on the basis of the header information (step 484). For instance, a packet header of the IEEE802.11a lists information concerning a packet size and a transmission rate. The packet length D (μ seconds) is derived using the following formula:

$$D = 20 + 4 \times \text{ceil}((22 + 8 \times L)/(4 \times R)) \tag{11}$$

Where the packet size is represented by L bytes; the transmission rate is R [Mbps]; and ceil (X) shows the smallest integer in the integer over X. The packet length calculator 471 outputs the calculated packet length and a transmission start signal to the transmission method determining unit 161. The transmission method determining unit 161 determines a transmission method (step 171), and outputs it to the transmitter-receiver unit 24, which checks whether or not the timing for sending the announcement information of the communication system 2 reaches (step 266). If the timing for sending the announcement information reaches, the transmitter-receiver unit 24 sends the announcement information of the communication system 2 using the transmission power received from the control unit 25 within the packet length received from the transmission method determining unit 161 (step 267). If the timing in question does not reach, it is checked whether or not the data transmitting timing is reached (step 312). If the data transmission timing reaches, the transmitter-receiver unit 24 sends the data of the communication system 2 using the transmission power determined by the transmission power determining unit 26 and within the packet length received from the transmission method determining unit 161 (step 313). On the contrary, if the data transmitting timing does not reach, the procedures following step 482 will be repeatedly executed. If there is a communication end request from the user or the like, the communication operation will be terminated (step 37). Otherwise, the procedures following step 482 will be repeatedly executed.

In the thirteenth embodiment, the packet continuation period calculator 471 is independent from the transmitter-receiver unit 281 in the base station communication device 7. Alternatively, the packet continuation period calculator 471 may be included in the transmitter-receiver unit 281.

It is assumed here that the communication system 1 operates on the IEEE802.11a, and that the transmission losses which have been calculated on the basis of the transmission power information responses received from the four communication devices (A1) to (A4) are as shown in FIG. 50. Further, the allowable interference level of the communication device 3 is assumed to be −85 [dBm], and is stored in the memory 27. Transmission power of packet to be transmitted by the communication device 4 is determined to be equal to or less than −85 [dBm]+67 [dB]=−18 [dBm] in accordance with the minimum loss of the communication device 3 (A3). For instance, the transmission power is set to be −23 [dBm] by deducting 5 [dB] margin from −18 [dBm]. Since the transmission power of the packet to be sent by the communication device 4 is small, the transmission method determined by the transmission method determining unit 161 is a spectrum spread method, for example.

[Second Communication Operation of Communication System and Communication Device]

Figure 55:
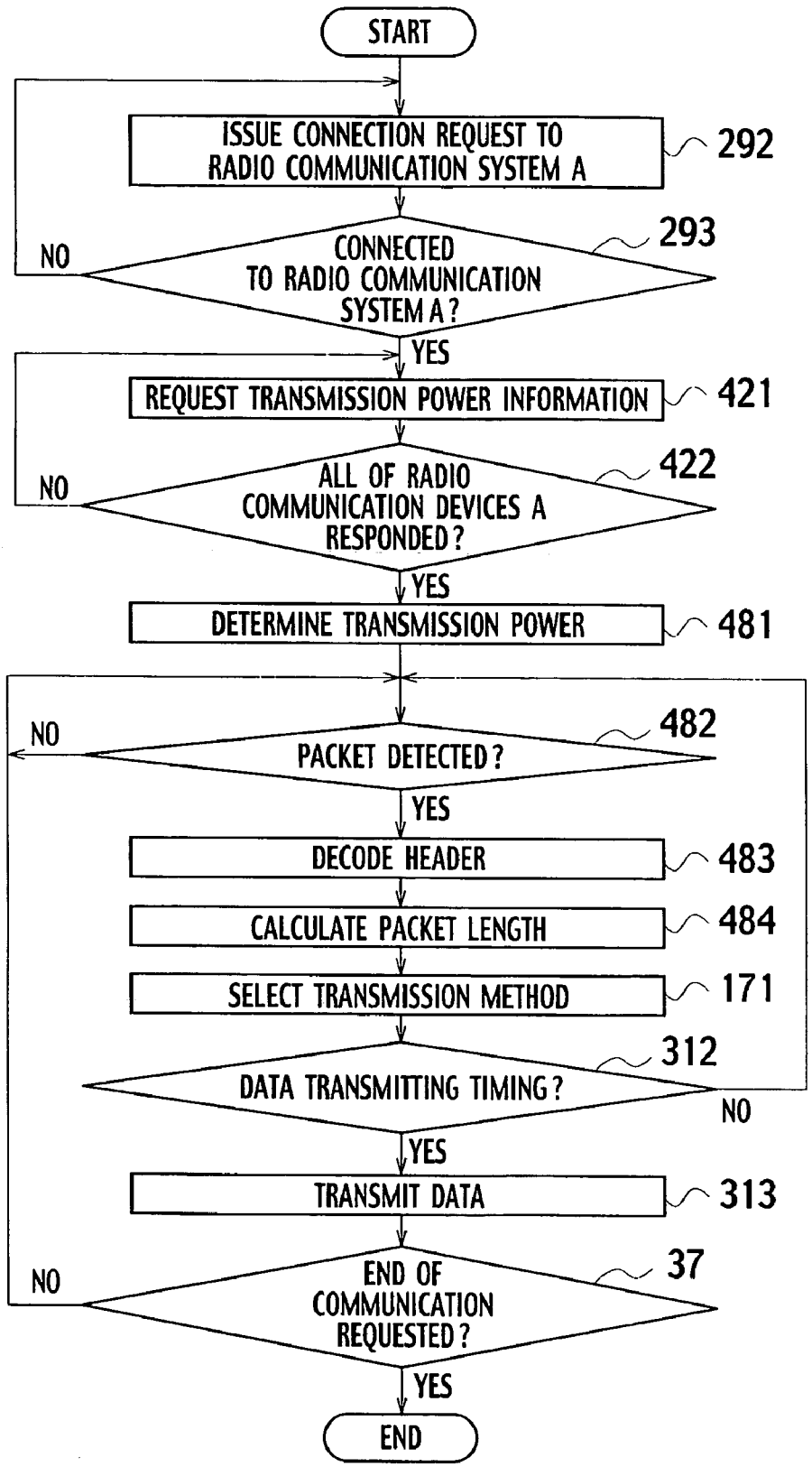
FIG. 55 is a timing chart showing one example of operation of the radio communication device in the thirteenth embodiment of the invention.

FIG. 55 shows a flowchart for the terminal station communication device 8 (shown in FIG. 53) to send the data of the communication system 2. The transmitter-receiver unit 281 sends a connection request to the base station 5 (step 292). When connected to the base station 5 (step 293), the control unit 25 controls the transmitter-receiver unit 281, and transmits a transmission power information request to the communication devices 3 of the communication system 1 (step 421). When not connected in step 293, the connection request will be repeatedly transmitted. The transmitter-receiver unit 281 checks whether or not the communication devices 3 have responded to the transmission power information request (step 422). If none of the communication devices 3 have responded to the request, the request will be repeatedly transmitted. On the contrary, when all of the communication devices 3 have responded, the transmitter-receiver unit 281 outputs the responses from the communication devices 3 to the transmission power determining unit 26. The transmission power determining unit 26 determines transmission power on the basis of the allowable level (stored in the memory 27) of the communication devices 3 in order that the reception power for receiving the signal from the base station communication device 7 is equal to or smaller than the allowable level of the communication devices 3 (step 481). The determined transmission power is outputted to the control unit 25, which transfers the received transmission power to the transmitter-receiver unit 24.

The transmitter-receiver unit 281 checks whether or not the packet is detected (step 482). If the packet is detected, the transmitter-receiver unit 281 decodes the header (step 483). The packet length calculator 471 calculates a packet length on the basis of a header information (step 484), and sends the calculated result to the transmission method determining unit 161. The transmission method determining unit 161 determines the transmission method (step 171), and outputs the transmission method to the transmitter-receiver unit 24. The transmitter-receiver unit 24 checks whether or not the data transmission timing reaches (step 312). If the data transmission timing reaches, the transmitter-receiver unit 241 transmits the data of the communication system 2 within the packet length (received from the transmission method determining unit 161) and using the transmission power (received from the control unit 25) (step 313). On the contrary, if the data transmission timing does not reach, the procedures following step 482 will be repeatedly executed. In this state, when there is a connection end request from the user or the like, the communication operations will be terminated. Otherwise, the procedures following step 482 will be repeated.

In the terminal station communication device 8 shown in FIG. 53, the packet length calculator 471 is independent from the transmitter-receiver unit 281. Alternatively, the former may be included in the latter.

Figure 56:
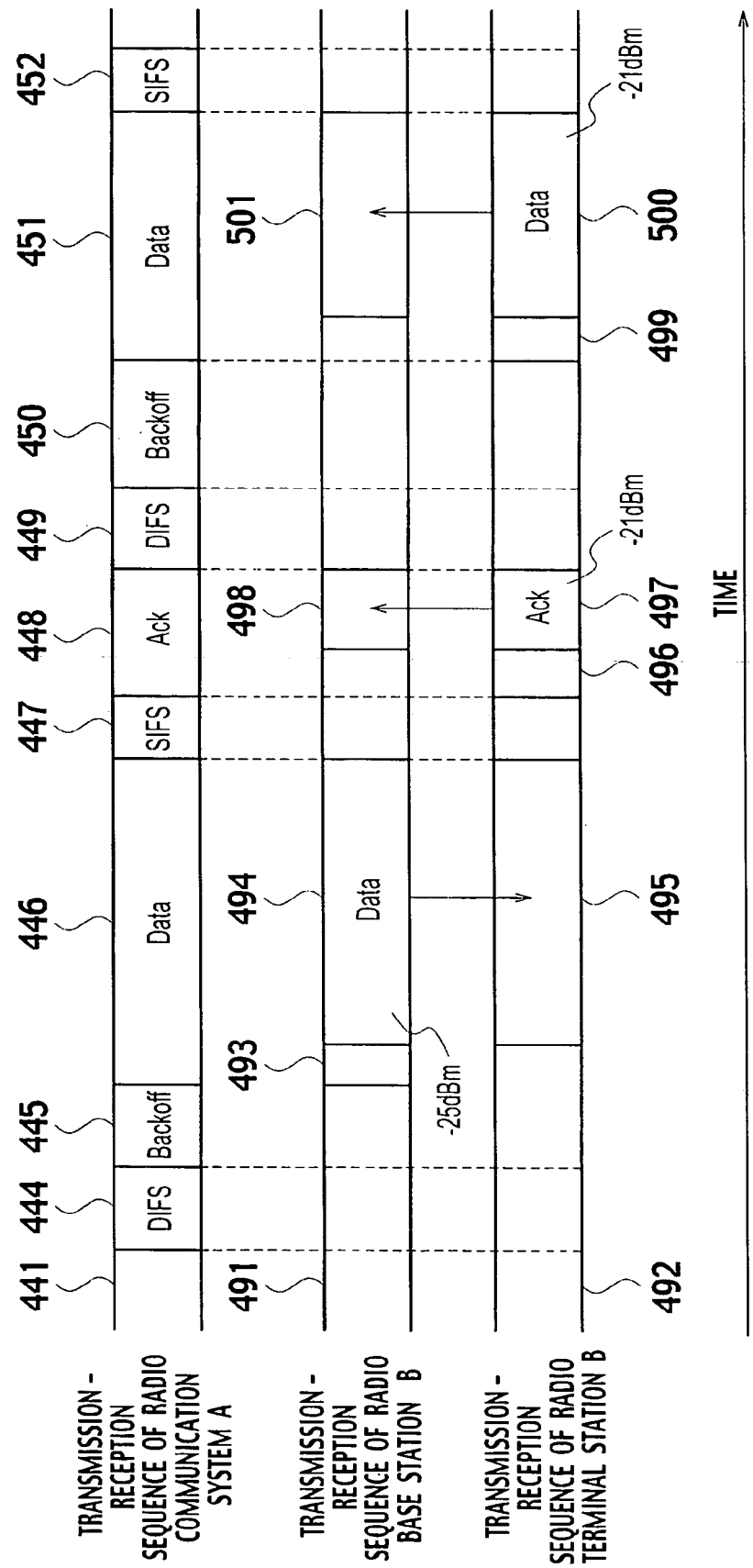
FIG. 56 is a timing chart showing one example of operation of the radio communication device in the thirteenth embodiment of the invention.

FIG. 56 shows the packet transmission-reception sequence 441 of the communication device 3 of the communication system 1, the packet transmission-reception sequence 491 of the communication device 7 of the communication system 2, and the packet transmission-reception sequence 492 of the communication device 8 of the communication system 2. The communication system 1 operates on the IEEE802.11a. The minimum transmission loss is calculated to be 65 [dB] when the base station communication device 7 responds to the transmission power information requests from the communication devices 3. Further, the minimum transmission loss is 69 [dB] when the terminal communication device 8 responds to the transmission power information requests from all of the communication devices 3.

The margin is set to be 5 [dB] when the base station and terminal station communication devices 7 and 8 determine the packet transmission power. The allowable level of the communication device 3 is −85 [dBm]. Transmission power for the base station communication device 7 to send the packet is −25 [dBm] (=−85 [dBm]+65 [dB]−5 [dB]). Transmission power for the terminal station communication device 7 to send the packet is −21 [dBm] (=−85 [dBm]+69 [dB]−5 [dB]). When detecting the packet 466 sent by the communication device 3, the base station communication device 7 decodes the header information in the packet 466, and calculates the packet length 466 (493). In accordance with the packet length 466, the base station communication device 7 sends the data packet 494 of the communication system 2 using the −25 [dBm] transmission power and the spectrum spread, for instance. The terminal station communication device 8 receives the data packet 494 (495). When detecting the data packet 448 from the communication device 3, the terminal station communication device 8 decodes the header information in the packet 448, and calculates the packet length 448 (496).

Depending upon the packet length 448, the terminal station communication device 8 sends the Ack packet 497 in response to the data packet 494 of the communication system B2. In this case, the −21 [dBm] transmission power and the spectrum diffusion are utilized. The base station communication device 7 receives the Ack packet 497 (498). Detecting the packet 451 from the communication device 3, the terminal station communication device 8 decodes the header information in the packet 451, and calculates the packet length 451 (499). Thereafter, depending upon the packet length 451, the terminal station communication device 8 sends the data packet 500 of the communication system 2. In this case, the −21 [dBm] transmission power, and the spectrum spread are utilized. The base station communication device 7 receives the data packet 500 (501).

The base station and terminal station communication devices 7 and 8 send the packets using the spectrum spread within the bandwidth of the communication system 1. Further, the transmission power of the base station and terminal station communication devices 7 and 8 is determined on the basis of the receiver sensitivity of the communication devices 3. Alternatively, the foregoing transmission power may be determined on the basis of the interference level of the communication devices 3 if it is known. Further, the base station and terminal station communication devices 7 and 8 may appropriately change their transmission power in accordance with transmission rates of the decoded header information in the packets sent by the communication devices 3.

FIG. 60 shows the relationship between transmission levels stored in the memory 27 of the communication device 4 (shown in FIG. 53) and allowable interference levels in response to the selected transmission levels. It is assumed here that: the communication system 1 operates on the IEEE802.11a; the transmission losses between the communication devices 3 and 4 are calculated on the basis of the responses to the transmission power information requests received from the four communication devices (A1) to (A4), and are values as shown in FIG. 50; and the margin is 5 [dB] when determining the transmission power for the packet transmission. The header information is decoded in steps 483 shown in FIG. 54 and FIG. 55, and the transmission rate is 24 [Mbps]. In this case, the allowable level of the communication device 3 is −76 [dBm] as shown in FIG. 60. Therefore, the transmission power of the communication device 4 is determined to be −14 [dBm] (=−76+67−5) in order to be compatible with the communication device 3 (A3) having the minimum transmission loss as shown in FIG. 50. Further, it is assumed that the header is decoded in the step 483 shown in FIG. 54 and FIG. 55; and that the transmission rate is 48 [Mbps]. The allowable level of the communication device 3 is −84 [dBm] as shown in FIG. 60. Therefore, the transmission power of the communication device 4 is determined to be −22 [dBm] (=−84+67−5) in order to be compatible with the communication device 3 (A3) having the minimum transmission loss as shown in FIG. 50.

In the thirteenth embodiment, the communication device 4 decodes the header information in the packet received from the communication device 4, and calculates the packet length on the basis of the header information. The communication device 4 transmits the packet using the transmission power which does not adversely affect the packet transmission-reception. Therefore, the communication device 3 shares the frequency band with the communication system 1, and can transmit and receive the packet without interfering with the signal transmission-reception of the communication device 3. This improves the application efficiency of radio communication resources.

FIG. 61 shows an example format of a data frame 6000 to be transmitted by the communication device 4. The data frame 6000 is constituted by a system identifier field 6001, a frame type field 6002, a destination terminal identifier field 6003, a transmitting terminal identifier 6004, a sequence number field 6005, a payload length field 6006, and a CRC bit field 6008.

The system identifier field 6001 is 8-bit long. For instance, the system identifier field 6001 lists "0x42" which is the ASCII code representing the letter "B" identifying the communication system B. The frame type field 6002 is 2-bit long, and lists "00" denoting a data frame, for instance. The destination terminal identifier field 6003 is 4-bit long, and is set to be "0011" when "0011" is assigned as the destination terminal identifier, for instance. Further, if the data frame is a broadcast frame, the destination terminal identifier field 6003 is set to be "1111" representing the broadcast. The transmitting terminal identifier 6004 is 4-bit long, and is set to be "0010" if the transmitting terminal identifier is "0010". The sequence number field 6005 is 4-bit long, and is set to be "0010" when the frame in question is a frame transmitted secondly. The payload length filed 6006 is 8-bit long, and denotes an octet number of a payload field 6007 following a current field. For instance, if the octet number of the payload field is 50 octets, the payload field 6007 is set to be "00110010". The payload field 6007 lists a string of transmission information bits, and is a field which has the number of octets listed in the payload length field 6006. The CRC bit field 6008 is 8-bit long, and lists a bit which is used to determine CRC and is expressed by a poly-nominal.

FIG. 62 shows an example format of the Ack frame 6010 to be transmitted by the communication device 4. The Ack frame 6010 is used to confirm the transmission of a data frame immediately prior to the Ack frame 6010, and includes the system identifier field 6001, frame type field 6002, destination terminal identifying field 6003, transmitting terminal identifier field 6004, and sequence number identifier field 6005.

The system identifying field 6001 is 8-bit long. For instance, the system identifying field 6001 lists "0x42" which is the ASCII code representing the letter "B" identifying the communication system B. The frame type field 6002 is 2-bit long, and lists "01" denoting an Ack frame, for instance. The destination terminal identifier field 6003 is 4-bit long, and is set to be "0010" when "0010" is assigned as the destination terminal identifier, for instance. The transmitting terminal identifier field 6004 is 4-bit long, and is set to be "0011" if the transmitting terminal identifier is "0011". The sequence number field 6005 is 4-bit long, and is set to be "0010" when the frame in question is a frame transmitted secondly.

Figure 63:
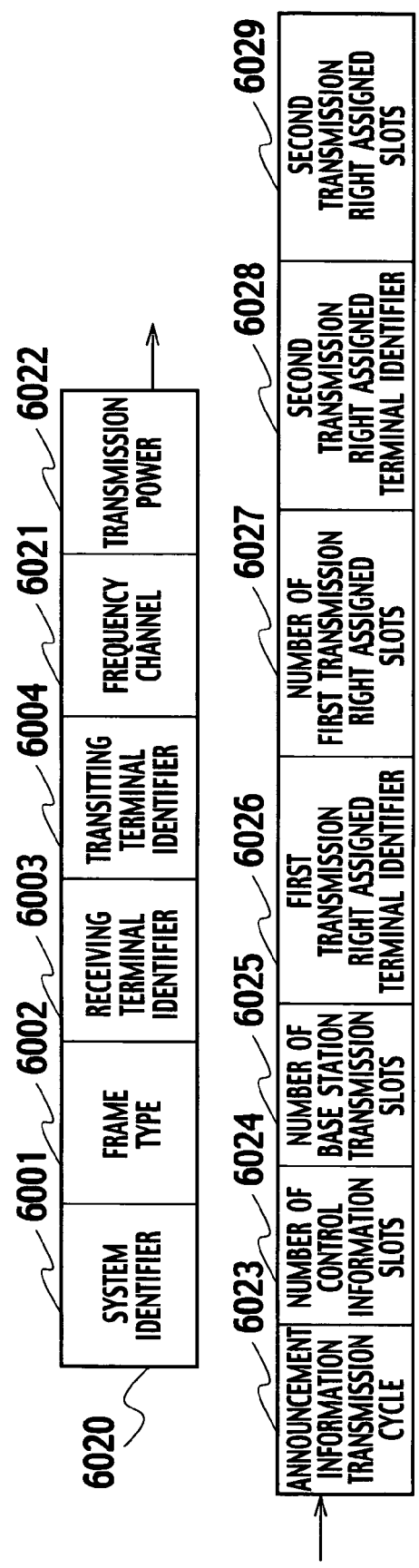
FIG. 63 shows one example of formats of announcement information formats to be sent by the base station in the thirteenth embodiment.

FIG. 63 shows an example format of an announcement information frame 6020 to be transmitted by the base station communication device 7. The announcement information frame 6020 includes the system identifier field 6001, frame type field 6002, destination terminal identifier field 6003, transmitting terminal identifier 6004, frequency channel field 6021, transmission power field 6022, announcement information transmitting cycle field 6023, control information slot number field 6024, base station transmission slot number field 6025, first transmission right assigning terminal identifier field 6026, first transmission right assigning slot number field 6027, second transmission right assigning terminal identifier field 6028, and second transmission right assigning slot number field 6029.

The system identifier field 6001 is 8-bit long. For instance, the system identifier field 6001 lists "0x42" which is the ASCII code representing the letter "B" identifying the communication system B. The frame type field 6002 is 2-bit long, and lists "10" denoting an announcement information frame, for instance. The destination terminal identifier field 6003 is 4-bit long, and is set to be "1111" since the announcement information represents broadcast. The transmitting terminal identifier field 6004 is 4-bit long, and is set to be "0010" if the transmitting terminal identifier is "0010".

The frequency channel field 6021 is 8-bit long, and lists a numeral representing a predetermined frequency channel. If No. 76 frequency channel is used, the frequency channel field 6021 list "01001100". The transmission power field 6022 is 8-bit long, and lists transmission power of the frames to be transmitted by the base station communication device 7. For instance, if the foregoing transmission power is 10 [dBm], the transmission power field 6022 is set to be "00001010". The announcement information transmission period field 6023 is 4-bit long, and represents a cycle in which the announcement information is transmitted. If the announcement transmitting cycle is 10 slots, the announcement information transmission cycle field 6023 is se to be "1010", so that the announcement information is transmitted once for every 10 slots. The control information slot number field 6024 is 4-bit long, and represents the number of slots which follow the announcement information slot and are used for sending the control information. If the control information is sent in two slots, the control information slot number field 6024 is set to be "0010". The base station transmission slot number field 6025 represents the number of slots which follows the control information slot and are used for the base station communication device 7 to send the data frame. If three slots are used to send the data frame, the base station transmission slot number field 6025 is set to be "0011". The first transmission right assigning terminal identifier field 6026 is 4-bit long, follows the slots for sending the data frame of the base station communication device 7, and represents an identifier of the terminal station communication device 8 to which the data frame is transmitted next. If the identifier of the terminal station communication device 8 which has the first transmission right is "0011", the first transmission right assigning terminal identifier field 6026 is set to be "0011". The first transmission right assigning slot number field 6027 is 4-bit long, and represents the number of slots which are used to send the data frame of the terminal station communication device 8 having the first transmission right. If two slots are assigned, the first transmission right assigning slot number field 6027 is set to be "0010". The second transmission right assigning terminal identifier field 6028 is 4-bit long, follow the slots for sending the data frame of the terminal station communication device having the first transmission right, and represents an identifier of the terminal station communication device to which the data frame is transmitted. If the foregoing identifier is "0100", the second transmission right assigning terminal identifier field 6028 is set to be "0100". The second transmission right assigning slot number field 6029 is 4-bit long, and represents the number of slots assigned to send the data frame of the terminal station communication device 8 having the second transmission right. If two slots are used, the second transmission right assigning slot number field 6029 is set to be "0010".

Figure 64:
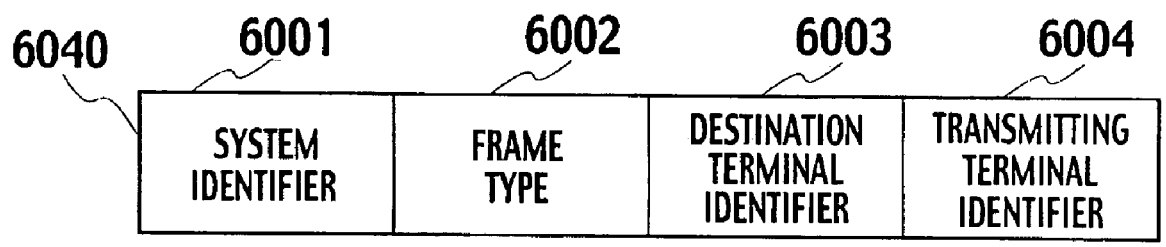
FIG. 64 shows one example of formats of connection request frames to be sent by a radio communication device of the terminal station in the thirteenth embodiment.

FIG. 64 shows an example format of a connection request frame 6040 which is sent by the terminal station communication device 8. The connection request frame 6040 is constituted by the system identifier field 6001, frame type field 6002, destination terminal identifier field 6003, and transmitting terminal identifier field 6004.

The system identifier field 6001 is 8-bit long. For instance, the system identifier field 6001 lists "0x42" which is the ASCII code representing the letter "B" identifying the communication system B. The frame type field 6002 is 2-bit long, and lists "11" denoting a connection request frame, for instance. The destination terminal identifier field 6003 is 4-bit long, and is set to be "0010" when the identifier "0010" is assigned to the base station communication device 7. The transmitting terminal identifier field 6004 is 4-bit long, and is set to be "0000" since no identifier is assigned to the terminal station communication device 8 which transmits the connection request.

Fourteenth Embodiment

In the foregoing embodiment, one uplink slot or one uplink frame space of the communication system 1 sharing the frequency is stored in the memory. Alternatively, the one uplink slot or the uplink frame space of the communication system 1 sharing the frequency may be obtained the announcement information from the communications systems sharing the frequency.

Figure 65:
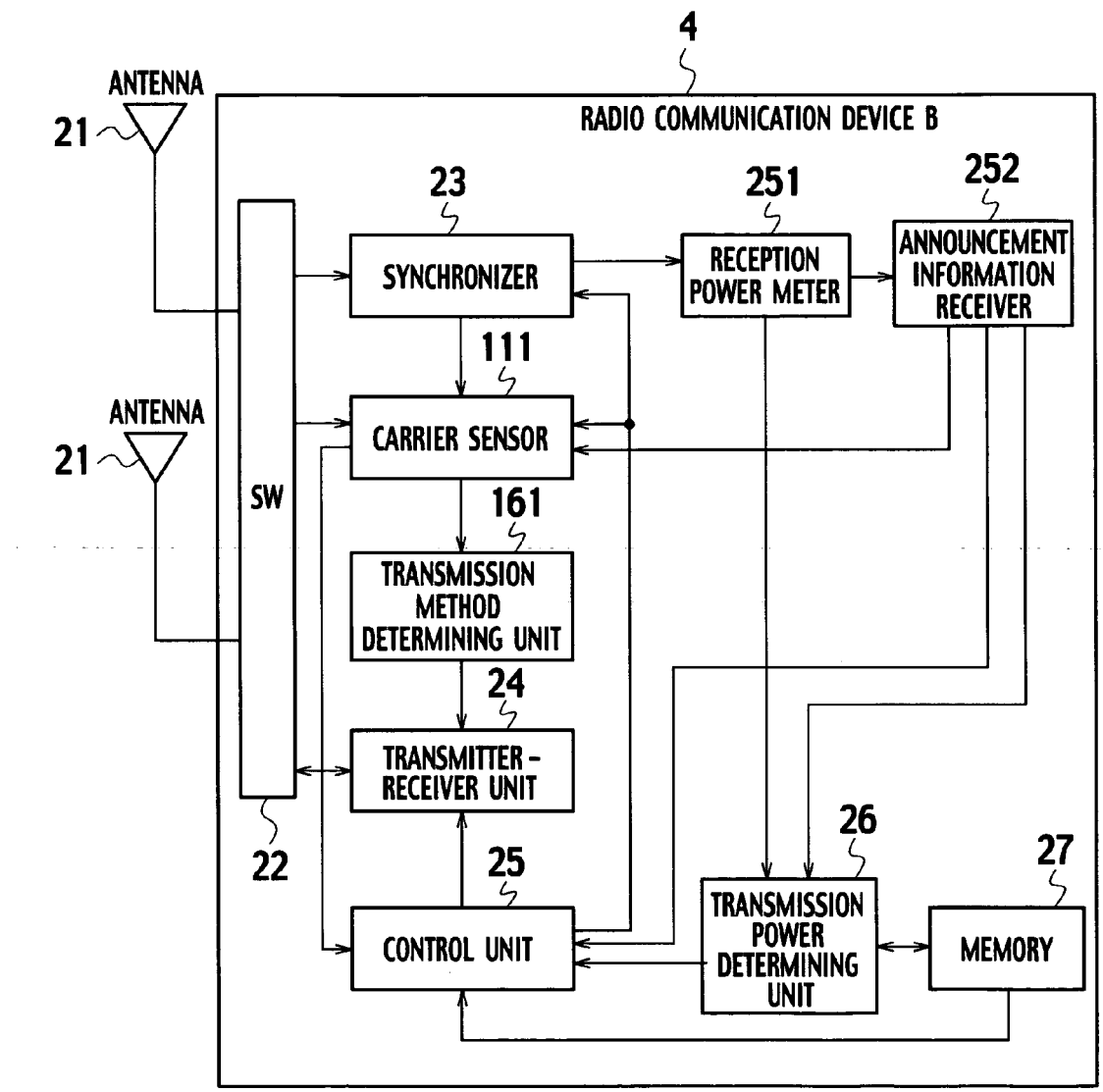
FIG. 65 is a block diagram of a radio communication device constituting a radio communication system in a fourteenth embodiment.

FIG. 65 shows one example of the configuration of the base station communication device 7 according to the fourteenth embodiment. In this embodiment, the announcement information receiver 252 and the control unit 25 are connected in the base station communication device 7 (shown in FIG. 24).

Figure 66:
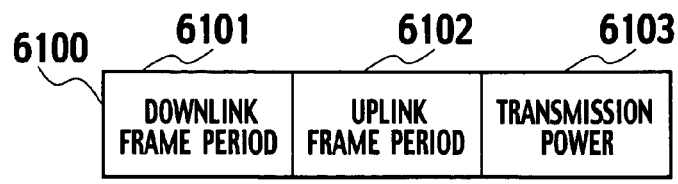
FIG. 66 is a block diagram of a radio communication device (of FIG. 65) constituting a radio communication system in the fourteenth embodiment.

FIG. 66 shows an example format of the announcement information frame 6100 to be sent by the base station 5 of the communication system 1. The announcement information frame 6100 is constituted by a downlink frame period field 6101, an uplink frame period field 6102, and a transmission power field 6013. For instance, the downlink frame period field 6101 is 3 ms long, and represents that the downlink frame is present for 3 ms after the announcement information. The uplink frame period field 6102 is 2 ms long, and represents that the uplink frame is present for 2 ms after the downlink frame. The transmission power field 6103 represents the transmission power for sending the announcement information. For instance, the transmission power field 6103 is set to be 30 [dBm].

Figure 67:
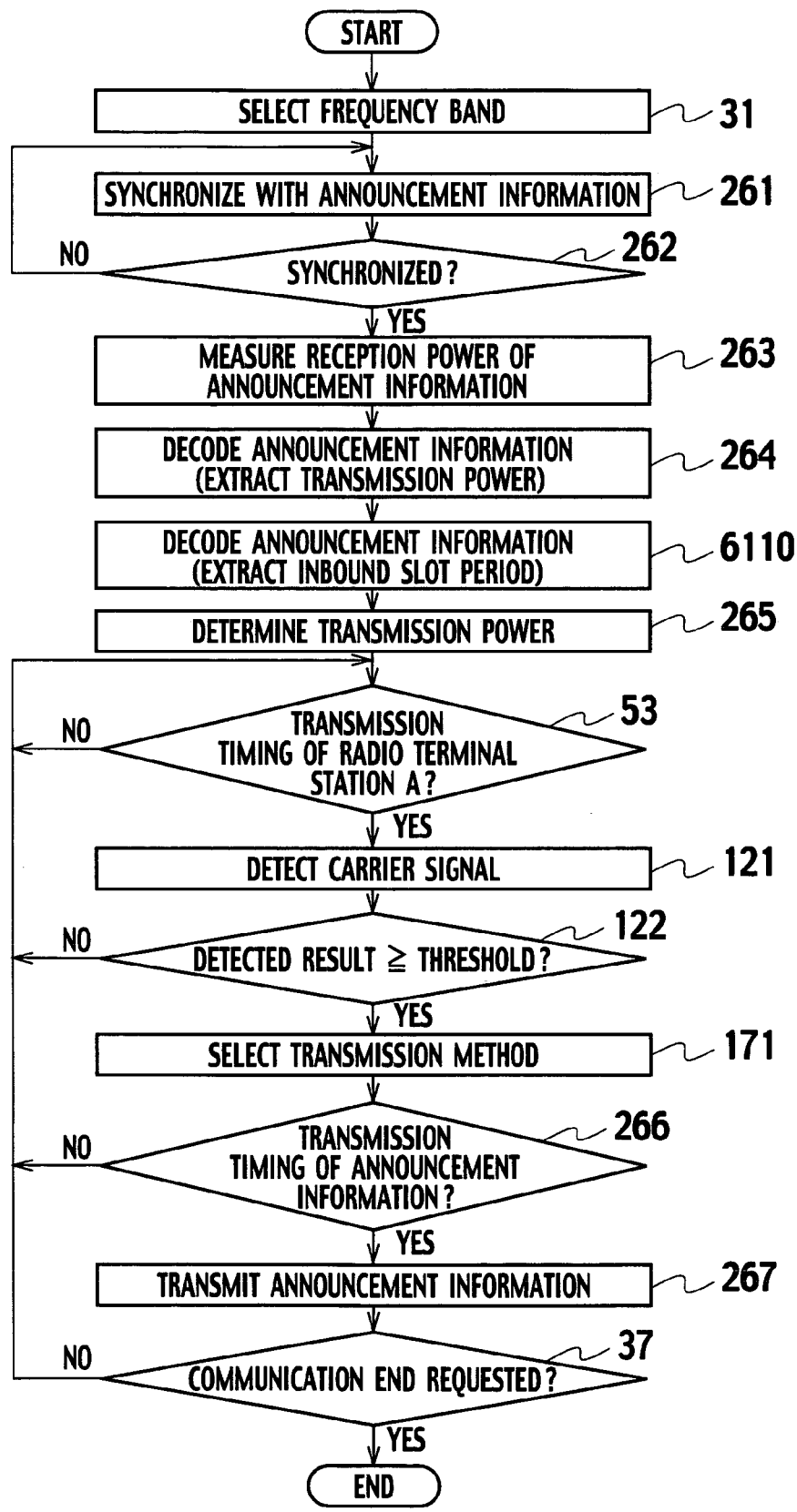
FIG. 67 is a flowchart showing one example of radio communication operations to be conducted by the communication device of FIG. 65 in order to send announcement information of the radio communication device.

The base station communication device 7 transmits the announcement information of the communication system 2 (shown in FIG. 65) in accordance with the procedures shown the flowchart of FIG. 67. In FIG. 67, decoding of the announcement information (in order to extract an uplink slot time) (step 6110) is added between step 264 (decoding of the announcement information shown in FIG. 25, in order to extract the transmission power) and step 265 (the determination of the transmission power). The procedures from step 31 to step 264 are the same as those of FIG. 25, and are not referred to here. In step 264, the announcement information receiver 252 of the base station communication device 7 decodes the announcement information received from the base station 5 of the communication system 1, and extracts the transmission power, and an uplink frame period in succession (step 6110). The announcement information receiver 252 outputs the extracted uplink frame period to the control unit 25, which sets the uplink frame period in the transmitter-receiver unit 24. The procedures in steps 265 to 171 shown in FIG. 67 are the same as those in FIG. 25, and are not referred to here. In step 266, when the announcement information transmitting timing reaches, the transmitter-receiver unit 24 transmits and receives the announcement information within the uplink frame period set by the control unit 25 (step 267).

One uplink slot or uplink frame period is acquired from the announcement information of the communication systems sharing the frequency, so that the signals can be transmitted in the slot even when the uplink slot or uplink frame period dynamically changes.

Although the present invention has been described and illustrated in detail, it is to be clearly understood that the same is by way of illustration and example only, and is not to be taken by way of limitation. The present invention may be modified in a variety of ways without departing the spirit and scope.

What is claimed is:

1. A terminal station radio communication device belonging to a second radio communication system which shares a frequency channel with a first radio communication system in which a radio terminal station communicates with a radio base station in a predetermined transmission time period using a predetermined frequency channel, the second radio communication system being allowed to use the frequency channel with lower priority over the first radio communication system, the terminal station radio communication device comprising:
   a frequency selector for changing frequency channels;
   a transmission power determining unit which sets up signal transmission power, the signal transmission power being used for communications between radio communication devices belonging to the second radio communication system, and being determined such that reception power at the radio base station is below a predetermined threshold;
   a synchronizer enabling the terminal station radio communication device belonging to the second radio communication system to acquire timing information to start signal transmission;
   a signal transmitter starting transmitting the signal at the timing represented in the timing information and terminating the signal transmission within a predetermined time period; and
   a carrier sensor which detects a carrier signal in a short time period from the timing represented in the timing information obtained from the synchronizer until a lapse of the predetermined time period, and enabling the signal transmitter to send the signal when reception power is found to be below the predetermined threshold during the carrier signal detection.

2. The terminal station radio communication device defined in claim 1, wherein the frequency selector changes a current frequency channel to another frequency channel when the number of times in which the reception power detected by the carrier sensor is above the predetermined threshold is above a predetermined threshold.

3. A base station radio communication device belonging to a second radio communication system which shares a frequency channel and communicates with a first radio communication system in which a radio terminal station communicates with a radio base station using a predetermined frequency channel within a predetermined transmission time period, the second radio communication system being allowed to use the frequency channel with lower priority over the first radio communication system, the base station radio communication device comprising:
   a frequency selector for changing frequency channels;
   an announcement information receiver receiving announcement information including transmission power of an announcement information signal from the radio base station;
   a reception power meter measuring reception power of the announcement information;
   a reception sensitivity information memory which stores information concerning reception sensitivity of the radio base station for receiving a signal from the terminal station radio communication device;
   a signal transmitter; and
   a transmission power determining unit which determines transmission power based on the transmission power and reception power of the announcement information, and enables the signal transmitter to send announcement information concerning the transmission power, using the determined transmission power.

4. The base station radio communication device defined in claim 3, wherein when candidate transmission power which is derived on the basis of a transmission loss calculated using the transmission power and the reception sensitivity information is equal to or larger than a target transmission power, the signal transmitter sends announcement information listing the candidate transmission power as the transmission power; and when the candidate transmission power is equal to or smaller than the target transmission power, the frequency selector enables the signal transmitter to perform signal transmission using a frequency channel different from a current frequency channel.

5. A terminal station radio communication device belonging to a second radio communication system which shares the same frequency channel with a first radio communication system in which a radio terminal station communicates with a radio base station using a predetermined frequency channel within a predetermined transmission time period, the second radio communication system being allowed to use the frequency channel with lower priority over the first radio communication system, the terminal station radio communication device comprising:
   a frequency selector for changing frequency channels;
   an announcement information receiver receiving announcement information including transmission power of an announcement information signal from the radio base station;
   a reception power meter measuring power for receiving the announcement information; and
   a reception sensitivity memory storing information concerning reception sensitivity of the radio base station for receiving a signal from the terminal station radio communication device,
   wherein one or more exchanges of a data frame and a response frame performed between radio communication devices belonging to the second radio communication system are completed within a time period during which a radio terminal station belonging to the first radio communication system continuously sends signals once.

6. A radio communication device belonging to a second radio communication system which shares a frequency channel with a first radio communication system in which a radio terminal station communicates with a radio base station using a predetermined frequency channel within a predetermined transmission time period, the second radio communication system being allowed to use the frequency channel with lower priority over the first radio communication system, the radio communication device comprising:
   a frequency selector for changing frequency channels;
   a first signal transmitter-receiver unit transmitting and receiving signals for the first radio communication system;
   a transmission power determining unit determining transmission power in order that signal power is equal to or smaller than a carrier sense level during an inter-frame space of the first radio communication system at the radio terminal station and the radio base station belonging to the first radio communication system;

an inter-frame space determining unit determining an inter-frame space on the basis of an output of the first signal transmitter-receiver unit; and a second signal transmitter-receiver unit sending a signal of the second communication system during the inter-frame space of the first radio communication system.

7. A radio communication device belonging to a second radio communication system which shares a frequency channel with a first radio communication system in which a radio terminal station communicates with a radio base station using a predetermined frequency channel within a predetermined transmission time period, the second radio communication system being allowed to use the frequency channel with lower priority over the first radio communication system, the radio communication device comprising:

a frequency selector for changing frequency channels;

a first signal transmitter-receiver unit transmitting and receiving signals for the first radio communication system;

a memory storing information concerning allowable interference levels of the radio terminal station and radio base station belonging to the first radio communication system;

a control unit determining a signal transmission period on the basis of header information included in a packet received from the radio terminal station and radio base station belonging to the first radio communication system;

a transmission power determining unit determining transmission power in order that signal power at the radio terminal station and radio base station is equal to or smaller than an allowable interference level of the first radio communication system at the radio terminal station and radio base station; and a second signal transmitter-receiver unit sending a signal of the second radio communication system in a transmission time period determined by the control unit and using transmission power determined by the transmission power determining unit.

8. The radio communication device defined in claim 6, wherein radio communication devices belonging to the second radio communication system perform radio communications for the second radio communication system as well as radio communications for the first radio communication system.

9. The terminal station radio communication device defined in claim 1, wherein the radio terminal station belonging to the first radio communication system acquires data concerning a time period for sending a string of signal from the announcement information of the first radio communication system which includes transmission power of an announcement information signal.

10. A radio communication method carried out by a radio communication device including a frequency selector for changing frequency channels and belonging to a second radio communication system which shares a frequency channel with a first radio communication system in which a radio terminal station communicates with a radio base station in a predetermined time period using a predetermined frequency channel, the second radio communication system being allowed to use the frequency channel with lower priority over the first radio communication system, the radio communication method comprising:

setting up signal transmission power which is used for communications between radio communication devices belonging to the second radio communication system, the transmission power being determined such that reception power at the radio base station is below a predetermined threshold;

acquiring timing information for the radio terminal station belonging to the first radio communication system to start signal transmission;

starting the signal transmission at the timing included in the timing information and using the signal transmission power, and completing the signal transmission within a predetermined time period; and detecting a carrier signal in a short time period from the timing represented in the acquired timing information until a lapse of the predetermined time period, and enabling the signal transmission when reception power is found to be below the predetermined threshold during the carrier signal detection.

11. A radio communication method carried out by a radio communication device including a frequency selector for changing frequency channels and belonging to a second radio communication system which shares a frequency channel with a first radio communication system in which a radio terminal station communicates with a radio base station in a predetermined time period using a predetermined frequency channel, the second radio communication system being allowed to use the frequency channel with lower priority over the first radio communication system, the radio communication method comprising:

letting the radio communication device transmit and receive announcement information including transmission power of an announcement information signal from the radio base station;

measuring reception power of the announcement information;

storing information concerning reception sensitivity of the radio base station for receiving a signal from the base station radio communication device; and determining transmission power based on the transmission power and reception power of the announcement information and enabling a signal transmitter to send announcement information concerning the transmission power, using the determined transmission power.

12. A radio communication method carried out by a terminal station radio communication device including a frequency selector for changing frequency channels and belonging to a second radio communication system which shares a frequency channel with a first radio communication system in which a radio terminal station communicates with a radio base station in a predetermined time period using a predetermined frequency channel, the second radio communication system being allowed to use the frequency channel with lower priority over the first radio communication system, the radio communication method comprising:

letting the radio communication device transmit and receive signals for the first radio communication system;

determining transmission power such that signal power at the radio terminal stations and radio base stations belonging to the first radio communication system is equal to or less than a carrier sense level in an inter-frame space of the first radio communication system;

determining the inter-frame space of the first radio communication system on the basis of the signal power; and sending a signal for the second radio communication system in the inter-frame space.

13. A radio communication method carried out by a terminal station radio communication device including a frequency selector for changing frequency channels and belonging to a second radio communication system which shares a frequency channel with a first radio communication system in which a radio terminal station communicates with a radio base station in a predetermined time period using a predetermined frequency channel, the second radio communication system being allowed to use the frequency channel with lower priority over the first radio communication system, the radio communication method comprising:
  letting the radio communication device transmit and receive signals for the first radio communication system;
  storing allowable interference levels of the radio terminal station and radio base station belonging to the first radio communication system;
  determining a signal transmission period on the basis of header information listed in a packet which is transmitted by the radio terminal station and radio base station;
  determining transmission power in order that signal power at the radio terminal station and radio base station belonging to the first radio communication system is equal to less than an allowable interference level of the first radio communication system; and
  transmitting a signal for the second radio communication system in the signal transmission period and using the transmission power.

14. A radio communication method carried out by a terminal station radio communication device including a frequency selector for changing frequency channels and belonging to a second radio communication system which shares a frequency channel with a first radio communication system in which a radio terminal station communicates with a radio base station in a predetermined time period using a predetermined frequency channel, the second radio communication system being allowed to use the frequency channel with lower priority over the first radio communication system, the radio communication method comprising:
  letting the radio communication device set up signal transmission-reception power in order that reception power which enables communications between radio communication devices of the second radio communication system and is at the radio base station is equal to or less than a predetermined threshold;
  acquiring information concerning timing to transmit a signal from the radio terminal station belonging to the first radio communication system;
  starting transmitting the signal at the timing in the timing information and using the signal transmission power, and terminating transmitting the signal within a predetermined time period; and
  detecting a carrier signal in a short time period from the timing represented in the acquired timing information until a lapse of the predetermined time period, and enabling the signal transmission when reception power is found to be below the predetermined threshold during the carrier signal detection.

15. A radio communication program, tangibly embodied in a non-transitory computer-readable storage medium, used by a terminal station radio communication device including a frequency selector for changing frequency channels and belonging to a second radio communication system which shares a frequency channel with a first radio communication system in which a radio terminal station communicates with a radio base station in a predetermined time period using a predetermined frequency channel, the second radio communication system being allowed to use the frequency channel with lower priority over the first radio communication system, the radio communication program comprising:
  letting the radio communication device receive announcement information including transmission power of an announcement information signal from the radio base station;
  measuring reception power of the announcement information;
  storing information concerning reception sensitivity of the radio base station for receiving a signal from the base station radio communication device; and
  determining transmission power based on the transmission power and reception power of the announcement information, and enabling a signal transmitter to send announcement information concerning the transmission power, using the determined transmission power.

16. A radio communication program, tangibly embodied in a non-transitory computer-readable storage medium, used by a terminal station radio communication device including a frequency selector for changing frequency channels and belonging to a second radio communication system which shares a frequency channel with a first radio communication system in which a radio terminal station communicates with a radio base station in a predetermined time period using a predetermined frequency channel, the second radio communication system being allowed to use the frequency channel with lower priority over the first radio communication system, the radio communication program comprising:
  letting the radio communication device transmit and receive signals for the first radio communication system;
  determining transmission power such that signal power at the radio terminal station and radio base station belonging to the first radio communication system is equal to or less than a carrier sense level in an inter-frame space of the first radio communication system;
  determining the inter-frame space of the first radio communication system on the basis of the signal power; and
  sending a signal for the second radio communication system in the inter-frame space.

17. A radio communication program, tangibly embodied in a non-transitory computer-readable storage medium, used by a terminal station radio communication device including a frequency selector for changing frequency channels and belonging to a second radio communication system which shares a frequency channel with a first radio communication system in which a radio terminal station communicates with a radio base station in a predetermined time period using a predetermined frequency channel, the second radio communication system being allowed to use the frequency channel with lower priority over the first radio communication system, the radio communication program comprising:
  letting the radio communication device transmit and receive signals for the first radio communication system;
  storing allowable interference levels of the radio terminal station and radio base station belonging to the first radio communication system;
  determining a signal transmission period on the basis of header information listed in a packet which is transmitted by the radio terminal station and radio base station;
  determining transmission power in order that signal power at the radio terminal station and radio base station belonging to the first radio communication system is equal to less than an allowable interference level of the first radio communication system; and
  transmitting a signal for the second radio communication system in the signal transmission period and using the transmission power.

* * * * *